US010574482B2

(12) United States Patent
Oré et al.

(10) Patent No.: US 10,574,482 B2
(45) Date of Patent: Feb. 25, 2020

(54) MULTI-PERIMETER FIREWALL IN THE CLOUD

(71) Applicant: UMBRA Technologies Ltd., Hong Kong (CN)

(72) Inventors: Carlos Eduardo Oré, Saint-Herblain (FR); Joseph E. Rubenstein, Beijing (CN)

(73) Assignee: UMBRA TECHNOLOGIES LTD., Hong Kong (CN)

( * ) Notice: Subject to any disclaimer, the term of this patent is extended or adjusted under 35 U.S.C. 154(b) by 0 days.

(21) Appl. No.: 15/563,261

(22) PCT Filed: Apr. 7, 2016

(86) PCT No.: PCT/IB2016/000528
§ 371 (c)(1),
(2) Date: Sep. 29, 2017

(87) PCT Pub. No.: WO2016/162748
PCT Pub. Date: Oct. 13, 2016

(65) Prior Publication Data
US 2018/0097774 A1    Apr. 5, 2018

Related U.S. Application Data

(60) Provisional application No. 62/151,174, filed on Apr. 22, 2015, provisional application No. 62/144,293, filed on Apr. 7, 2015.

(51) Int. Cl.
*H04L 29/06* (2006.01)
*H04L 12/46* (2006.01)
(Continued)

(52) U.S. Cl.
CPC ........ *H04L 12/465* (2013.01); *H04L 12/4633* (2013.01); *H04L 45/22* (2013.01);
(Continued)

(58) Field of Classification Search
CPC ........................... H04L 63/02; H04L 63/0218
See application file for complete search history.

(56) References Cited

U.S. PATENT DOCUMENTS

| 5,940,838 A | 8/1999 | Schmuck et al. |
| 6,209,039 B1 | 3/2001 | Albright et al. |

(Continued)

FOREIGN PATENT DOCUMENTS

| CN | 101079896 A | 11/2007 |
| CN | 101282448 A | 10/2008 |

(Continued)

OTHER PUBLICATIONS

"Operations and Quality of Service Telegraph Services, Global Virtual Network Service," ITU-T Standard, International Telecommunication Union, Geneva, Switzerland, No. F.16, Feb. 21, 1995, pp. 1-23 (23 pages).

(Continued)

*Primary Examiner* — Thaddeus J Plecha
(74) *Attorney, Agent, or Firm* — Wilmer Cutler Pickering Hale and Dorr LLP

(57) ABSTRACT

Systems and methods for providing multi-perimeter firewalls via a virtual global network are disclosed. In one embodiment the network system may comprise an egress ingress point in communication with a first access point server, a second access point server in communication with the first access point server, an endpoint device in communication with the second access point server, a first firewall in communication with the first access point server, and a second firewall in communication with the second access point server. The first and second firewalls may prevent traffic from passing through their respective access point servers. The first and second may be in communication with each other and exchange threat information.

26 Claims, 35 Drawing Sheets

(51) Int. Cl.
*H04L 12/715* (2013.01)
*H04L 12/707* (2013.01)
*H04L 12/703* (2013.01)
*H04L 12/725* (2013.01)

(52) U.S. Cl.
CPC ............ *H04L 45/28* (2013.01); *H04L 45/302* (2013.01); *H04L 45/64* (2013.01); *H04L 63/02* (2013.01); *H04L 63/0218* (2013.01); *H04L 63/0236* (2013.01); *H04L 63/0254* (2013.01); *H04L 63/0263* (2013.01); *H04L 63/0272* (2013.01); *H04L 12/4641* (2013.01)

(56) References Cited

U.S. PATENT DOCUMENTS

| | | |
|---|---|---|
| 6,879,995 B1 | 4/2005 | Chinta et al. |
| 7,254,833 B1* | 8/2007 | Cornelius ............ H04L 63/0209 726/11 |
| 7,389,312 B2 | 6/2008 | Ohran |
| 7,633,909 B1 | 12/2009 | Jones et al. |
| 7,689,722 B1 | 3/2010 | Timms et al. |
| 7,801,030 B1 | 9/2010 | Aggarwal et al. |
| 7,930,339 B2 | 4/2011 | Tobita et al. |
| 8,064,909 B2 | 11/2011 | Spinelli et al. |
| 8,069,258 B1 | 11/2011 | Howell |
| 8,069,435 B1 | 11/2011 | Lai |
| 8,073,777 B2 | 12/2011 | Barry et al. |
| 8,107,363 B1 | 1/2012 | Saluja |
| 8,266,672 B2 | 9/2012 | Moore |
| 8,401,028 B2 | 3/2013 | Mihaly et al. |
| 8,422,397 B2 | 4/2013 | Ansari et al. |
| 8,458,786 B1 | 6/2013 | Kailash et al. |
| 8,611,355 B1 | 12/2013 | Sella et al. |
| 8,798,060 B1 | 8/2014 | Vautrin et al. |
| 8,966,075 B1 | 2/2015 | Chickering et al. |
| 9,172,603 B2 | 10/2015 | Padmanabhan et al. |
| 9,213,594 B2 | 12/2015 | Strasser et al. |
| 9,241,004 B1 | 1/2016 | April |
| 9,277,452 B1 | 3/2016 | Aithal et al. |
| 9,294,304 B2 | 3/2016 | Sindhu |
| 9,298,719 B2 | 3/2016 | Noronha et al. |
| 9,350,644 B2 | 5/2016 | Desai et al. |
| 9,461,996 B2 | 10/2016 | Hayton et al. |
| 9,525,696 B2 | 12/2016 | Kapoor et al. |
| 9,641,612 B2 | 5/2017 | Yu |
| 9,729,539 B1 | 8/2017 | Agrawal et al. |
| 9,858,559 B2 | 1/2018 | Raleigh et al. |
| 9,888,042 B2 | 2/2018 | Annamalaisami et al. |
| 9,898,317 B2 | 2/2018 | Nakil et al. |
| 10,044,678 B2 | 8/2018 | Van der Merwe et al. |
| 10,079,839 B1 | 9/2018 | Bryan et al. |
| 2002/0046253 A1* | 4/2002 | Uchida ................... H04L 63/02 709/217 |
| 2002/0087447 A1* | 7/2002 | McDonald ............. G06Q 40/06 705/36 R |
| 2003/0110214 A1 | 6/2003 | Sato |
| 2003/0147403 A1 | 8/2003 | Border et al. |
| 2003/0195973 A1 | 10/2003 | Savarda |
| 2003/0233551 A1 | 12/2003 | Kouznetsov et al. |
| 2004/0205339 A1 | 10/2004 | Medin |
| 2005/0235352 A1* | 10/2005 | Staats ................... H04L 41/082 726/14 |
| 2006/0031407 A1 | 2/2006 | Dispensa et al. |
| 2006/0195896 A1 | 8/2006 | Fulp et al. |
| 2007/0168517 A1 | 7/2007 | Weller et al. |
| 2007/0226043 A1* | 9/2007 | Pietsch ................. G06Q 10/087 705/7.31 |
| 2008/0010676 A1* | 1/2008 | Dosa Racz ........... H04L 63/029 726/11 |
| 2008/0091598 A1 | 4/2008 | Fauleau |
| 2008/0117927 A1 | 5/2008 | Donhauser et al. |
| 2008/0168377 A1 | 7/2008 | Stallings et al. |
| 2008/0247386 A1 | 10/2008 | Wildfeuer |
| 2008/0260151 A1 | 10/2008 | Fluhrer et al. |
| 2008/0301794 A1* | 12/2008 | Lee ..................... H04L 63/0281 726/11 |
| 2009/0003223 A1 | 1/2009 | McCallum et al. |
| 2009/0092043 A1 | 4/2009 | Lapuh et al. |
| 2009/0106569 A1 | 4/2009 | Roh et al. |
| 2009/0122990 A1 | 5/2009 | Gundavelli et al. |
| 2009/0129386 A1 | 5/2009 | Rune |
| 2009/0217109 A1 | 8/2009 | Sekaran et al. |
| 2010/0017603 A1 | 1/2010 | Jones |
| 2010/0131616 A1* | 5/2010 | Walter ................. H04L 63/0209 709/219 |
| 2010/0316052 A1 | 12/2010 | Petersen |
| 2010/0325309 A1 | 12/2010 | Cicic et al. |
| 2011/0007652 A1 | 1/2011 | Bai |
| 2011/0231917 A1 | 9/2011 | Chaturvedi et al. |
| 2011/0268435 A1 | 11/2011 | Mizutani et al. |
| 2012/0005264 A1 | 1/2012 | McWhirter et al. |
| 2012/0082057 A1 | 4/2012 | Welin et al. |
| 2012/0105637 A1 | 5/2012 | Yousefi et al. |
| 2012/0188867 A1 | 7/2012 | Fiorone et al. |
| 2012/0210417 A1* | 8/2012 | Shieh ................... H04L 63/0218 726/12 |
| 2012/0270580 A1 | 10/2012 | Anisimov et al. |
| 2013/0110787 A1 | 5/2013 | Garimella et al. |
| 2013/0259465 A1 | 10/2013 | Blair |
| 2013/0283118 A1 | 10/2013 | Rayner |
| 2013/0287037 A1 | 10/2013 | Bush et al. |
| 2013/0308471 A1 | 11/2013 | Krzanowski et al. |
| 2013/0318233 A1 | 11/2013 | Biswas et al. |
| 2013/0322255 A1 | 12/2013 | Dillon |
| 2013/0343180 A1 | 12/2013 | Kini et al. |
| 2014/0101036 A1 | 4/2014 | Phillips et al. |
| 2014/0149552 A1 | 5/2014 | Carney et al. |
| 2014/0210693 A1* | 7/2014 | Bhamidipati ......... H04L 65/4092 345/2.3 |
| 2014/0229945 A1 | 8/2014 | Barkai et al. |
| 2014/0269712 A1 | 9/2014 | Kidambi |
| 2014/0278543 A1* | 9/2014 | Kasdon ................... G16H 10/60 705/3 |
| 2014/0341023 A1 | 11/2014 | Kim et al. |
| 2014/0359704 A1 | 12/2014 | Chen |
| 2014/0369230 A1 | 12/2014 | Nallur |
| 2015/0063117 A1 | 3/2015 | DiBurro et al. |
| 2015/0063360 A1 | 3/2015 | Thakkar et al. |
| 2015/0089582 A1 | 3/2015 | Dilley et al. |
| 2015/0128246 A1* | 5/2015 | Feghali ................. H04L 63/0209 726/13 |
| 2015/0222637 A1 | 8/2015 | Hung et al. |
| 2015/0271104 A1 | 9/2015 | Chikkamath et al. |
| 2015/0281176 A1* | 10/2015 | Banfield ............. H04L 63/0218 726/11 |
| 2015/0326588 A1* | 11/2015 | Vissamsetty ........ H04L 63/1491 726/23 |
| 2016/0006695 A1 | 1/2016 | Prodoehl et al. |
| 2016/0028586 A1 | 1/2016 | Blair |
| 2016/0028770 A1 | 1/2016 | Raleigh et al. |
| 2016/0077745 A1 | 3/2016 | Patel et al. |
| 2016/0119279 A1 | 4/2016 | Maslak et al. |
| 2016/0134543 A1 | 5/2016 | Zhang et al. |
| 2016/0165463 A1 | 6/2016 | Zhang |
| 2016/0337223 A1 | 11/2016 | Mackay |
| 2016/0337484 A1* | 11/2016 | Tola ..................... H04L 12/6418 |
| 2017/0078922 A1 | 3/2017 | Raleigh et al. |
| 2017/0344703 A1 | 11/2017 | Ansari et al. |
| 2018/0198756 A1 | 7/2018 | Dawes |

FOREIGN PATENT DOCUMENTS

| | | |
|---|---|---|
| CN | 101969414 A | 2/2011 |
| CN | 102340538 A | 2/2012 |
| CN | 102457539 A | 5/2012 |
| CN | 103118089 A | 5/2013 |
| EP | 1498809 A1 | 1/2005 |
| EP | 1635253 A2 | 3/2006 |
| EP | 2154834 A1 | 2/2010 |
| WO | WO-02/33551 A1 | 4/2002 |
| WO | WO-2006/055838 A2 | 5/2006 |
| WO | WO-2010/072030 A1 | 7/2010 |

(56) References Cited

FOREIGN PATENT DOCUMENTS

| WO | WO-2013/120069 A1 | 8/2013 |
| WO | WO-2015/021343 A1 | 2/2015 |
| WO | WO-2016/094291 A1 | 6/2016 |
| WO | WO-2016/110785 A1 | 7/2016 |
| WO | WO-2016/123293 A1 | 8/2016 |
| WO | WO-2016/162748 A1 | 10/2016 |
| WO | WO-2016/162749 A1 | 10/2016 |
| WO | WO-2016/164612 A1 | 10/2016 |
| WO | WO-2016/198961 A2 | 12/2016 |

OTHER PUBLICATIONS

"Open Radio Equipment Interface (ORI); ORI Interface Specification; Part 2: Control and Management (Release 4)," Group Specification, European Telecommunications Standards Institute (ETSI), 650, Route des Lucioles; F-06921 Sophia-Antipolis Cedex; France, vol. ORI, No. V4.1.1, Oct. 1, 2014 (185 pages).

Robert Russell, "Introduction to RDMA Programming," retrieved from the Internet: URL:web.archive.org/web/20140417205540/http://www.cs.unh.edu/~rdr/rdma-intro-module.ppt Apr. 17, 2014 (76 pages).

* cited by examiner

MULTI-PERIMETER FIREWALL IN THE CLOUD

This application is a U.S. National Stage application under 35U.S.C. § 371 of International Patent Application No. PCT/IB2016/000528, filed, Apr. 7, 2016, which claims the benefit of and priority to U.S. Provisional Application No. 62/144,293 filed on Apr. 7, 2015 and U.S. Provisional Application No. 62/151,174 filed on Apr. 22, 2015, the entire content of each application is incorporated herein by reference in its entirety.

FIELD OF THE DISCLOSURE

The present disclosure relates generally to networks, and more particularly, network security which protects the flow of traffic through a global virtual network or similar network by the strategic positioning of distributed firewall (FW) devices placed at multiple perimeters in the cloud.

BACKGROUND OF THE DISCLOSURE

Human beings are able to perceive delays of 200 ms or more as this is typically the average human reaction time to an event. If latency is too high, online systems such as thin-clients to cloud-based servers, customer relationship management (CRM), enterprise resource planning (ERP) and other systems will perform poorly and may even cease functioning due to timeouts. High latency combined with high packet loss can make a connection unusable. Even if data gets through, at a certain point too much slowness results in a poor user experience (UX) and in those instances the result can be refusal by users to accept those conditions in effect rendering poorly delivered services as useless.

To address some of these issues, various technologies have been developed. One such technology is WAN optimization, typically involving a hardware (HW) device at the edge of a local area network (LAN) which builds a tunnel to another WAN optimization HW device at the edge of another LAN, forming a wide area network (WAN) between them. This technology assumes a stable connection through which the two devices connect to each other. A WAN optimizer strives to compress and secure the data flow often resulting in a speed gain. The commercial driver for the adoption of WAN optimization is to save on the volume of data sent in an effort to reduce the cost of data transmission. Disadvantages of this are that it is often point-to-point and can struggle when the connection between the two devices is not good as there is little to no control over the path of the flow of traffic through the Internet between them. To address this, users of WAN optimizers often opt to run their WAN over an MPLS or DDN line or other dedicated circuit resulting in an added expense and again usually entailing a rigid, fixed point-to-point connection.

Direct links such as MPLS, DDN, Dedicated Circuits or other types of fixed point-to-point connection offer quality of connection and Quality of Service (QoS) guarantees. They are expensive and often take a significantly long time to install due to the need to physically draw lines from a POP at each side of the connection. The point-to-point topology works well when connecting from within one LAN to the resources of another LAN via this directly connected WAN. However, when the gateway (GW) to the general Internet is located at the LAN of one end, say at the corporate headquarters, then traffic from the remote LAN of a subsidiary country may be routed to the Internet through the GW. A slowdown occurs as traffic flows through the internet back to servers in the same country as the subsidiary. Traffic must then go from the LAN through the WAN to the LAN where the GW is located and then through the Internet back to a server in the origin country, then back through the internet to the GW, and then back down the dedicated line to the client device within the LAN. In essence doubling or tripling (or worse) the global transit time of what should take a small fraction of global latency to access this nearby site. To overcome this, alternative connectivity of another internet line with appropriate configuration changes and added devices can offer local traffic to the internet, at each end of such a system.

Another option for creating WAN links from one LAN to another LAN involve the building of tunnels such as IPSec or other protocol tunnels between two routers, firewalls, or equivalent edge devices. These are usually encrypted and can offer compression and other logic to try to improve connectivity. There is little to no control over the routes between the two points as they rely on the policy of various middle players on the internet who carry their traffic over their network(s) and peer to other carriers and or network operators. Firewalls and routers, switches and other devices from a number of equipment vendors usually have tunneling options built into their firmware.

While last mile connectivity has vastly improved in recent years there still exist problems with long distance connectivity and throughput due to issues related to distance, protocol limitations, peering, interference, and other problems and threats. As such, there exists a need for secure network optimization services running over the top of standard internet connections.

SUMMARY OF THE DISCLOSURE

Systems and methods for providing multi-perimeter firewalls via a virtual global network are disclosed. The network may comprise an egress ingress point device, a first and second access point server, an endpoint device, and a first and second firewall. The first firewall is in communication with the first access point server and may prevent network traffic from flowing through the first access point server. The second firewall is in communication with the second access point server and may prevent network traffic from flowing through the second access point server.

In accordance with one embodiment, at least one of the access point servers is configured to perform firewall services.

In accordance with another embodiment the first firewall is in communication with the second firewall. The communication path between the first and second firewall may be a global virtual network tunnel or a global virtual network back channel or API call or other. In some embodiments the first firewall and the second firewall share threat information including at least one of heuristic patterns, signatures of known threats, known malicious source IP addresses, or attack vectors. The threat information may be shared via a central control server.

In some embodiments at least one of the firewalls performs deep packet inspection. In other embodiments at least one of the firewalls performs stateful packet inspection. In other embodiments one firewall performs stateful packet inspection and the other firewall performs stateful packet inspection.

In some embodiments at least one of the firewalls includes a cloud firewall load balancer that can allocate cloud firewall resources on demand.

BRIEF DESCRIPTION OF THE DRAWINGS

In order to facilitate a fuller understanding of the present disclosure, reference is now made to the accompanying drawings, in which like elements are referenced with like numerals or references. These drawings should not be construed as limiting the present disclosure, but are intended to be illustrative only.

DETAILED DESCRIPTION

Figure 1:
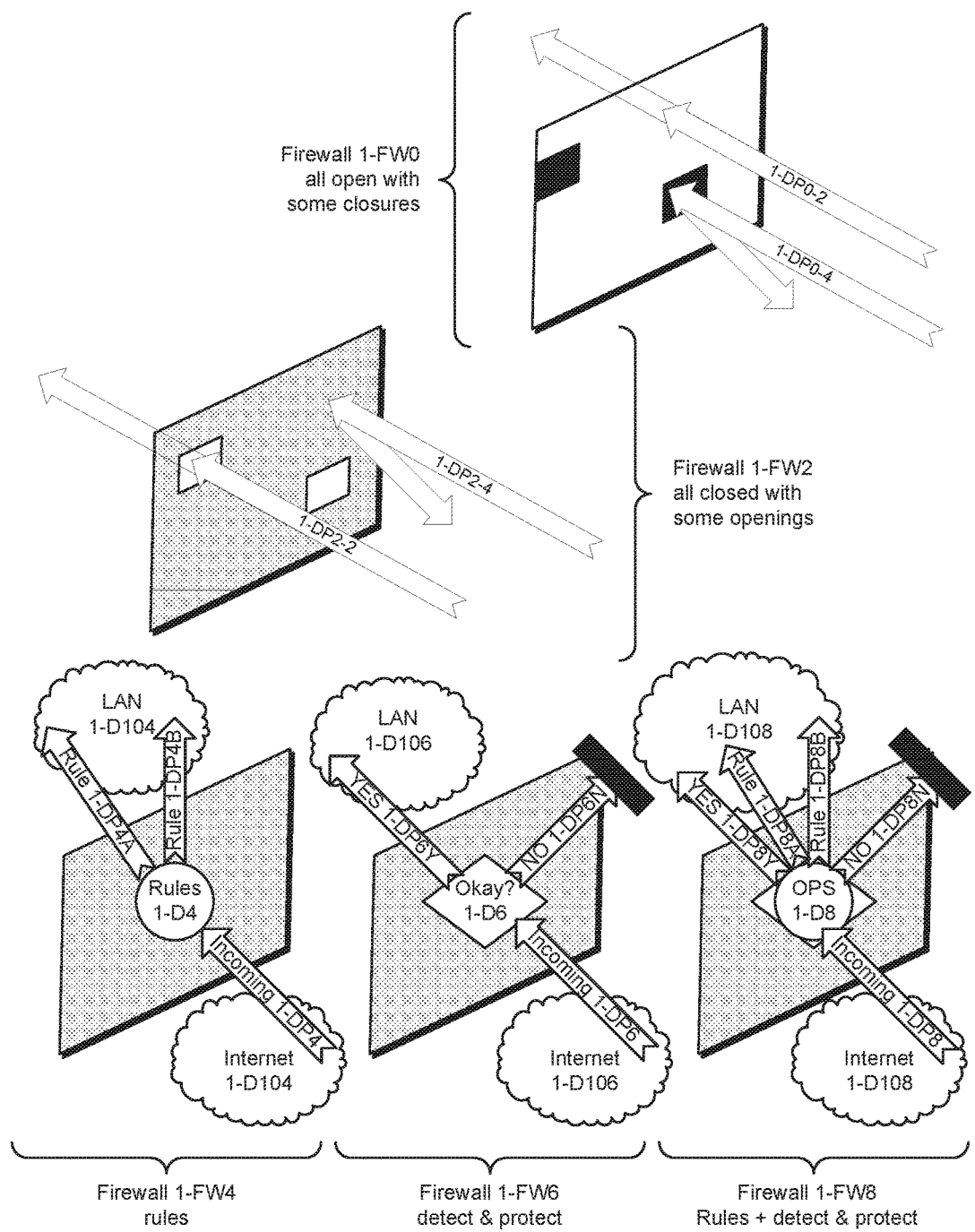
FIG. 1 illustrates five types of firewall device operations.

A GVN offers secure network optimization services to clients over the top of their standard internet connection. This is an overview of the constituent parts of a GVN as well as a description of related technologies which can serve as GVN elements. GVN elements may operate independently or within the ecosystem of a GVN such as utilizing the GVN framework for their own purposes, or can be deployed to enhance the performance and efficiency of a GVN. This overview also describes how other technologies can benefit from a GVN either as a stand-alone deployment using some or all components of a GVN, or which could be rapidly deployed as an independent mechanism on top of an existing GVN, utilizing its benefits.

A software (SW) based virtual private network (VPN) offers privacy via a tunnel between a client device and a VPN server. These have an advantage of encryption and in some cases also compression. But here again there is little to no control over how traffic flows between VPN client and VPN server as well as between the VPN server and host server, host client or other devices at destination. These are often point-to-point connections that require client software to be installed per device using the VPN and some technical proficiency to maintain the connection for each device. If a VPN server egress point is in close proximity via quality communication path to destination host server or host client then performance will be good. If not, then there will be noticeable drags on performance and dissatisfaction from a usability perspective. It is often a requirement for a VPN user to have to disconnect from one VPN server and reconnect to another VPN server to have quality or local access to content from one region versus the content from another region.

A Global Virtual Network (GVN) is a type of computer network on top of the internet providing global secure network optimization services utilizing a mesh of devices distributed around the world securely linked to each other by advanced tunnels, collaborating and communicating via Application Program Interface (API), Database (DB) replication, and other methods. Traffic routing in the GVN is always via best communication path governed by Advanced Smart Routing (ASR) powered by automated systems which combine builders, managers, testers, algorithmic analysis and other methodologies to adapt to changing conditions and learning over time to configure and reconfigure the system.

The GVN offers a service to provide secure, reliable, fast, stable, precise and focused concurrent connectivity over the top of one or more regular Internet connections. These benefits are achieved through compression of data flow transiting multiple connections of wrapped, disguised and encrypted tunnels between the EPD and access point servers (SRV_AP) in close proximity to the EPD. The quality of connection between EPD and SRV_AP's is constantly being monitored.

A GVN is a combination of a hardware (HW) End Point Device (EPD) with installed software (SW), databases (DB) and other automated modules of the GVN system such as Neutral Application Programming Interface Mechanism (NAPIM), back channel manager, tunnel manager, and more features which connect the EPD to distributed infrastructure devices such as access point server (SRV_AP) and central server (SRV_CNTRL) within the GVN.

Algorithms continually analyze current network state while taking into account trailing trends plus long term historical performance to determine best route for traffic to take and which is the best SRV_AP or series of SRV_AP servers to push traffic through. Configuration, communication path and other changes are made automatically and on the fly with minimal or no user interaction or intervention required.

Advanced Smart Routing in an EPD and in an SRV_AP ensure that traffic flows via the most ideal path from origin to destination through an as simple as possible "Third Layer" of the GVN. This third layer is seen by client devices connected to the GVN as a normal internet path but with a lower number of hops, better security and in most cases lower latency than traffic flowing through the regular internet to the same destination. Logic and automation operate at the "second layer" of the GVN where the software of the GVN automatically monitors and controls the underlying routing and construct of virtual interfaces (VIF), multiple tunnels and binding of communication paths. The third and second layers of the GVN exist on top of the operational "first layer" of the GVN which interacts with the devices of the underlying Internet network.

The cloud from a technical and networking perspective refers to devices or groups or arrays or clusters of devices which are connected and are available to other devices through the open internet. The physical location of these devices is not of significant importance as they often have their data replicated across multiple locations with delivery to/from closest server to/from requesting client utilizing content delivery network (CDN) or other such technology to speed connectivity which enhances user experience (UX).

This invention builds upon the standard use by industry of firewalls (FW) increasing their utility value by extending perimeters into the cloud. A firewall is a device primarily designed to protect an internal network against the external threats from an outside network, as well as protecting the leakage of information data from the internal network. A firewall has traditionally been placed at the edge between one network such as a local area network (LAN) and another network such as its uplink to a broader network. Network administrators have sensitivities about the placement and trustworthiness of a FW because of their reliance on it to secure their networks.

Additional components of the GVN include the secure boot mechanism (SBM) and the back channel mechanism (BCM). The secure boot mechanism protects the keys of a secure volume by storing the key on a remote server and only making the key available via the SBM. The back channel mechanism allows for the administration and/or interaction of many devices of a GVN. During times of poor network performance when a tunnel goes down, the BCM offers a channel into devices which cannot otherwise be reached, including access to devices which are not reachable from the open internet. This mechanism offers reverse hole-punching through barriers to keep the communications channel open. Other security components of the GVN include UUID hardware binding and fine granularity data encryption using per row keys.

Figure 34:
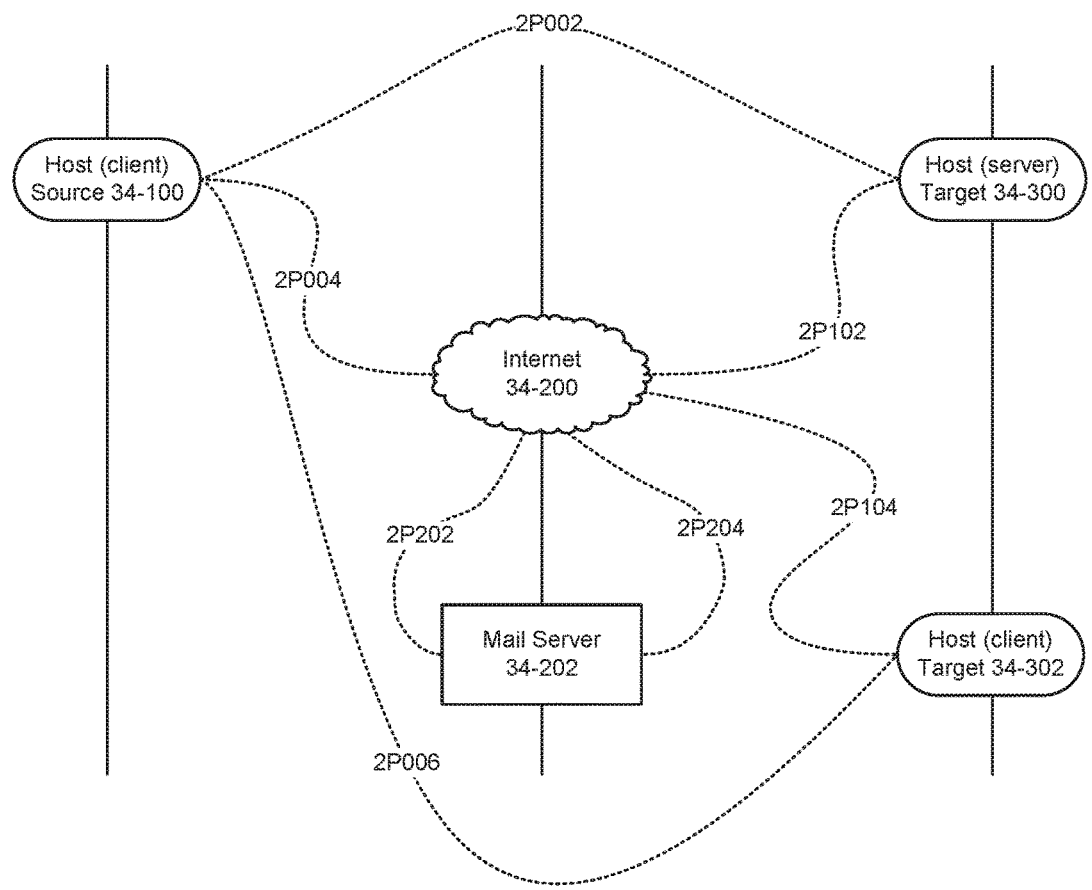
FIG. 34 shows a high-level block diagram of the Internet.

FIG. 34 shows a high-level block diagram of the Internet. The average user possesses a very cursory overview understanding of how the Internet functions. Host Source 34-100 is the starting point and denotes a client device which could be a computer, a mobile phone, tablet, laptop computer or other such client. This client connects via the Internet 34-200 to a host server 34-300 to send or retrieve content, or to another host client 34-302 to send or receive information.

A very non-technical user might assume that traffic to the host server follows path 2P002 without even understanding that their data will transit through the Internet. Or they might think that traffic would flow via path 2P006 directly to another client device.

A user with some more understanding of how it works would understand that traffic flows via path 2P004 to the Internet 34-200 and then via path 2P102 to a Host server Target 34-300 or via path 2P104 to a Host (client) Target 34-302.

Users with some more technical knowledge will further understand that when sending an email, the this email will leave their client device 34-100, transit via path 2P004 to the Internet 34-200 and then via path 2P202 to a mail server 34-202. Then the recipient of the email will make a request to retrieve the email via their host client 34-302 along path 2P104 to the Internet and then down path 2P204 to the mail server 34-202.

This is about as detailed as the average person's understanding of the Internet gets.

Figure 35:
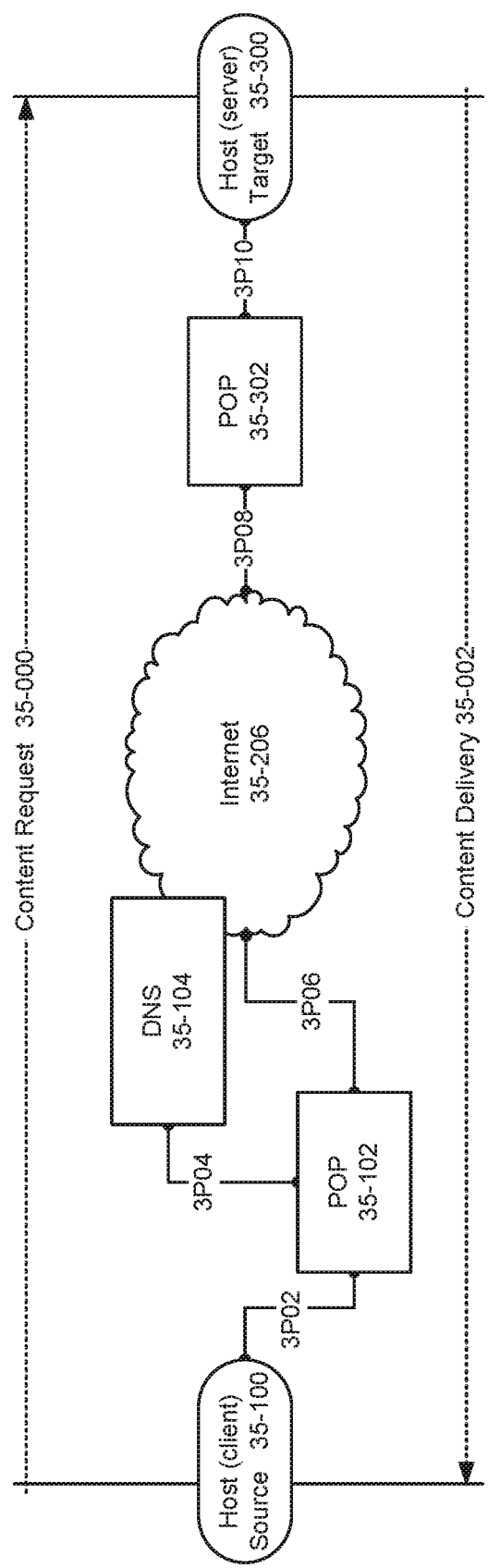
FIG. 35 is a block diagram showing the resolution of Universal Resource Locator (URLs) to numeric Internet Protocol (IP) addresses via the Domain Name System (DNS).

FIG. 35 is a block diagram showing the resolution of Universal Resource Locator (URLs) to numeric Internet Protocol (IP) addresses via the Domain Name System (DNS).

A content request 35-000 or push from host client (C) 35-100 to host server (S) 35-300 as files or streams or blocks of data flows from host client (C) 35-100 to the host server (S) 35-300. The response or content delivery 35-002 is returned from host S to host C as files or streams or blocks of data. The host client device 35-100 in a Client-Server (CS) relationship with host server (S) makes requests to access content from the remote host server (S) or sends data to remote host server (S) via a universal resource locator (URL) or other network reachable address.

The initial connection from the host client (C) 35-100 to the Internet 35-206 is shown as 3P02—the connection from the host client (C) to a Point of Presence (POP) 35-102 that can be directly facing. In other cases the host client (C) can be located in a local area network (LAN) which then connects to the internet via a point of presence (POP) and can be referred to as the last mile connection. The point of presence (POP) 35-102 represents the connection provided from an end point by an internet service provider (ISP) to the internet via their network and its interconnects. This can be, but is not limited to, cable, fiber, DSL, Ethernet, satellite, dial-up, and other connections. If the URL is a domain name rather than a numeric address, then this URL is sent to domain name system (DNS) server 35-104 where the domain name is translated to an IPv4 or IPv6 or other address for routing purposes.

Traffic from host client (C) 35-100 to host server (S) 35-300 is routed through the Internet 35-206 representing transit between POPs (35-102 and 35-302) including peering, backhaul, or other transit of network boundaries.

The connection 3P04 between a POP 35-102 and a domain name system 35-104, used to look up a number address from a universal resource locator (URL) to get the IPv4 address or other numeric address of target server (S), can be directly accessed from the POP, or via the Internet 35-206. The connection 3P06 from a POP 35-102 of an ISP to the Internet 35-206 can be single-homed or multi-honed. Similarly, the connection 3P08 from the Internet 35-206 to the remote ISP can also be single-homed or multi-honed. This connection is generally, to the ISP's or Internet Data Center's (IDC) internet-facing POP 35-302. The connection 3P10 from the remote ISP's POP 35-302 to the host server (S) can be direct or via multiple hops.

The lookups from URL or hostname to numeric address via domain name systems is a standard on the Internet today and systems assume that the DNS server is integral and that the DNS server results are current and can be trusted.

Figure 19:
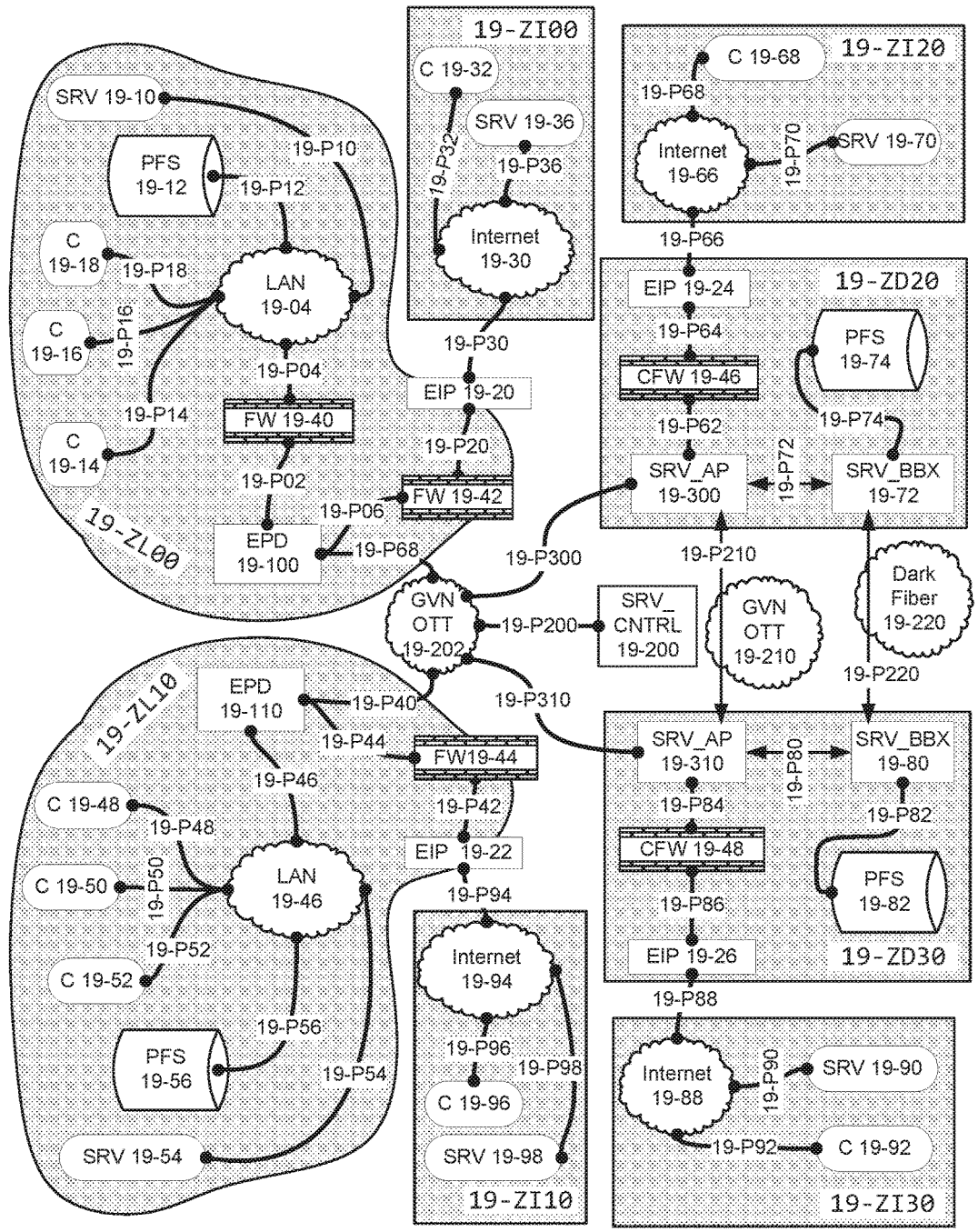
FIG. 19 illustrates GVN topology, including a backbone segment over internet or dark fiber.

FIG. 19 illustrates GVN topology, communications paths including a backbone segment over internet or dark fiber and indicates the placement of various devices including various types of firewall (FW) devices at various perimeter locations. It shows how various geographic regions or zones or territory are linked together over various types of paths. This figure illustrates that various types of network fabrics can be combined into a greater network tapestry. These fabrics can be seamlessly woven together as described in U.S. Provisional Patent Application No. 62/174,394.

Referring to FIG. 19, there are multiple zone shown: LAN zone 0 (ZL00), LAN zone 1 (ZL10), Internet zone 0 (ZI00), Internet zone 1 (ZI10), Internet zone 2 (ZI20), Internet zone 3 (ZI30), Internet data center zone 2 (ZD20), and Internet data center zone 3 (ZD30).

LAN zone 0 19-ZL00 describes a typical local area network (LAN) including the placement of firewalls with respect to an end point device (EPD) 19-100 between the LAN and the external network GVN OTT 19-202 and Internet 19-30. There is a hardware firewall FW 19-40 between LAN 19-04 and EPD 19-100. Another hardware or software FW 19-42 is between the EPD 19-100 and the egress ingress point (EIP) 19-20 to protect the EPD from external threats emanating from Internet 19-30.

LAN zone one 19-ZL10 is similar in topology to LAN zone zero 19-ZL00 with the exception that there is no firewall placed between EPD 19-110 and LAN 19-46.

Internet zone zero 19-ZI00 describes an example internet topology in a region in close proximity to 19-ZL00. Internet zone one 19-ZI10 describes an example internet topology in a region in close proximity to 19-ZL10. Internet zone two 19-ZI20 describes an example internet topology in a region in close proximity to 19-ZD20. Internet zone three 19-ZI30 describes an example internet topology in a region in close proximity to 19-ZD30.

Internet data center zone two 19-ZD20 describes the topology and placement of cloud based firewalls CFW 19-46 including virtualized firewall devices behind cloud firewall load balancers. Internet data center zone three 19-ZD30 describes the topology and placement of cloud based firewalls CFW 19-48 including virtualized firewall devices behind cloud firewall load balancers.

SRV_BBX 19-72 in region or zone ZD20 can be connected to SRV_BBX 19-80 in another region or zone ZD30 via a dark fiber connection 19-P220 over dark fiber 19-220. SRV_BBX 19-72 can directly write a file to parallel file storage PFS 19-82 via remote direct memory access (RDMA) over 19-P220 bypassing the stack of SRV_BBX 19-80 via path 19-P82. SRV_BBX 19-80 can directly write a file to parallel file storage PFS 19-74 via remote direct memory access (RDMA) over 19-P220 bypassing the stack of SRV_BBX 19-72 via path 19-P74.

Path 19-P210 can be IPv4 or some kind of standardized internet protocol over which traffic flows from SRV_AP 19-300 to and or from SRV_AP 19-310 via path 19-P210 over-the-top of the GVN via a tunnel or other type of communication path.

While the topology shown does not have firewalls or traffic monitoring devices within the GVN pathways, these devices could be placed there on an as needed basis to further secure the flow of data.

Figure 13:
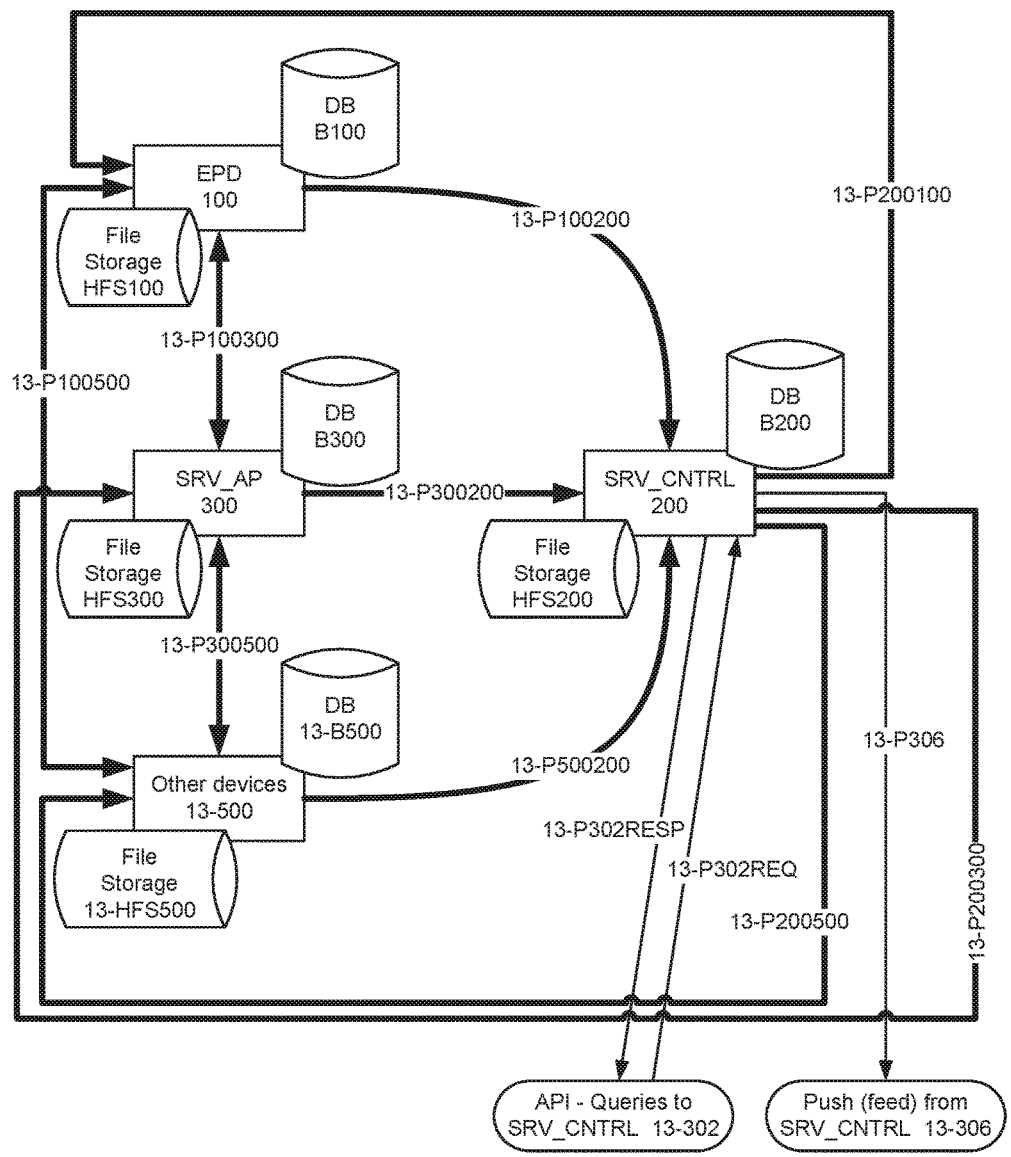
FIG. 13 illustrates the information flow between devices of a Global Virtual Network.

FIG. 13 illustrates the information flow between devices of a Global Virtual Network. A central repository comprised of database B200 and file storage HFS200 resides on a Central Server (SRV_CNTRL) 200.

Communication paths between devices labeled P### can represent an API call, database replication, direct file transfer, combination such as database replication through API call, or other form of information exchange. The thicker lines of 13-P100300, 13-P300500, and 13-P100500 represent direct communications between GVN devices which have a peer-pairing and therefore a privileged relationship with each other.

There is circular pattern of peer-pair communication illustrated from SRV_CNTRL 200 to EPD 100 via 13-P200100, to SRV_AP 300 via 13-P200300, or to other devices 13-500 via 13-P200500. The EPD 100 communicates with SRV_CNTRL 200 via 13-P100200, SRV_AP 300 communicates via SRV_CNTRL 200 via 13-P300200, and other devices 13-500 communicate with SRV_CNTRL 200 via 13-P500200.

In some instances, there will be a loop of information shared between devices such as in the case when an EPD 100 may request information via 13-P100200 from SRV_CNTRL 200 which is sent back to EPD 100 via 13-P200100.

In other instances, one device may report information relevant to other devices such as an SRV_AP 200 reporting via 13-P300200 to SRV_CNTRL 200 which it then sends this information via 13-P200100 to EPD 100 and SRV_AP 300 other than the reporting SRV_AP 300 via 13-P200300 and also to other devices 13-500 via 13-P200500.

In yet other instances a full loop is not required such as the sending of log information from a device such as an EPD 100 to SRV_CNTRL 200 via 13-P100200, there is no need to further forward this information onward. However, logging information may at a later time be moved from repository on SRV_CNTRL 200 to a long-term log storage server 13-500 or another device via 13-P200500.

Direct link 13-P100300 is between devices EPD 100 and SRV_AP 300. Direct link 13-P300500 is from SRV_AP 300 to other devices 13-500. Direct links involve communications between devices which do not need involvement of SRV_CNTRL 200.

The Push (feed) from SRV_CNTRL 13-306 from SRV_CNTRL 200 could be an RSS feed or other type of information publishing via 13-P306. The API—Queries to SRV_CNTRL 13-302 making calls to SRV_CNTRL 200 could be either a traditional API transaction or RESTful API call with request made via 13-P302REQ and response received via 13-P302RESP. The PUSH 13-306 and API 13-302 elements are presented to illustrate communication with devices which do not share peer-pair relationships, privileged status, and/or similar systems architecture with GVN devices but which could benefit from information.

FIG. 1 illustrates five types of firewall device operations. Firewall 1-FW0 demonstrates an all-open firewall with some closures shown. Path 1-DP0-2 indicates a flow of traffic which is permitted through the firewall because it is not explicitly blocked. Path 1-DP0-4 demonstrates traffic which is not let through the firewall because it is explicitly blocked.

Firewall 1-FW2 demonstrates an all-closed firewall with some openings shown. Path 1-DP2-4 indicates traffic which is not explicitly allowed to pass through by a rule and therefore is blocked. Path 1-DP2-2 indicates traffic which is explicitly allowed and therefore flows through unimpeded.

Firewall 1-FW4 demonstrates a rules-based firewall with two rules shown. Incoming traffic flows from the Internet 1-D104 via path Incoming 1-DP4 to a table of rules 1-D4 for forwarding or other handling. If the incoming traffic matches one rule, it will flow via path Rule 1-DP4A to LAN 1-D104. If it matches another rule, it will flow via path Rule 1-DP4B to another location in LAN 1-D104.

Firewall 1-FW6 demonstrates firewall operations such as detect & protect with a decision matrix 1-D6 to check if traffic is okay and should be permitted through via path YES 1-DP6Y to LAN 1-D106 or if a threat is detected and the traffic is to be blocked and/or blackholed or otherwise handled via path NO 1-DP6N.

Firewall 1-FW8 demonstrates a firewall with a combination of rules plus detect & protect operations 1-D8 shown. Traffic from Internet 1-D108 can either match rules and flow via rule path Rule 1-DP8A or Rule 1-DP8B of LAN 1-D108, or it can be allowed by a direct & protect filter via path YES 1-DP8Y. If the traffic is not allowed, it will be blocked or blackholed or otherwise handled via path NO 1-DP8N.

Another type of firewall not shown is a combination of Firewall 1-FW0 or Firewall 1-FW2 and Firewall 1-FW8. There are also different kinds of detect and protect firewalls not shown such as Stateful packet inspection (SPI), deep packet inspection (DPI) and other types of firewalls.

Figure 2:
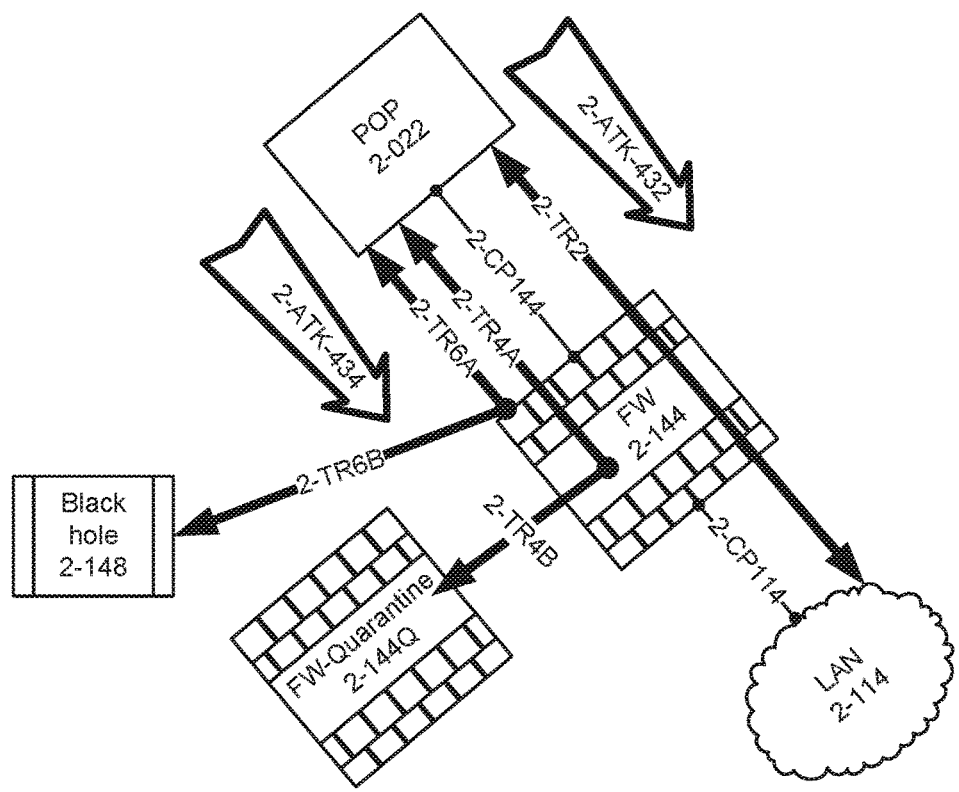
FIG. 2 illustrates traffic flow possibilities through a firewall.

FIG. 2 illustrates traffic flow possibilities through a firewall. The connectivity path between the last mile POP 2-022 and LAN 2-114 is via 2-CP144 from POP to FW 2-144 and via 2-CP114 from LAN 2-114 to FW 2-144. Bad, offending, or known threat traffic to be caught can either be sent to blackhole 2-148 via path 2-TR6A to 2-TR6B or data quarantined in FW-Quarantine 2-144Q via path 2-TR4A to 2-TR4B. Path for good, unchallenged or allowed traffic can flow via 2-TR2. External to internal attack traffic is represented by 2-ATK-434 and 2-ATK-432.

Figure 3:
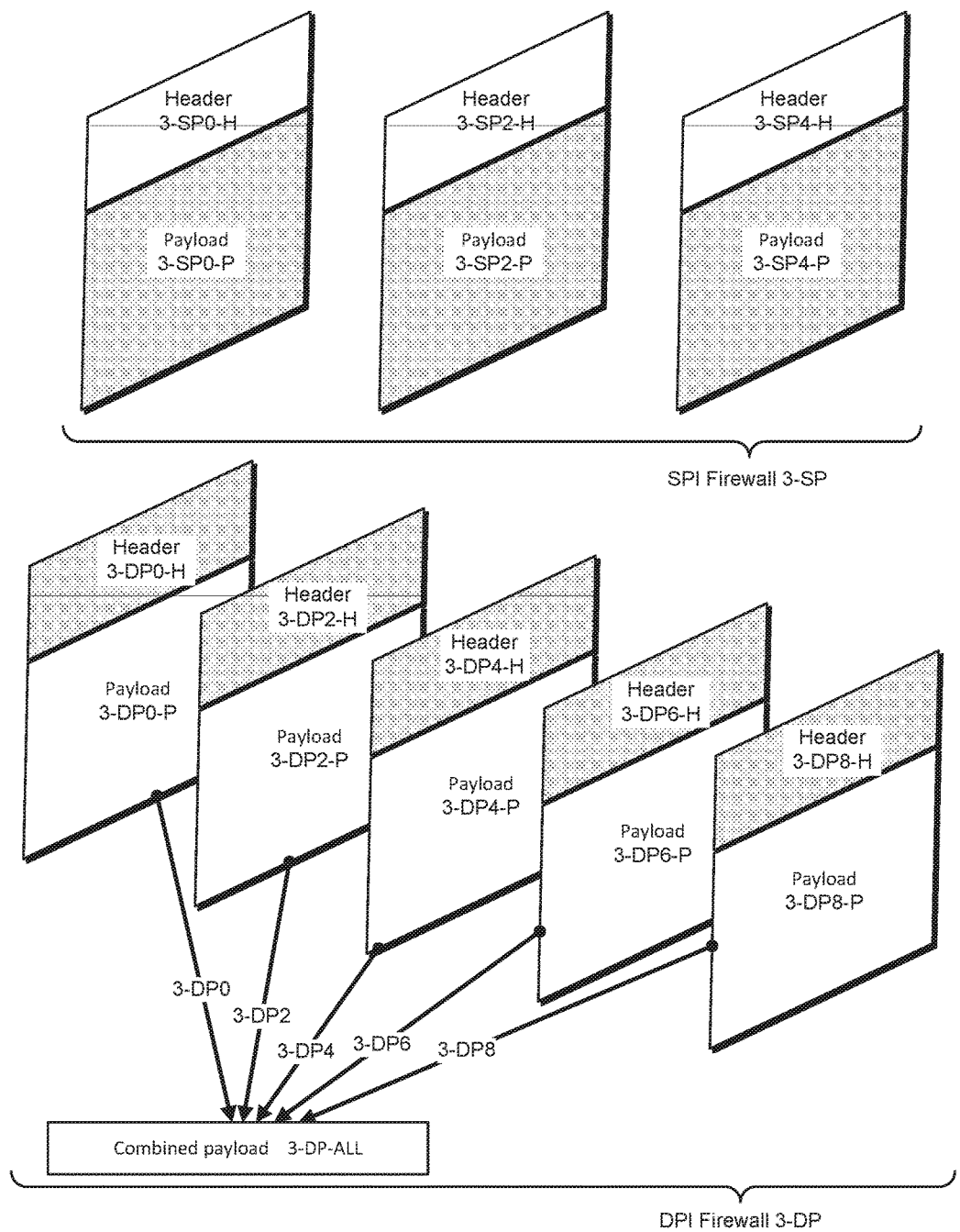
FIG. 3 illustrates stateful packet inspection and deep packet inspection.

FIG. 3 illustrates two kinds of inspection that a firewall can perform: stateful packet inspection and deep packet inspection. In the case where a firewall is within one physical device there exists a choice of whether to do SPI or DPI, as a trade-off of speed versus comprehensiveness. Stateful packet inspection (SPI) is shown in SPI Firewall 3-SP and deep packet inspection (DPI) is shown in DPI Firewall 3-DP.

When performing SPI the firewall examines the headers 3-SP0-H, 3-SP2-H, and 3-SP4-H of packets to identify offending information while it ignores the payload 3-SP0-P, 3-SP2-P, and 3-SP4-P of the packets. The advantages of SPI over DPI are that it is fast and that it consumes lower processor, RAM and resources. The disadvantage is that the firewall does not look at the content within the payload of the packet(s).

DPI looks beyond headers 3-DP0-H, 3-DP2-H, 3-DP4-H, 3-DP6-H, and 3-DP8-H and examines the content, e.g. payload 3-DP0-P, 3-DP2-P, 3-DP4-P, 3-DP6-P, and 3-DP8-P of the packets. The advantages are that this examination is more comprehensive in providing visibility into content both within the payload of not just one packet but from a compilation payload 3-DP-ALL from a series of multiple packets 3-DP0, 3-DP2, 3-DP4-H, 3-DP6, and 3-DP8. The disadvantage of DPI is that it is significantly slower than SPI and also that it consumes considerably more processor, RAM, and other resources than SPI.

Figure 4:
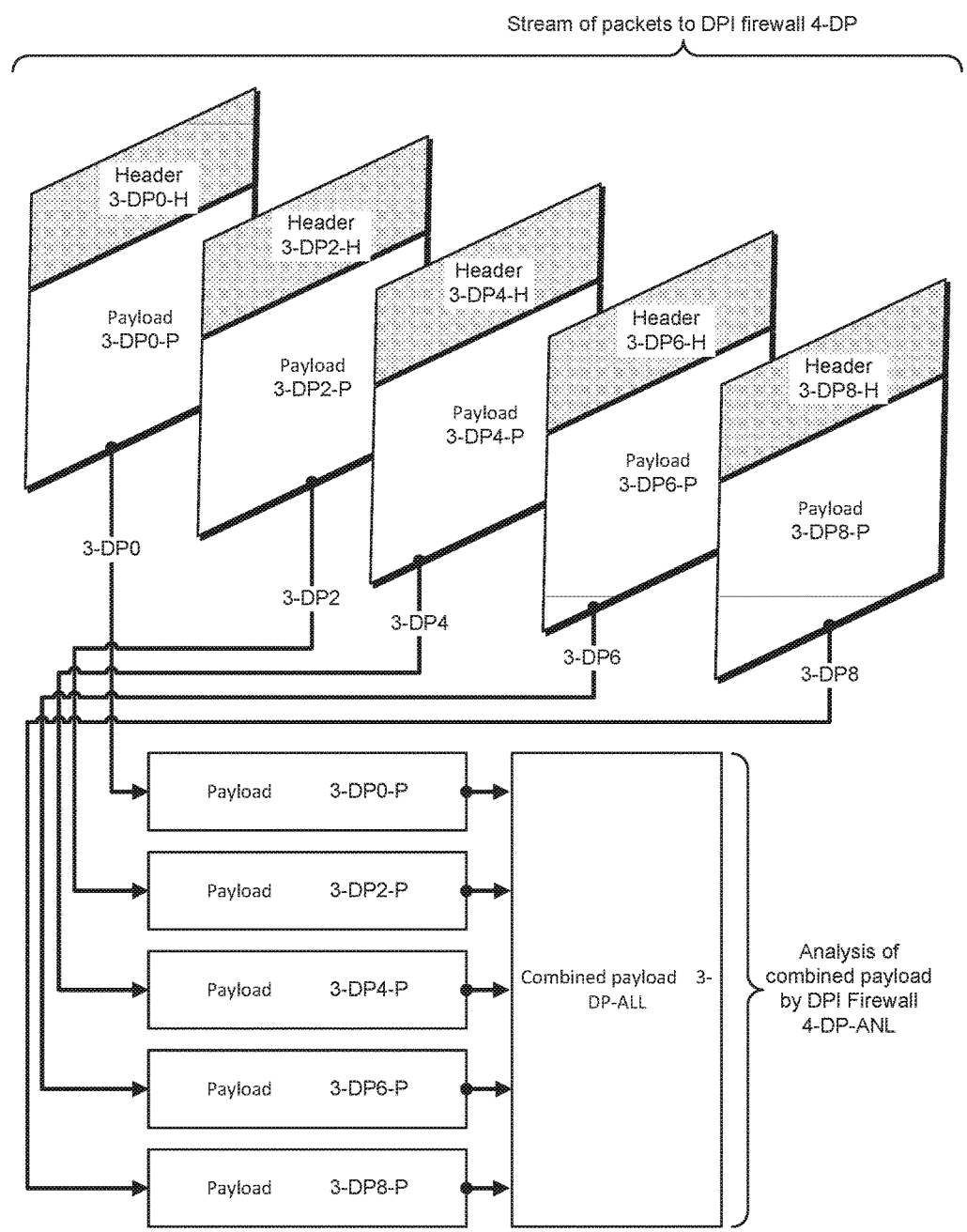
FIG. 4 illustrates the generation of a combined payload from a stream of packets.

FIG. 4 illustrates the generation of a combined payload from a stream of packets. In this example, a stream of packets 4-DP is presented to a DPI firewall. The payloads 3-DP0-P6, 3-DP2-P6, 3-DP4-P6, 3-DP6-P6, and 3-DP8-P are joined into the combined payload 3-DP-ALL which is then analyzed by DPI Firewall 4-DP-ANL.

Deep packet inspection operates by examining the payload of one or more packets. It looks closely at the contents of the payload and can be searching for: a search string, a known virus signature or a heuristic signature indicative of a virus, malware patterns, malformed binary blobs masquerading as a different data types, or other threats, known or unknown.

Figure 5:
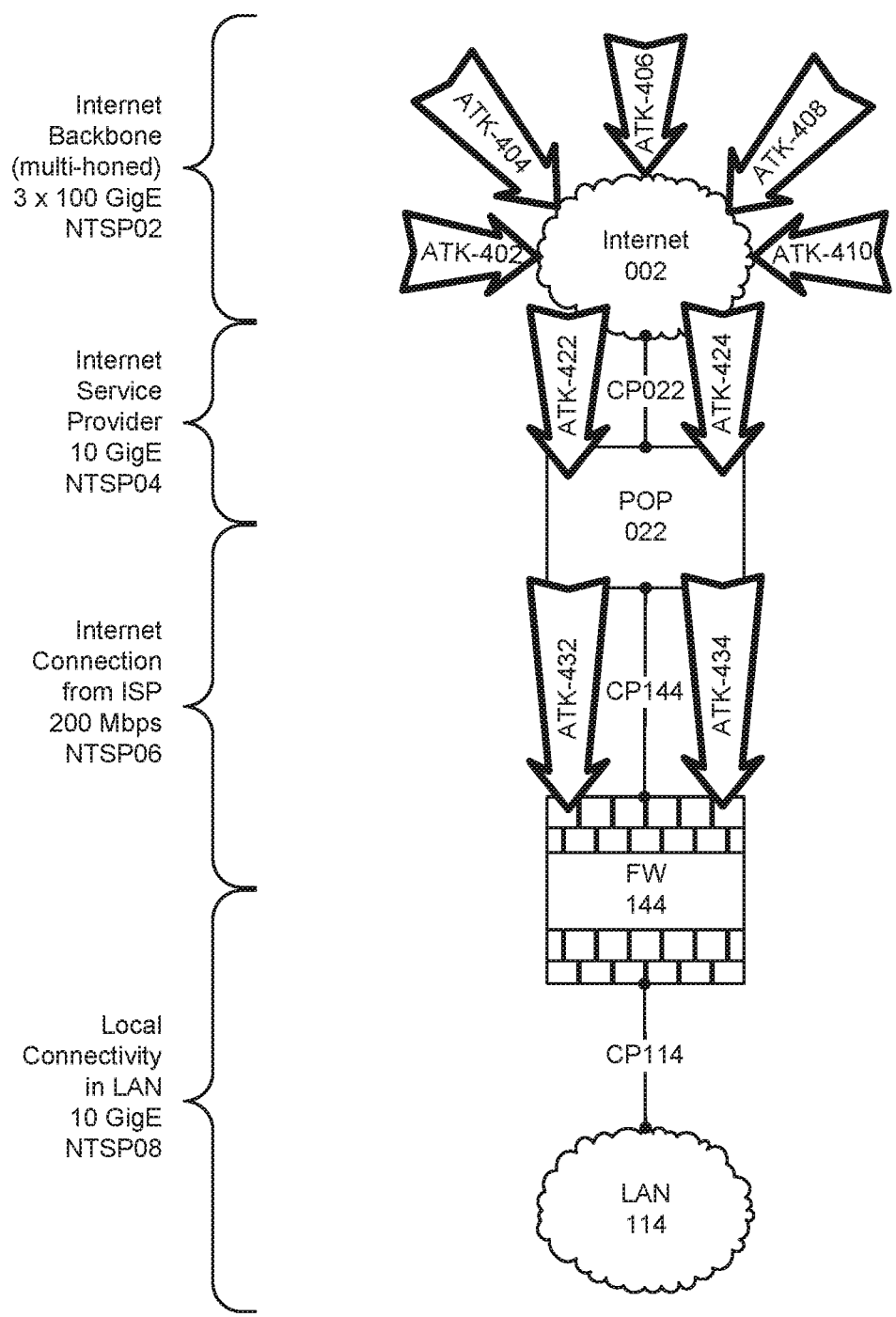
FIG. 5 illustrates a broad based network attack path from the Internet to a LAN.

FIG. 5 illustrates a broad based network attack path from the Internet 002 to a LAN 114. This figure shows the relative pipe size or bandwidth of each network segment. An internal LAN NTSP08 may be running at a speed of 10 GigE. This network segment includes the connection CP114 between the ISP's POP 022 and the internal firewall FW 144. The local ISP's network NTSP04 may also be 10 GigE. This network segment includes the connection CP022 between the Internet and the ISP's POP 022. The speed of the Internet backbone network NTSP02 will generally be significantly faster, such as a multi-honed 3*100 GigE network.

However, the "last mile" connection network NTSP06 between the client firewall FW 144 and POP 022 of the ISP will generally be much slower. For example the connection CP 144 between FW 144 and POP 022 may be a 200 Mbps connection, rather than the faster 10 GigE speed of either NTSP04 or NTSP08. Because this connection has less bandwidth, e.g. is slower, this connection can easily be saturated by a coordinated internet-based attack. The ISP's POP 022 can become saturated as well, affecting not just this client's connectivity but others' as well.

Figure 6:
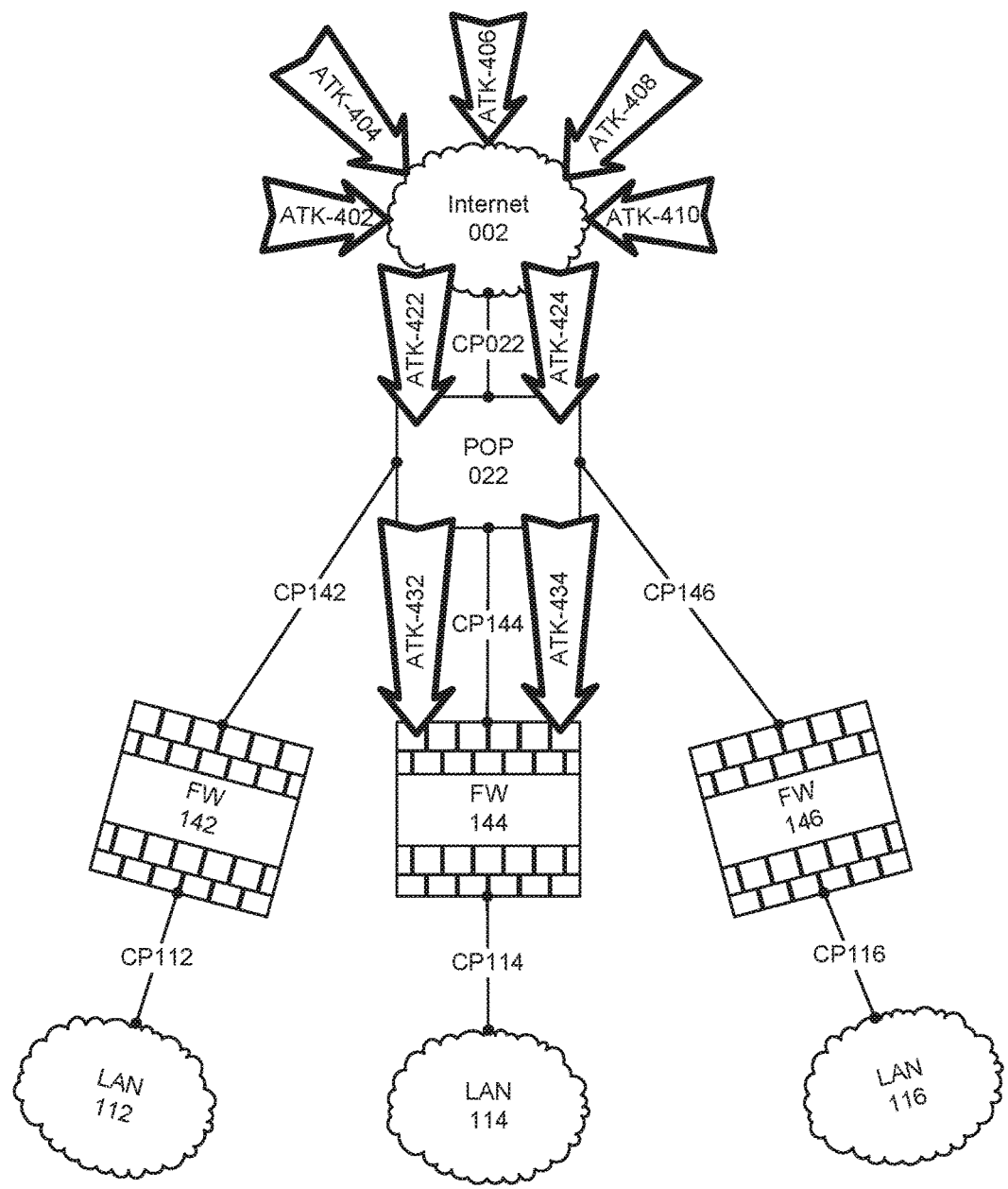
FIG. 6 shows negative blowback effects on a network due to a high-traffic-volume attack occurring on an opposing network.

FIG. 6 shows negative blowback effects on a network due to a high-traffic-volume attack occurring on an apposing network. When path CP144 is oversaturated with attack traffic ATK-432 and ATK-434, this may have a negative effect on apposing networks paths CP142 (connecting to firewall FW142 and path CP112 to LAN 1120) and CP146 (connecting to firewall FW146 and path CP116 to LAN 116). This is due to the close proximity of CP142 and CP146 with CP144 and their shared up-stream paths through POP 022.

The negative effects on CP142 and CP146 could be due to congestion of ports on shared switches with CP144 as well as other factors. In addition, congestion issues in the pipe CP022 from the Internet to the POP 022 affects all traffic between the ISP's POP 022 and the Internet 002. Congestion issues POP 022 also can affect flow of traffic through the POP and saturate ISP bandwidth, thereby negatively impacting device traffic throughput.

Although CP142 and CP146 may not be directly attacked, they will still be adversely affected by attacks on CP144 through the common POP 022 and path CP022.

Figure 7:
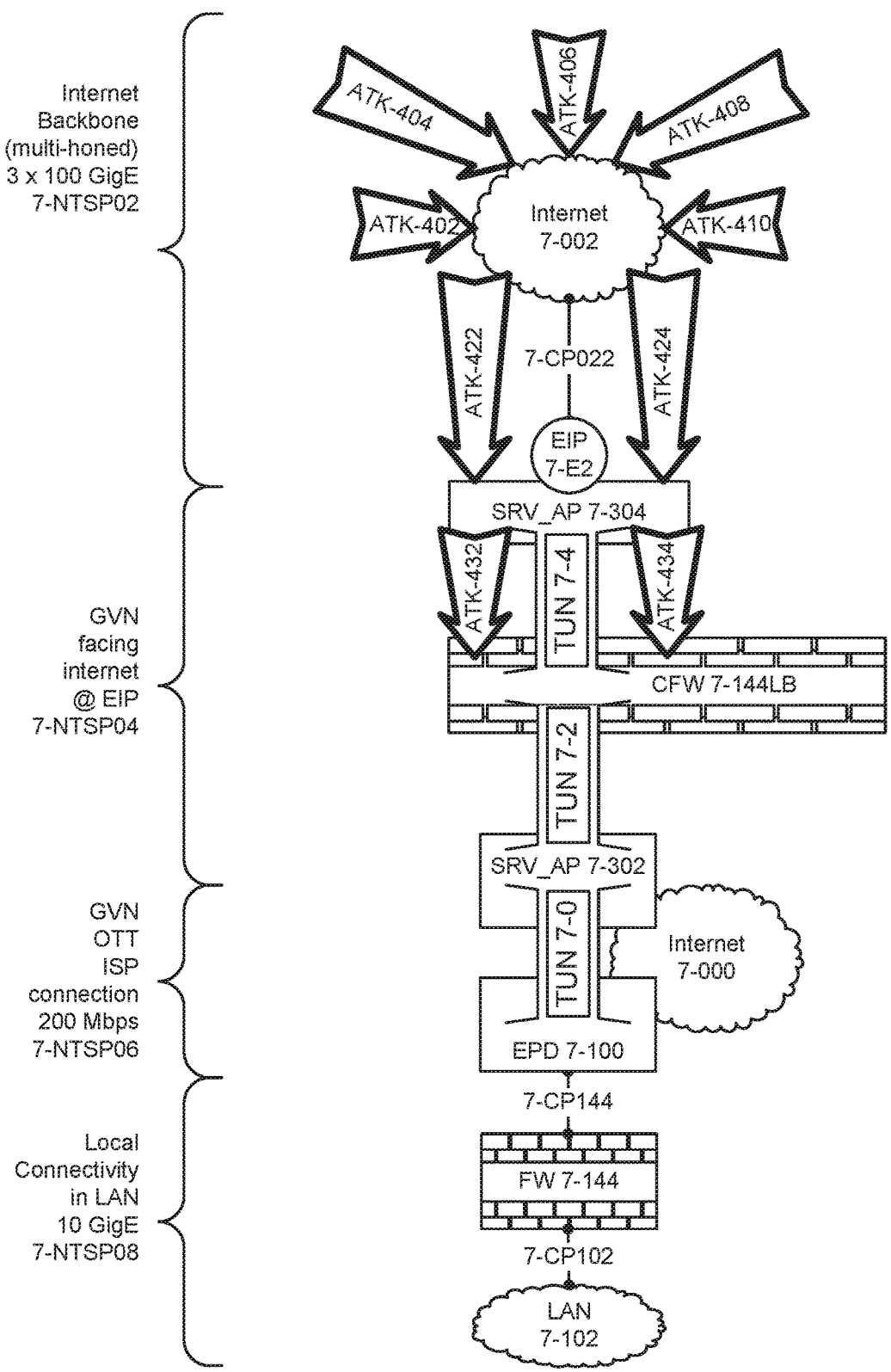
FIG. 7 illustrates a multi-perimeter firewall located in the cloud.

FIG. 7 illustrates a multi-perimeter firewall located in the cloud. Locating a multi-perimeter firewall in the cloud has the advantage of identifying and isolating problem traffic at a point upstream from the location of a traditional firewall. By deploying a multi-perimeter firewall in the cloud CFW 7-144LB, problem traffic is identified and isolated on the ISP's backbone network 7-NTSP02. The problem traffic is diverted and does not reach the "last mile" connection network 7-NTSP06. This means that the slow 200 Mbps "last mile" connection network 7-NTSP06 is insulated and protected from the high volume of traffic from multiple concurrent attack vectors present on the faster 3×100 GigE backbone network 7-NTSP02.

Figure 8:
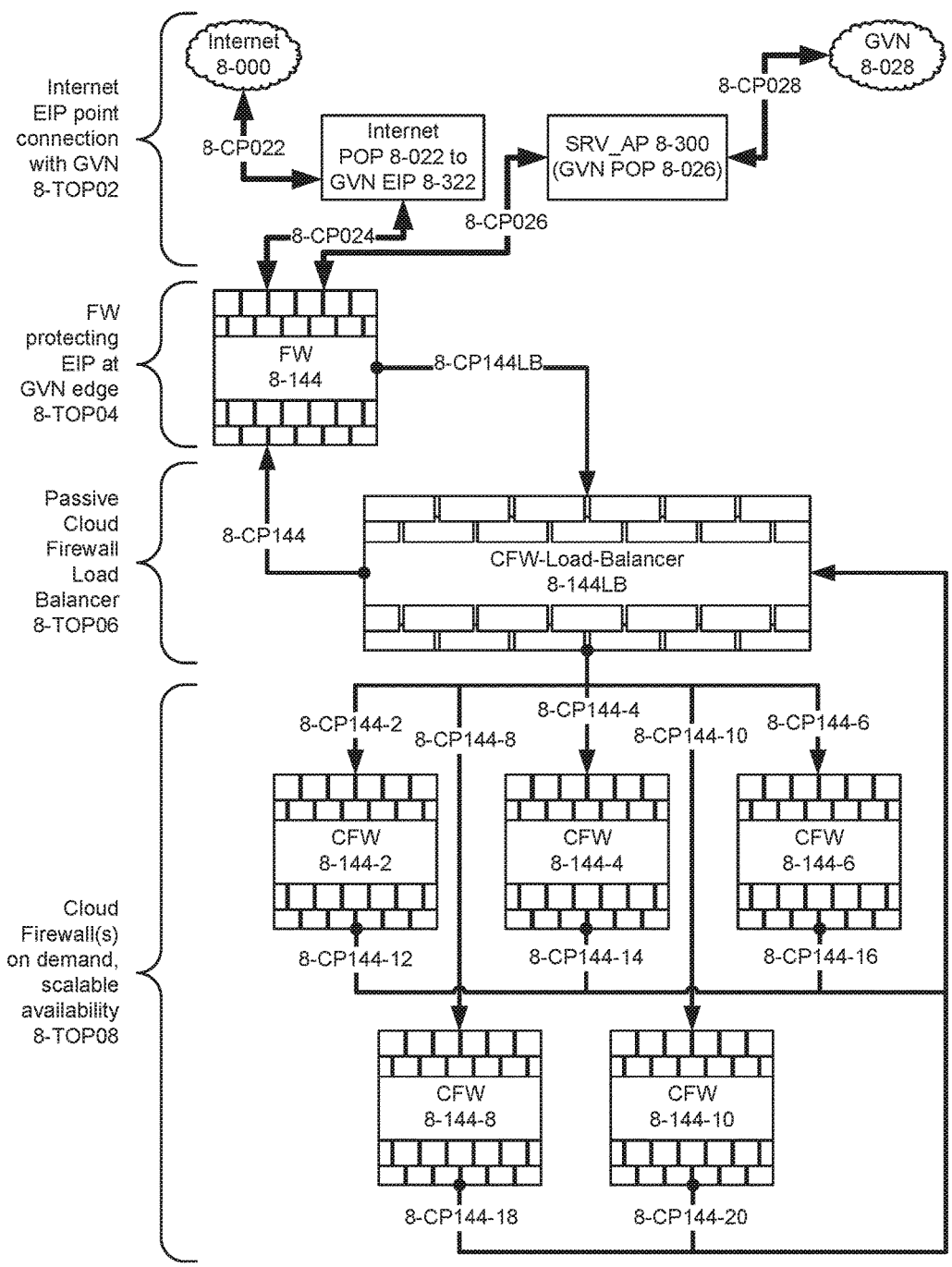
FIG. 8 illustrates the scalability of a multi-perimeter firewall located in the cloud.

FIG. 8 illustrates the scalability of a multi-perimeter firewall located in the cloud and demonstrates how a feature like a distributed firewall (FW) in the cloud can be enabled by a GVN. Cloud based firewalls are dynamically scalable via cloud firewall load balancing mechanisms that can bring more resources online as needed. Because of the nature of a GVN's topology, device-to-device communications, and secure traffic path, a firewall mechanism can be cloud based and also can be virtualized. Firewall 8-144 is located in cloud between the Internet 8-000 and GVN 8-028. Firewall 8-144 can include a cloud firewall (CFW) load balancer 8-144LB which will be able to allocate cloud firewall resources such as 8-144-2, 8-144-3, and so on as needed. This on demand scalability offers many advantages to clients of a GVN.

First, by absorbing the hits of the attacks for incoming threats in the cloud, the client's last mile connectivity is not affected. Second, combining a cloud firewall with a control node and analyzer allows for the firewall in the region under attack to be aware of the nature, source, signature and other features of the attack so that the firewall can be aware of and be prepared to thwart the attack if the target shifts to a different client network. Furthermore, information about past and current attacks can be shared via the neutral API mechanism (NAPIM) of the GVN to other CFW instances, so that global threat awareness is possible.

Finally, as shown below in FIG. 12, a cloud firewall offers the advantage of running different firewall mechanisms, such as SPI and DPI, simultaneously.

Figure 9:
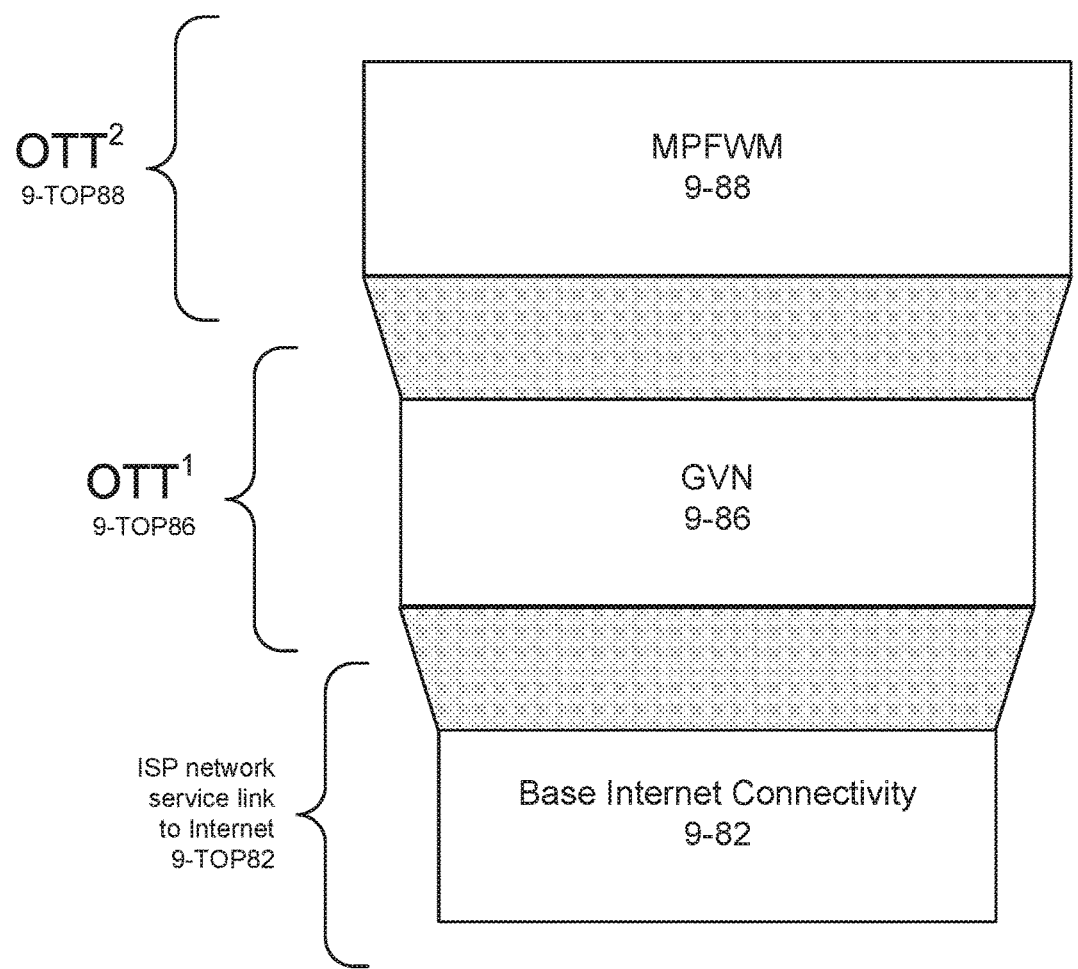
FIG. 9 illustrates a multi-perimeter firewall on top of a GVN which is on top of an Internet connection.

FIG. 9 illustrates a multi-perimeter firewall over the top (OTT) of a GVN which is itself over the top (OTT) of an Internet connection. This figure demonstrates layered functionality built over the top (OTT) of other layered functionality. For example, a multi-perimeter firewall (MPFWM) 9-88 which is $OTT^2$ 9-TOP88 of a global virtual network (GVN) 9-86. The GVN 9-86 is $OTT^1$ 9-TOP86 of the Base Internet Connectivity 9-82 at the layer ISP network service link to Internet 9-TOP82.

$OTT^2$ is second degree over-the-top meaning that something is over-the-top of something which is itself $OTT^1$ over-the-top of something else.

Figure 10:
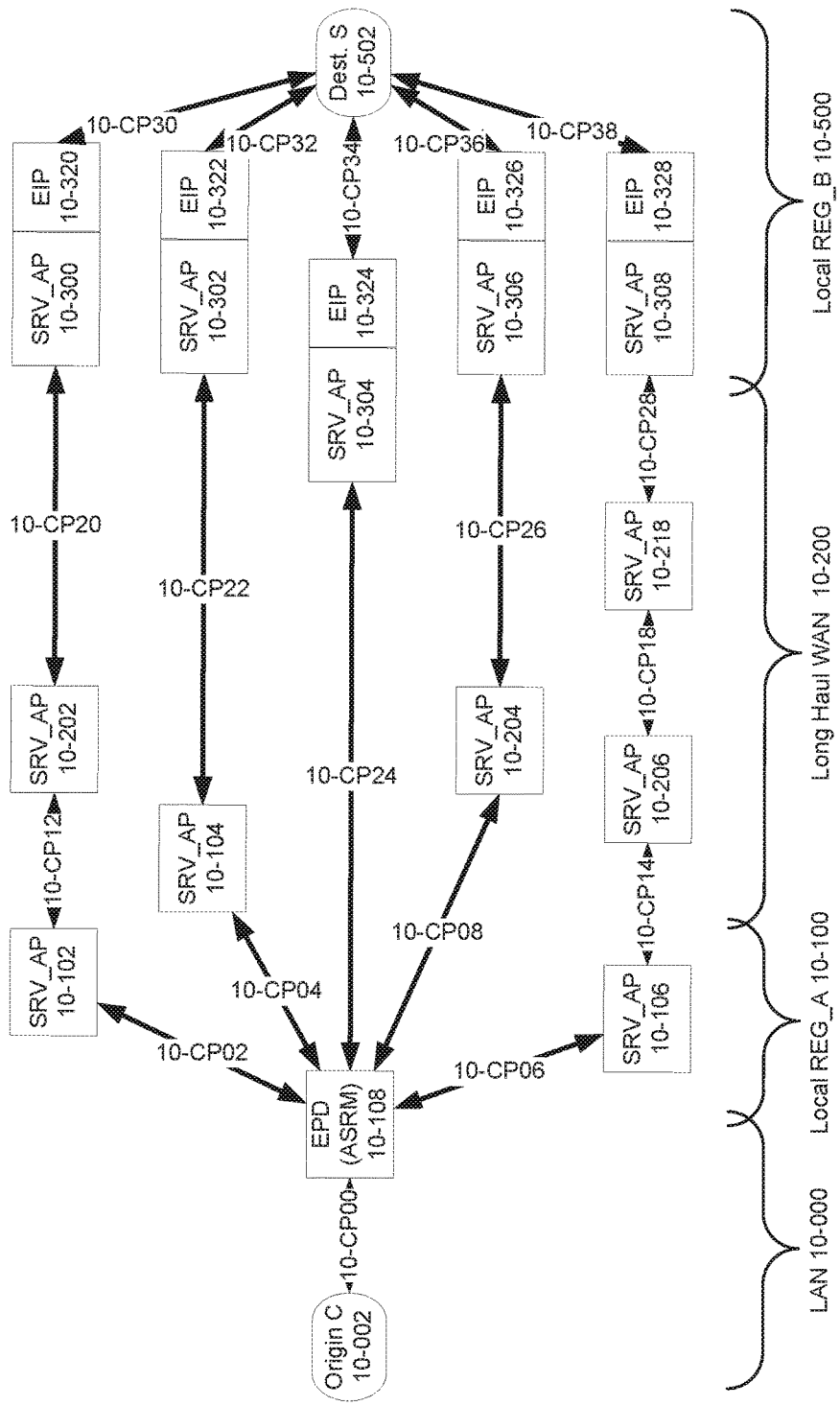
FIG. 10 is a flow chart of the various routes available through a GVN from an origin to a destination.

FIG. 10 is a flow chart of the various routes available through a GVN from an origin C 10-002 to destination S 10-502. There can be many more possible combinations that are not shown or discussed.

Path 10-CP00 from the Client C 10-002 to the EPD 10-108 can be used to measure the performance from the client through the LAN to the EPD. Matching of best routes is achieved after tests and evaluating real-time data of available paths. GVN ingress is from EPD 10-108 via first hop 10-CP00 to an access point server (SRV_AP) 10-102, 10-104, 10-106, 10-202, 10-204. Paths from EPD 10-108 to a first SRV_AP can be defined as the ingress point from the EPD 10-108 into the GVN and measured accordingly. Internal hops from SRV_AP to SRV_AP follow internal routes which always try to maintain the best path connectivity. These routes could be OTT internet, over backbone, over dark fiber, or other related routing. Best egress points out of the GVN are also kept track of locally, in that remote region and also holistically for the entire network segment from origin to destination.

Tests can be run on each segment, combinations of segments, and the total network path from end to end taking into account various factors to evaluate. Traffic type and path determination can be depending on data attributes and profile QoS requirements. The main path choice is always based on best factors for traffic over path. A function of this mechanism is to match paths between destination and origin to flow for best possible bidirectional route.

The heart of advanced smart routing (ASR) within a GVN is an index stored on disk, in memory, or in a database table. The index contains a list of IP addresses to keep local and will exit via an EIP in the same region. For traffic through a GVN to other regions, routes via SRV_AP devices and paths are determined by Server Availability Matrix (SAM) and ASR. The index stores a list of targets matching target IP address to best egress/ingress points (EIP) in that region. In addition a table of country IP addresses mapped to regions as CIDR IP blocks or other type of notation can assist in the determination of best egress points.

For traffic flowing in the direction of Origin C 10-002 from Dest. S 10-502, the first EIP 10-320, 10-322, 10-334, 10-326, or 10-328 is the initial boundary between the GVN and the Internet, other networks (such as LANs), backbone pipes, or others. An SPI firewall can be located in the GVN behind this initial entry point demarking the first, outer perimeter. At the next SRV_APs or at other SRV_APs such as SRV_AP 10-102, 10-104, 10-204, and 10-206, a second perimeter of trailing DPI firewalls can be located. The client can also run an inbound SPI or DPI firewall in their own network if they want at segment 10-CP00.

For traffic flowing in the direction of Dest. S 10-502 from Origin C 10-002 though EPD 10-108, the first SPI/DPI firewalls can be located between the Origin C 10-002 and EPD 10-108 along path 10-CP00. A second perimeter of firewalls can be located on SRV_APs such as 10-102, 10-104, 10-204, and 10-106 to protect outbound traffic.

For traffic from the internet, cloud scalability is very important because it can handle the peak load of a distributed, multi-honed traffic when needed by scaling up resources allocation. When activity is relatively quiet, a minimal amount of resources can be committed. The scalability of resources is not as critical of a factor for outbound traffic to the internet. In most cases, the LAN network will have greater bandwidth than the network uplink. Scalability is less critical due to the nature of threats from within a LAN/DMZ/network under control of the network administrator(s).

Figure 18:
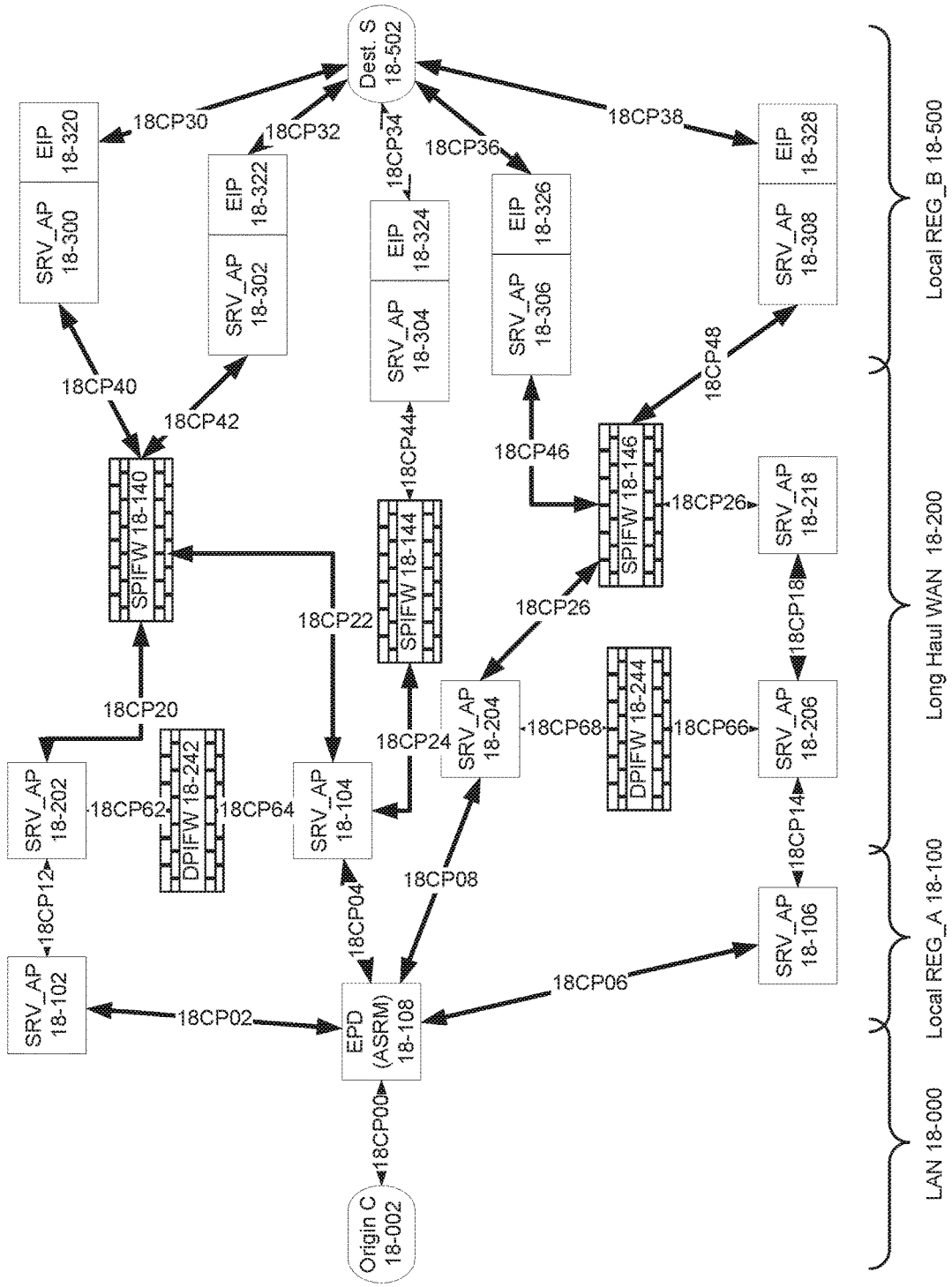
FIG. 18 illustrates the topology and corresponding placement of firewalls along with the scalability afforded by cloud based firewalls linked by cloud based firewall load balancers.

FIG. 18 illustrates the topology and corresponding placement of firewalls along with the scalability afforded by cloud based firewalls linked by cloud based firewall load balancers. This figure is similar to FIG. 10 with the additional placement of various SPI and DPI cloud-based firewalls within the flow of traffic via a series of paths through a GVN or other type of network paths.

Stateful packet inspection firewalls (SPI) are devices through which the traffic flows. Deep packet inspection firewall (DPI) devices can either be flow through or can analyze cloned copies of traffic offering the option for DPI functionality as a trailing indicator. If harmful traffic is detected, it can subsequently be blocked once identified. A benefit of the communication between devices is that information about bad traffic sources identified by DPI firewalls can be messaged to SPI firewalls to be blocked there.

Figure 11:
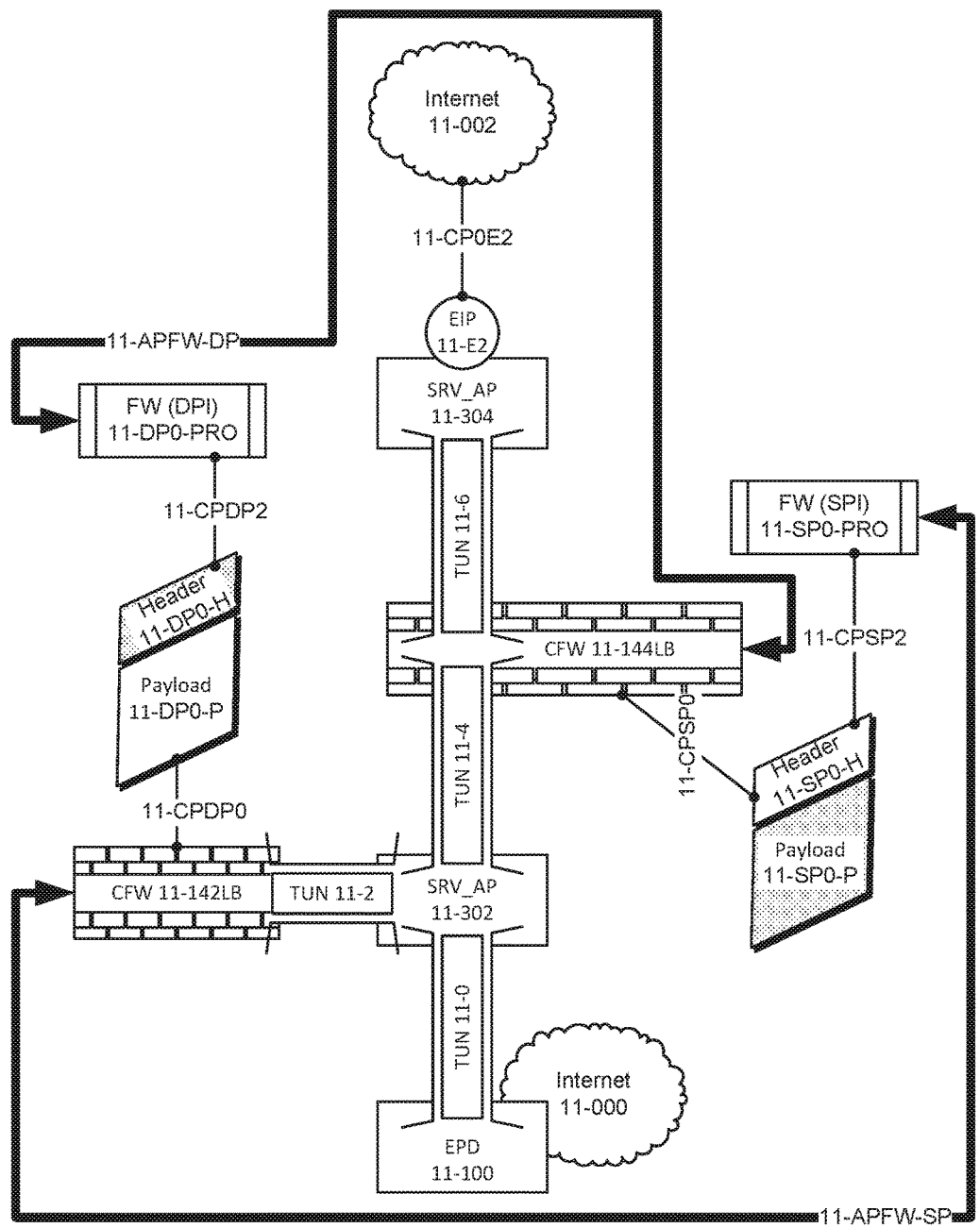
FIG. 11 illustrates communication between a stateful packet inspection (SPI) firewall and a deep packet inspection (DPI) firewall.

FIG. 11 illustrates communication between a stateful packet inspection (SPI) firewall and a deep packet inspection (DPI) firewall. This figure shows the path from an end point device (EPD) 11-100 to the Internet 11-002 via the path TUN 11-0 to a first access point server (SRV_AP) 11-302 then to a cloud firewall load balancer (CFW_LB) device 11-144LB via TUN 11-4, and then to SRV_AP 11-304 via TUN 11-6. From SRV_AP 11-304 traffic egresses the GVN via egress ingress point (EIP) 11-E2 to the internet 11-002.

EIP 11-E2 is the edge of the extended LAN into the cloud between the GVN and the internet 11-002. The EIP can link to both the open internet or to an organization's cloud-based assets including servers, storage arrays, and other devices. It can also be a link to a hybrid public-private cloud acting like a DMZ or perimeter network in the cloud.

Traffic through SRV_AP 11-302 can be a diversion of traffic or as cloned traffic in a duplicate stream and passed via path TUN 11-2 to cloud load balancer 11-142LB. A cloned stream of traffic offers trailing results of time- and resources-expensive detection operations such as DPI without impeding the speed of the flow of traffic. Return traffic from Internet 11-002 back to EPD 11-100 follows the reverse path ingressing into the GVN via EIP 11-E2.

For internet-based traffic, the first perimeter is the CFW 11-144LB which sends packets via the paths 11-CPSP0 and 11-CPSP2 to the Stateful packet inspection firewall FW (SPI) 11-SP0-PRO where the headers of the packet 11-SP0-H are inspected. SPI firewalls offer fast traffic flow-through and demand relatively lower resources than DPI firewalls.

The second perimeter is at CFW 11-142LB and this is where the deep packet inspection firewall FW (DPI) 11-DP0-PRO can inspect the payloads 11-DP0-P of one or more combined packets. DPI firewalls offer more in-depth analysis. If payload shows a problem, then the source, target, and other information from the headers can be noted.

Communication between SPI firewalls and DPI firewalls can therefore be useful. The FW (SPI) 11-SP0-PRO may send information from real-time detections via path 11-APFW-SP to the cloud firewall load balancer CFW 11-142LB to alert it to any threats that it has detected by header inspection. In addition to sharing the offending headers detected, the payloads 11-SP0-P will also be included when conveying information to CFW 11-142LB and 11-DP0-PRO. The FW (DPI) 11-DP0-PRO may send information via path 11-APFW-DP to the cloud firewall load balancer CFW-11144LB to alert it to any threats that it has detected by payload inspection. The information it shares can also be from header 11-DP0-H so that the SPI firewall detection operations by 11-144LB and/or 11-SP0-PRO can add the offending headers to its list of traffic offenders.

Figure 12:
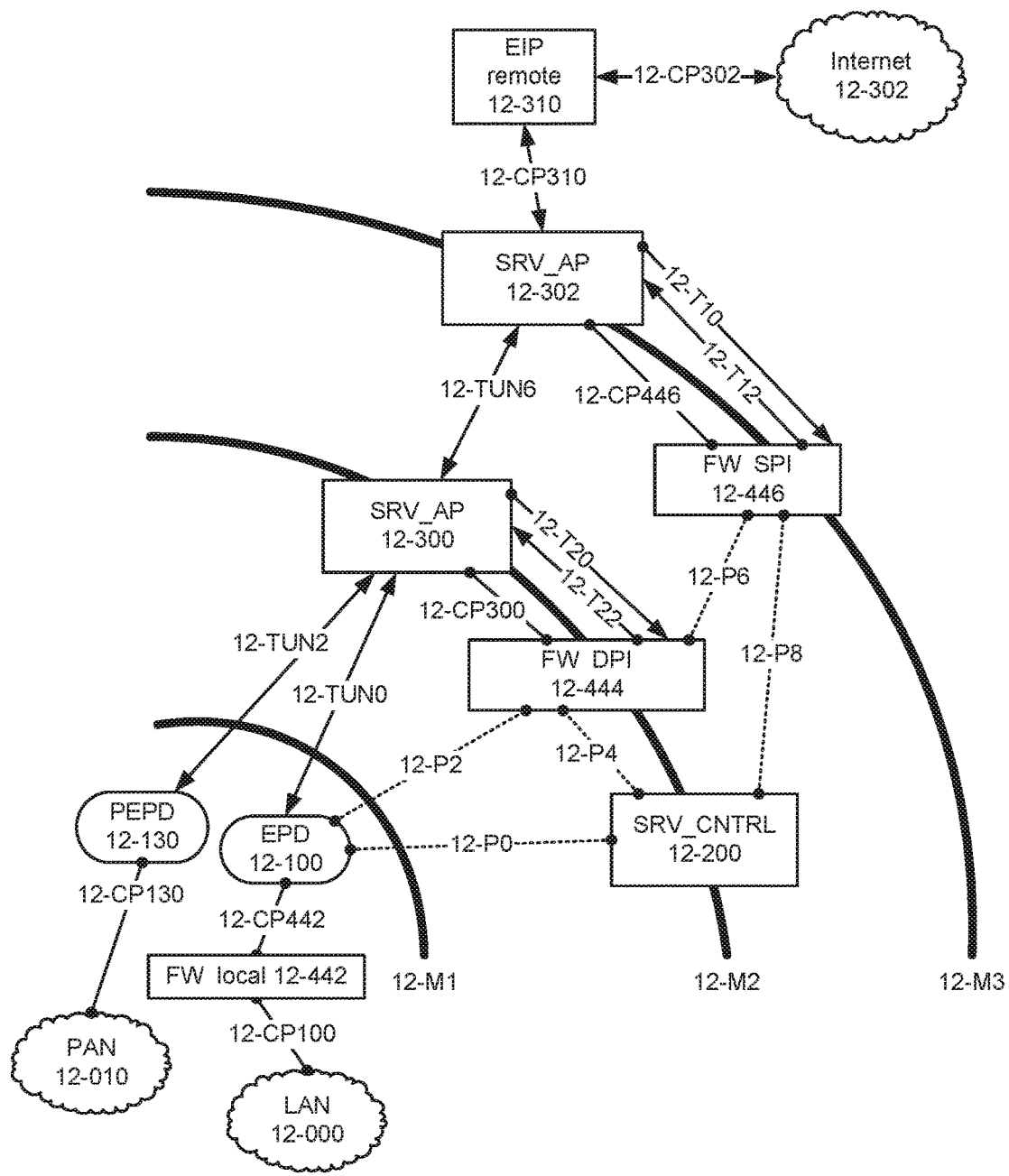
FIG. 12 illustrates a multi-perimeter firewall (MPFW) in the cloud enabled by a global virtual network.

FIG. 12 illustrates a multi-perimeter firewall (MPFW) in the cloud enabled by a global virtual network (GVN). The GVN tunnel 12-TUN0 is over the top (OTT) of the internet between an end point device (EPD) 12-100 and an access point server (SRV_AP) 12-300 in close proximity to the EPD 12-100.

The three perimeters indicated in this example embodiment are 12-M1 which denotes the boundary between a client location and their link to the internet, 12-M2 which is a boundary in the cloud at a datacenter in close proximity to SRV_AP 12-300, and 12-M3 which is another boundary at either the same data center as SRV_AP 12-300 or at another location in close proximity to SRV_AP 12-302, possibly in another region.

Figure 14:
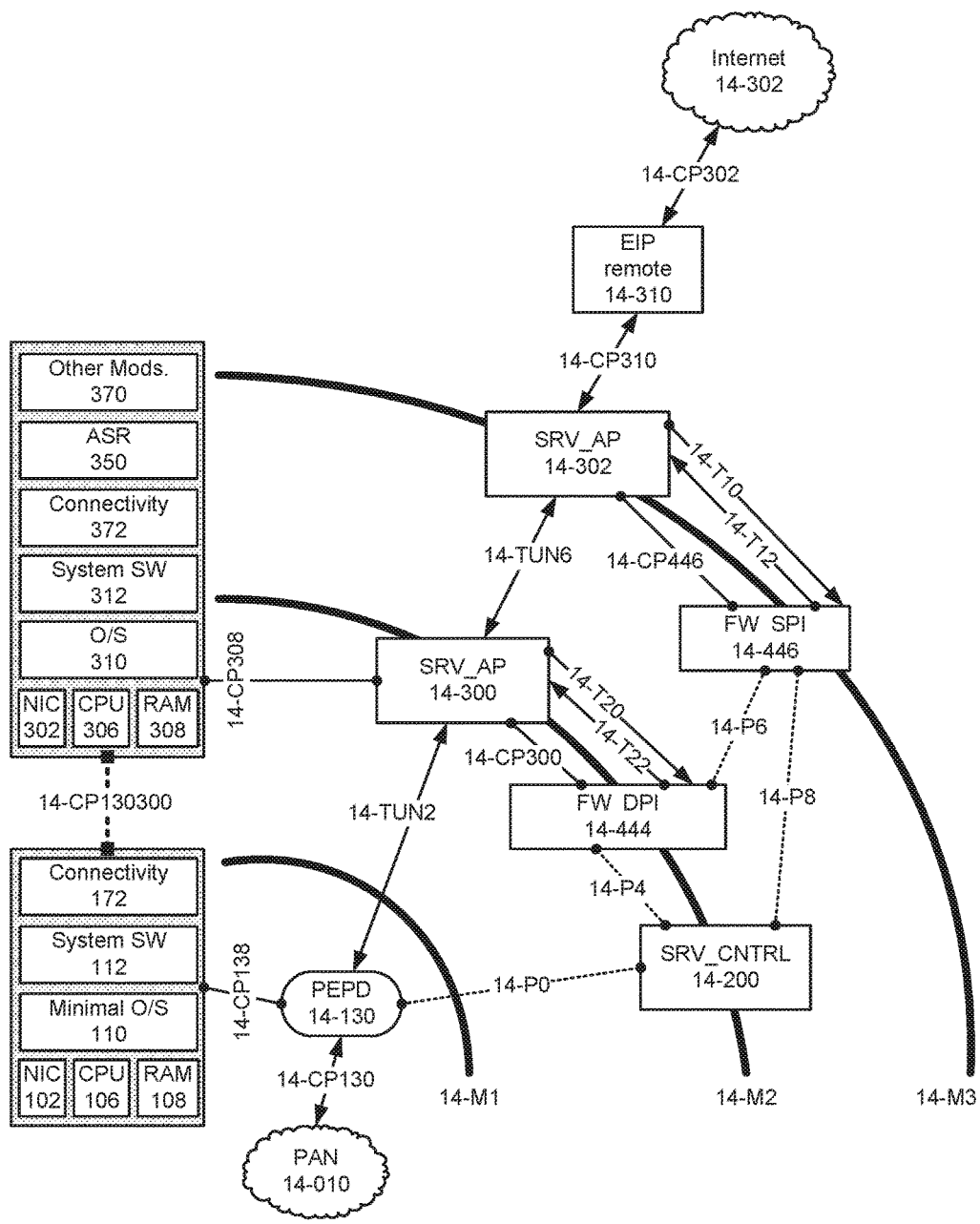
FIG. 14 illustrates a multi-perimeter firewall (MPFW) in the cloud supporting a personal end point device.

The tunnel 12-TUN2 is similar to 12-TUN0 and different in one respect in that it connects a personal end point device (PEPD) 12-130 which can be mobile and therefore connects to SRV_AP 12-300 through public access wireless or wired or other networks to integrate into the GVN. A PEPD 12-130 may be less powerful than an EPD 12-100 and consequently shift processing operations to the SRV_AP as shown in FIG. 14 below.

Each SRV_AP 12-300 and SRV_AP 12-302 may represent one or more SRV_AP devices through which the EPD 12-100 and/or EPD 12-130 may concurrently connect with via one or more multiple tunnels.

There are three types of firewall described in this example embodiment. Local firewall FW local 12-442 is an example of a firewall which a client may use to protect their local area network (LAN) from internet based threats. This is typically located between the EPD 12-100 and the LAN 12-000. Local firewall FW local 12-442 may offer features such as IP address and port blocking, forwarding, and other functionality. The other two types of firewall illustrated are FW SPI 12-446 located at 12-M3 which provide stateful packet inspection (SPI) and FW DPI 12-444 located at 12-M2 which provides deep packet inspection (DPI).

The difference between SPI and DPI has to do with a tradeoff in performance versus comprehensiveness of visibility. SPI examines the headers of packets to look for malformed information, or for patterns, or to match IP address or port or other information from its list of known threats against the current flow of packets. DPI as its name implies takes a deeper look at the whole packet and in the case of a multi-part, multi-packet transmission, will look at the compilation of a series of a packets to gain insight into the data being transferred.

All firewalls can be configured to investigate and apply rules to both incoming and outgoing traffic, and provide other related functionality. In many cases, with traditional firewall such as FW 12-442, administrators have to choose between the efficiency of SPI vs. the thoroughness yet resource and time intensive requirements of DPI.

A GVN offers the opportunity to distribute both types of packet inspection at various points in the cloud. In addition the GVN allows for the distributed firewalls to be operating in lockstep with each other, without impeding the flow of traffic.

By locating FW SPI 12-446 at 12-M3, the closest edge to the Internet 12-302 via EIP remote 12-310, the bulk amount of attack traffic from known source IP addresses or with recognized malicious headers can be thwarted. Traffic flows from SRV_AP 12-302 to FW SPI 12-446 via 12-T10 and back via 12-T12. FW SPI 12-446 can be a CFW load balancer (see FIG. 11) which has plenty of resources available on demand. SRV_AP's at 12-M3 can be on a multi-honed backbone with a large bandwidth (BW) capacity. Therefore, at this first perimeter, attacks can be caught, protecting bandwidth within the GVN.

At the next perimeter 12-M2, the FW DPI 12-444 can have all traffic flow through or just receive a cloned copy of traffic via 12-T20 from SRV_AP 12-300 and it may or may not return traffic via 12-T22. The key point is that the DPI feature can be a trailing indicator allowing certain traffic through but analyzing and recording the results. This FW DPI 12-444 can also be a CFW which is load balanced with resources available on demand as needed to cope with large scale events when needed without individual clients having to administer or bear the cost burden for maintaining the infrastructure during normal times.

The information from FW SPI 12-446 and FW DPI 12-444 can be shared via internal communications path 12-P6 which may be carried by the NAPIM of the GVN, through a GVN tunnel, through a GVN back channel, or via other communications pathway(s). Each FW mechanism also shares information with the central control servers (SRV_CNTRL) 12-200 of the GVN. This information can be relayed to other FW SPI and FW DPI around the world so that attack vectors, sources, payloads, and other related information can be made available in a database or other information index so that SPI and DPI FW can have a point of reference to check against. This permits more efficiencies of scale as the global distribution of info provides an added safety net.

The catching of offending traffic outside of a client LAN and in the cloud protects the client's last mile internet connectivity from being saturated by unwanted traffic. Offloading of traffic to CFW which are scalable also offers many advantages to clients.

The FW local 12-442 may be a standalone device, a software application (APP) running inside of the EPD 12-100, or other kind of FW device. The FW SPI 12-446 and FW DPI 12-444 devices and related devices such as load balancers, cloud firewalls, or other devices may be custom made or can be off the shelf provided by other vendors. These devices must be able to receive and forward traffic, identify threats and most importantly to be able to communicate their threat findings and to receive threat profiles and other information from other devices.

As the threat data accumulates, analysis can be made of the content, the patterns, the attack vectors, and other information gathered by the FWs. This analysis can provide a basis through which heuristic analysis can be applied to new potential threats.

This can only be achieved by the secure network optimization (SNO) services of a GVN or similar network which consists of related devices connected both by secure tunnels and communication paths.

FIG. 14 illustrates a multi-perimeter firewall (MPFW) in the cloud supporting a personal end point device. This figure is similar to FIG. 12 but shows portable devices which would hook into the GVN from a mobile location and where 14-M1 boundary is the edge between a personal area network PAN 14-010 and the GVN.

This figure shows the topology of a personal end point device (PEPD) 14-130 with some of its connectivity and other functionality distributed in the cloud. This figure further describes firewall operations distributed into the cloud along with those other operations performed in the cloud on behalf of a local device such as a personal end point device (PEPD) 14-130. Where a PEDP 14-130 is a less powerful and more portable device than an end point device (EPD), it can still take advantage of the personal area network connectivity optimization afforded by a GVN, including features such as advanced smart routing (ASR), multi-perimeter firewalls, and more.

The key point illustrated is that the personal device spreads its need for processing power into the cloud. The modules residing on the PEPD include hardware components for processor CPU 106, memory RAM 108, and network interface NIC 102. The operating system is a minimal O/S 110 to provide a platform for system software System SW 112 and a Connectivity 172 module. This basic configuration is enough to allow the PEPD 14-130 to build a tunnel 14-TUN2 between itself and an access point server SRV_AP 14-300.

The component parts at the SRV_AP 14-300 hardware components for processor CPU 306, memory RAM 308, and network interface NIC 302. The operating system O/S 310 is a more extensive install than O/S 110. O/S 310 provides a platform for system software System SW 312 and a Connectivity 372 module for the SRV_AP 14-300. Advanced smart routing (ASR) 350 module and other modules 370 offer functionality both to the SRV_AP 14-300 and to the connected PEPD-14-130.

The PEPD 14-130 may be dependent on the tunnel 14-TUN2 to be up and able to carry traffic to realize cloud based ASR, FW and other operational functionality.

Figure 15:
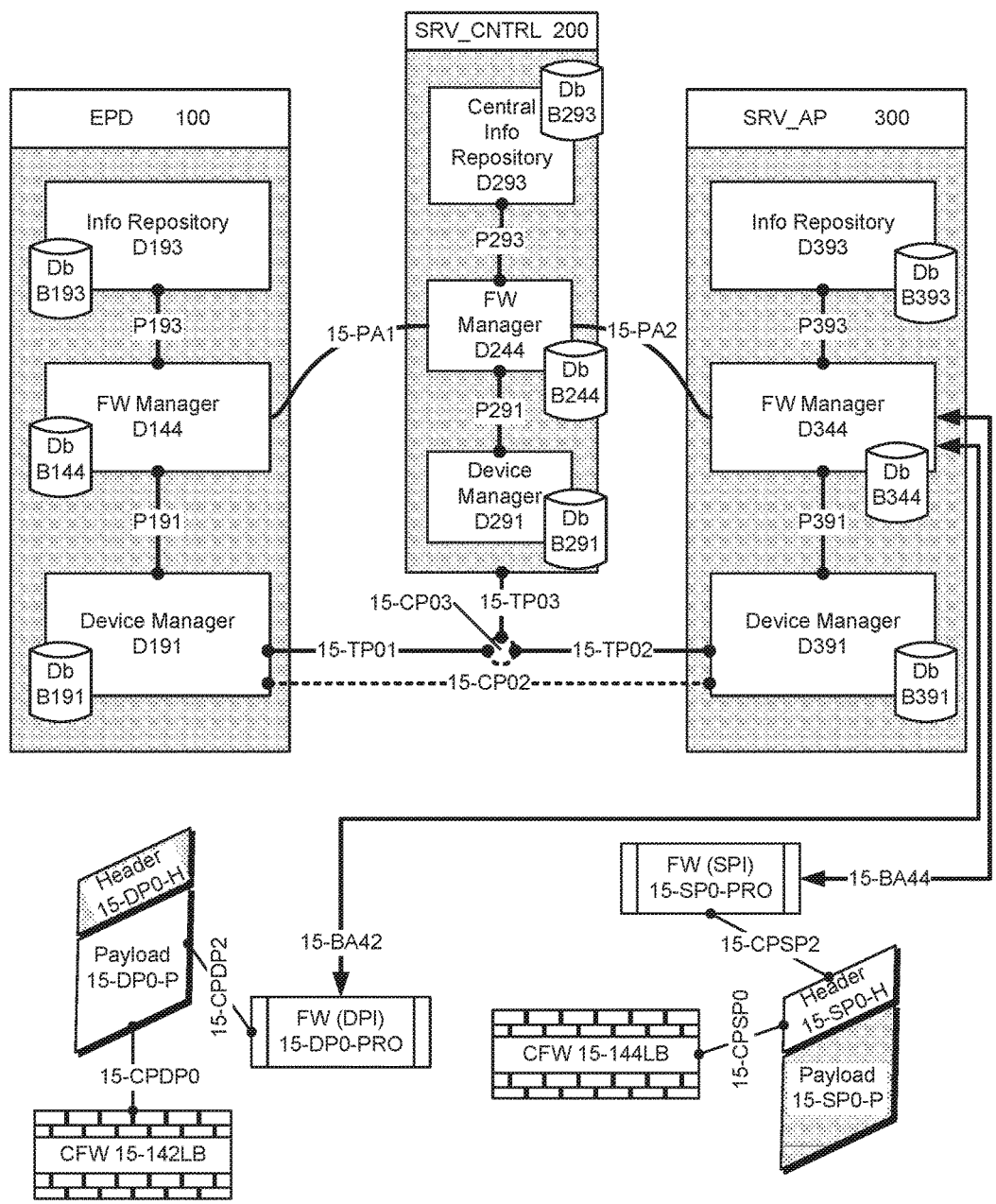
FIG. 15 illustrates the modules required for automated device and firewall collaboration and information exchange in a GVN.

FIG. 15 illustrates the modules required for automated device and firewall collaboration and information exchange in a GVN.

EPD 100 is the endpoint device. SRV_AP 300 is an access point server which is located in the target destination region. SRV_CNTRL 200 is a central server accessible by both the EPD and the SRV_AP as well as by other devices which may support a graphic destination mechanism.

Each device EPD 100, SRV_AP 200 and SRV_CNTRL 300 stores information about itself in a local information repository in the form of lists, files, database tables and records, and other means. This repository also contains information about peer device relationships, stores logs, plus other relevant operational information. The SRV_CNTRL 200 also has additional storage functionality and its role is to provide information to other devices relevant to them and/or to the peer devices which they may connect with, to evaluate current conditions and provide centralized control-like guidance such as the publishing of a server availability list and other functionality. A neutral API mechanism (NAPIM) can send info between devices and the peers which they connect with, and can also be used to update the API itself.

The database on the SRV_CNTRL 200 acts as a repository for information about itself as well as a centralized repository for other devices. There can be many different SRV-CNTRL 200 servers acting as multiple-masters in many locations. Each database can store certain information including tunnel information, peer information, traffic information, cache information, and other information. Security and other aspects are independently managed by each device including heartbeat functionality, triggered scripts and other mechanisms.

This figure additionally shows the firewall manager D344, D244, D144 on access point server (SRV_AP) 300, central control server (SRV_CNTRL) 200, and end point device (EPD) 100, respectively. The SRV_AP 300's FW Manager D344 communicates with the FW Manager D244 on SRV_CNTRL 200 via path 15-PA2. Information is available to an EPD's 100 FW Manager D144 via path 15-PA1 to receive information from FW Manager D244 on SRV_CNTRL 200.

Command and control communications as well as reporting information conveyance between firewalls SPI 15-SP0-PRO and DPI 15-DP0-PRO is via paths 15-BA44 and 15-BA42 respectively.

The storage of FW information in databases B344, B244, and D144 on various devices allows threats to be known and can also factor into routing decisions for traffic through a GVN. For example, in the case of an active attack saturating backbone in one region, this can have an adverse effect on the weighting for traffic via that route, with the effect of traffic through a less congested pathway to receive routing priority.

Figure 16:
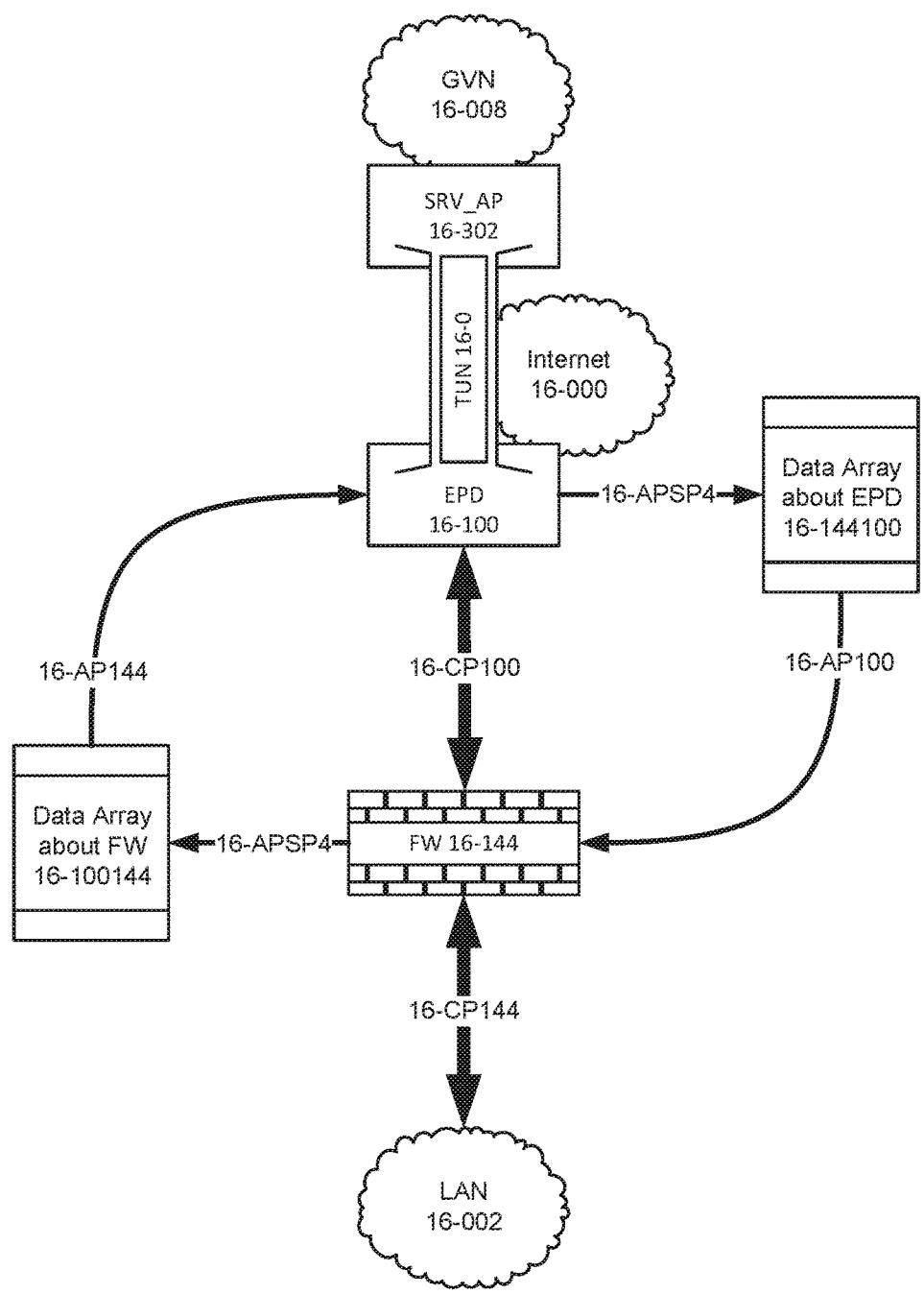
FIG. 16 illustrates device-to-device exchange of information in a GVN.

FIG. 16 illustrates device-to-device exchange of information in a GVN. Traffic flow is from the local area network (LAN) 16-002 to firewall (FW) 16-144 device via the path 16-CP144, then to end point device (EPD) 16-100 via path 16-CP100. The EPD builds a tunnel TUN 16-0 over the top (OTT) the internet 16-000 to SRV_AP 16-302.

The Data Array 16-144100 containing information about EPD 16-100 is shared to FW 16-144 via paths 16-APSP4 and 16-AP100. The Data Array 16-100144 containing information about FW 16-144 is shared to EPD 16-100 via paths 16-APSP4 and 16-AP144. In this example, the EPD information array is only available via the LAN port and not from the outside via an open WAN port. It may be available to other trusted devices in the GVN via TUN 16-0.

The key point is to illustrate an automated method for a device to identify itself to related devices including information such as its hardware specifications, software version, current operational state, and other relevant information.

Figure 17:
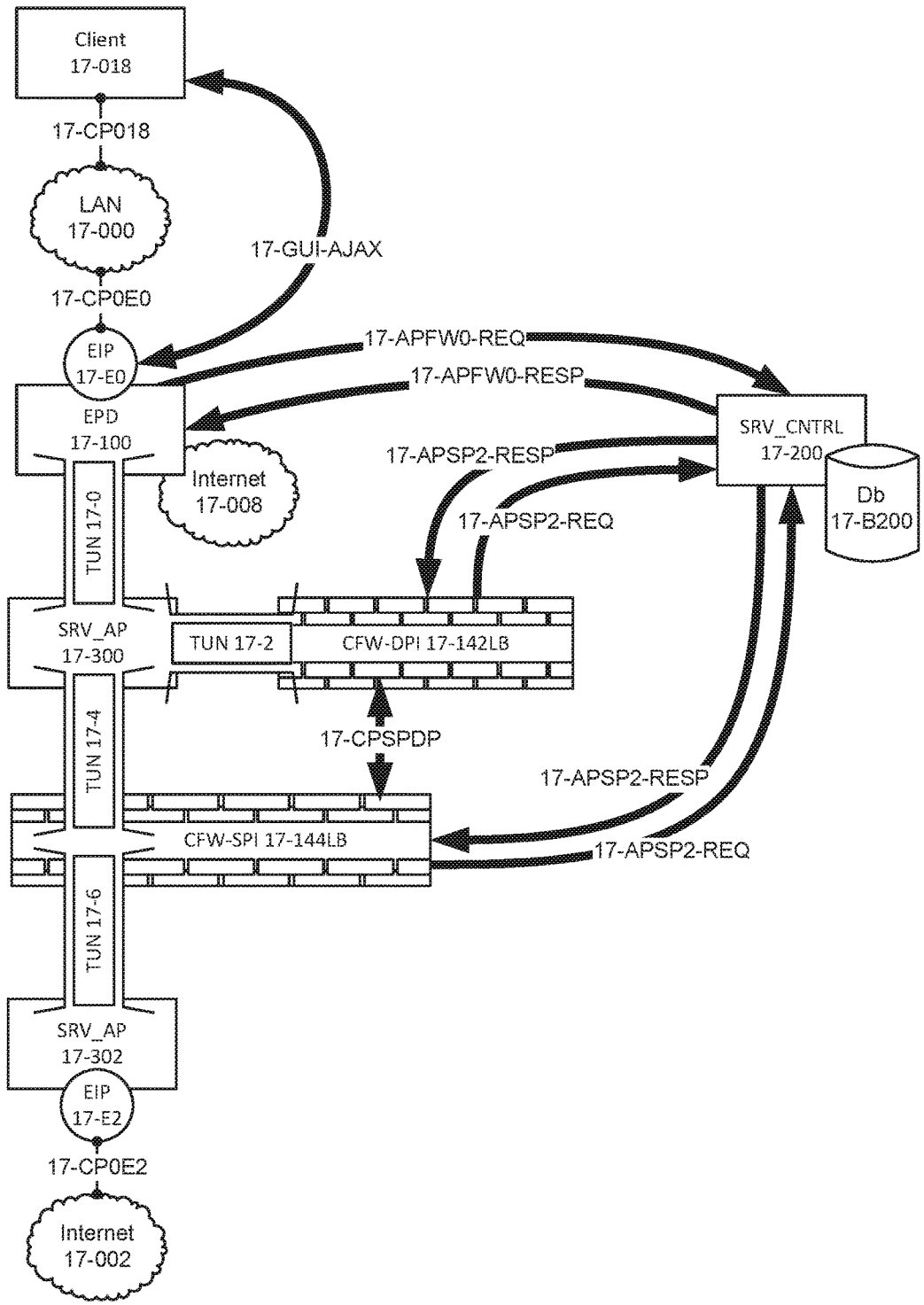
FIG. 17 illustrates the integration of a multi-perimeter firewall with other systems in a GVN.

FIG. 17 illustrates the integration of a multi-perimeter firewall with other systems in a GVN. Acts of information warfare are always occurring. Whether they are by nation state, by corporate players, hackers, or other actors, these attacks are relentless and according to trends, the threats are increasing. Utilizing the topology described herein, there exists the possibility to integrate information about live attacks which is detected by passive firewalls or other such monitoring middle devices on the internet aggregated and reported by security provider companies or organizations. Whether the nature of the attack is an intrusion, phishing attack, attempt to steal intellectual property, DDoS attack, or other threat known or unknown, the key point is to protect one's network.

FIG. 17 shows request/response (REQ/RESP) API loops between various devices. These information loops can share information that a cloud firewall such as CFW-DPI 17-142LB or CFW-SPI 17-144LB learns about traffic flowing through it which is reported to SRV_CNTRL 17-200. The information loops can share information about attacks in other localities by passing information from SRV_CNTRL 17-200 to the cloud firewall such as CFW-DPI 17-142LB or CFW-SPI 17-144LB. Furthermore the information stored in the database Db 17-B200 on SRV_CNTRL 17-200 can also contain heuristic patterns, signatures of known threats, as well as information from global internet monitoring feeds to be shared. Visibility for a human administrator can also be made available from a hosted instance on EPD 17-100 via a graphic user interface (GUI) on the Client 17-018 via path 17-GUI-AJAX.

The flexibility of this information exchange topology also allows for performance monitoring, billing module for cloud-based scalable use of firewall resources, systems administration, and other purposes.

Figure 20:
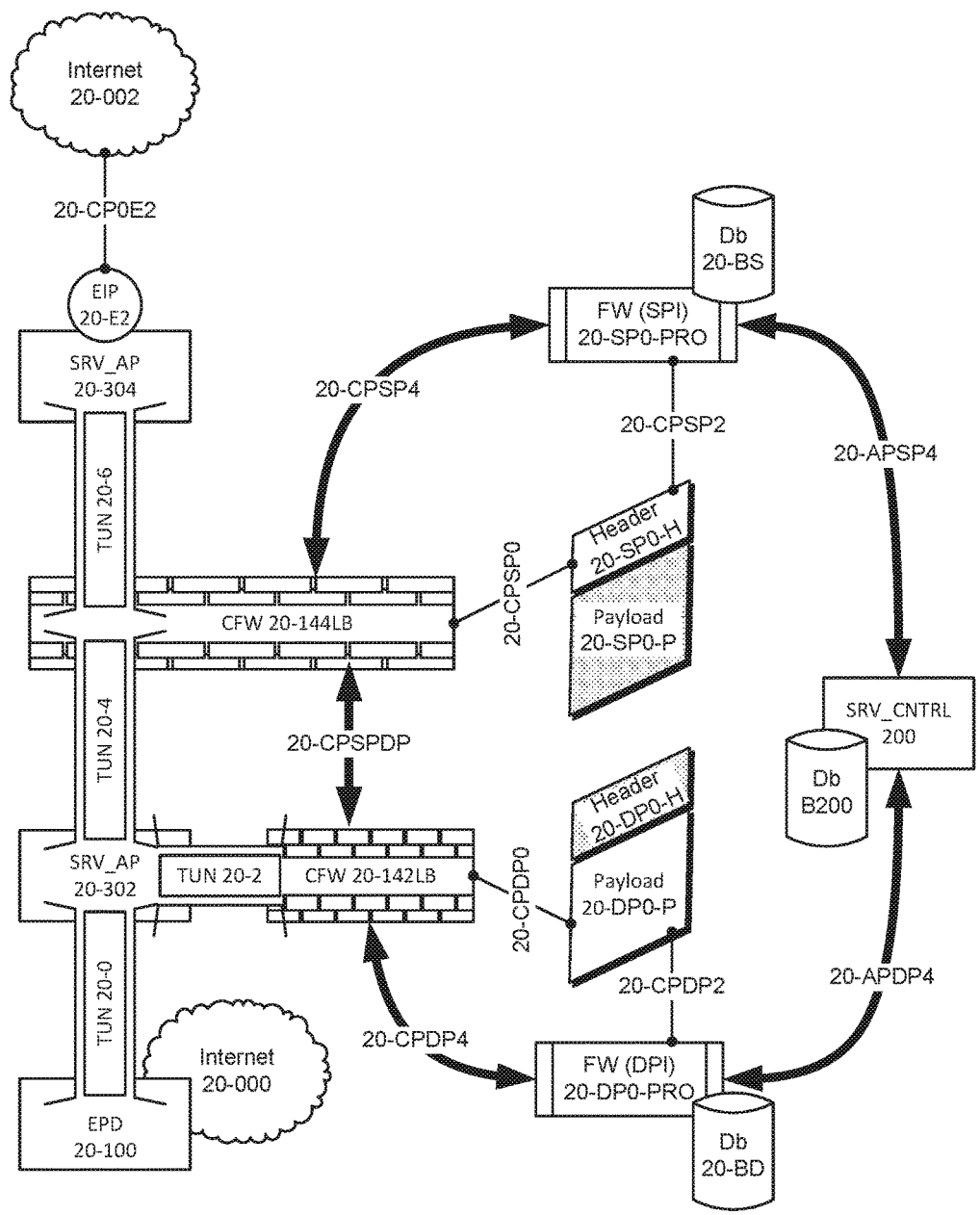
FIG. 20 illustrates the topology of devices and connectivity for the flow of information to and from an end point device (EPD) and the internet.

FIG. 20 is similar to FIG. 18 and illustrates the topology of devices and connectivity for the flow of information to and from an end point device (EPD) 20-100 and the internet 20-002.

The traffic flows from the internet 20-002 to egress ingress point (EIP) 20-E2, into access point server (SRV_AP) 20-304, and then via tunnel TUN 20-6 to cloud firewall load balancer CFW 20-144LB. This load balancer allocates stateful packet inspection (SPI) firewall resources at FW (SPI) 20-SP0-PRO. This SPI firewall examines the header 20-SP0-H information of packets flowing through it. Threat information detected by the FW (SPI) 20-SP0-PRO is stored in local database Db 20-BS and shared to central, control server (SRV_CNTRL) 200 via communications path 20-APSP4. This information is stored on SRV_CNTRL's database Db B200. Information about threats detected on other SPI firewalls is shared from SRV_CNTRL 200 to FW (SPI) 20-SP0-PRO via communications path 20-APSP4.

Traffic that is allowed by CFW 20-144LB to pass flows through TUN 20-4 to SRV_AP 20-302. At SRV_20-302, the traffic has two options—it can either directly flow to EPD via TUN 20-0 with a clone copy of the data stream travelling via TUN 20-2 to the cloud firewall load balancer CFW 20-142LB. Or the non-cloned flow can be diverted for filtering and analysis by the cloud firewall load balancer CFW 20-142LB.

This cloud firewall load balancer CFW 20-142LB allocates deep packet inspection (DPI) firewall resources at FW (DPI) 20-DP0-PRO. This DPI firewall examines the payload 20-DP0-P information of one or more combined packets flowing through it. Threat information detected by the FW (DSPI) 20-DP0-PRO is stored in database Db 20-BD and also shared to central, control server (SRV_CNTRL) 200 via communications path 20-APDP4. This information is stored on SRV_CNTRL's database Db B200. Information about threats detected on other DPI firewalls is shared from SRV_CNTRL 200 to FW (DPI) 20-DP0-PRO via communications path 20-APDP4.

If allowed, the network traffic then flows from SRV_AP 20-302 to EPD 20-100 via TUN 20-0.

SPI and DPI cloud firewall load balancers can learn about systemic threats, threats find in remote regions, and obtain various other information either via communications with the SRV_CNTRL 200, or in some cases, they may communicate with each other via a direct path such as 20-CPSPDP.

Figure 21:
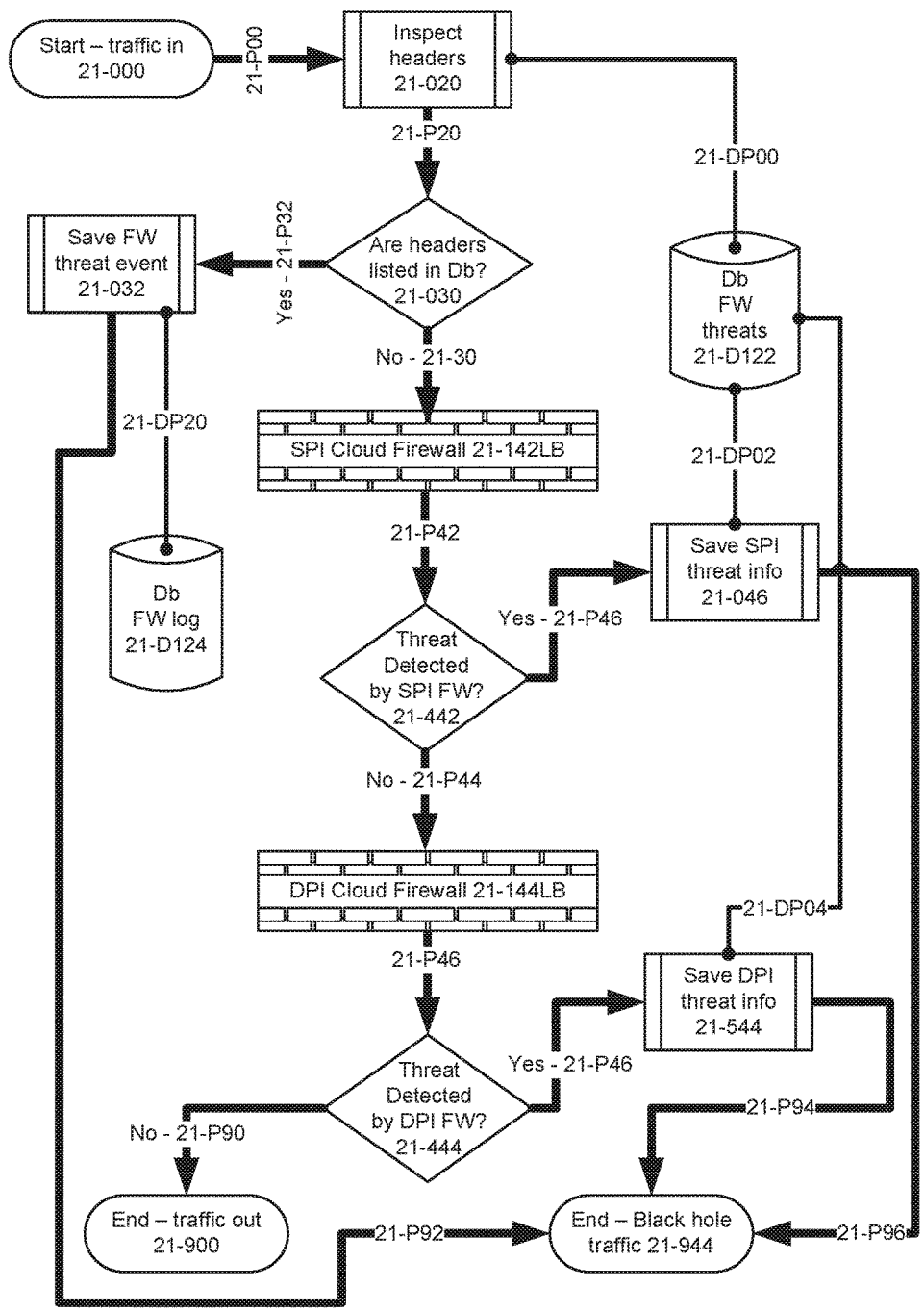
FIG. 21 illustrates a multi-perimeter firewall algorithm.

FIG. 21 illustrates a multi-perimeter firewall algorithm based on the topology of FIG. 20 or a similar topology where there are multiple perimeters for various types of firewall operations.

The Db FW threats 21-D122 can be stored on each device and/or communicated to a central, control server (SRV_CNTRL) for future access and use. SPI operations are at one perimeter. DPI operations at either same perimeter or another perimeter. SPI and DPI firewalls can communicate threats with each other and based on known threats, appropriate steps can be taken.

In this example, traffic starts at 21-000. If threats are detected, threat information is logged and shared and the offending traffic is blackholed at 21-944. Traffic deemed as clear flows out at 21-900.

Figure 22:
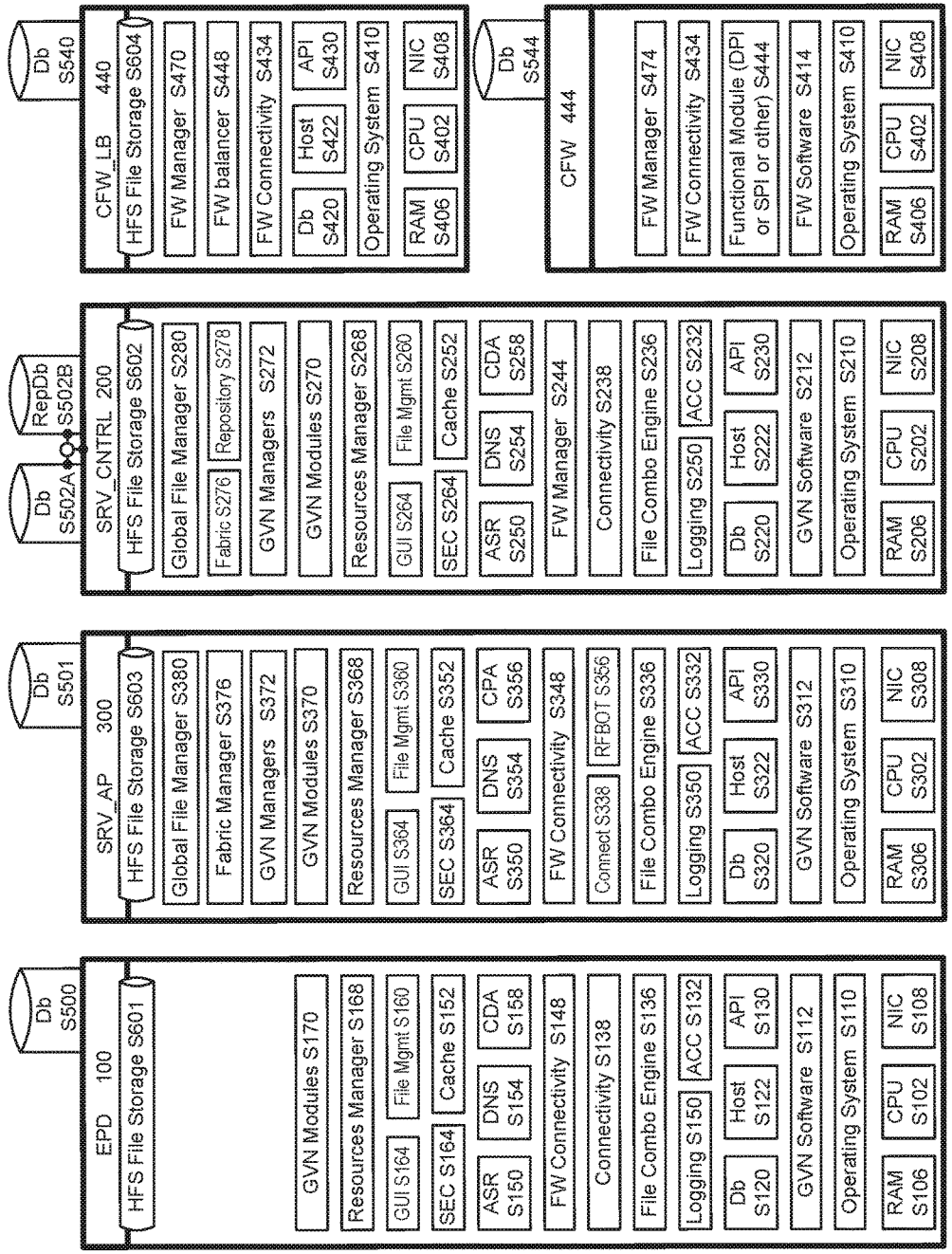
FIG. 22 illustrates a logical view of the software architecture for a cloud firewall device, a cloud firewall load balancer device, a central control server, an access point server, and an end point device.

FIG. 22 illustrates a logical view of the software architecture for firewall devices such as a cloud firewall CFW 444 and a cloud firewall load balancer device CFW_LB 440 as well as the stacks for related devices a central control server (SRV_CNTRL) 200, an access point server (SRV_AP) 300, and an end point device (EPD) 100. As shown, the software and hardware can be distributed within the network devices and across different circuit boards, processors, network interface cards, storage, and memory.

The software architecture of the devices are very similar to each other with the differentiation by role of each device in their operations, and some differing modules.

The lowest level of each device are the memory (RAM) S106, S206, S306, S406 and processors (CPU) S102, S202, S302, S402 and the network interfaces (NIC) S108, S208, S308, S408. All of these are on the hardware level. The operating system (O/S) S110, S210, S310, S410 can be a LINUX system or equivalent system such as Debian or other. This description of an operating system includes packages and configuration for routing, hosting, communications and other system level operations software.

The central control server (SRV_CNTRL) 200, access point server (SRV_AP) 300, and end point device (EPD) include a system software layer S112, S212, S312 of the Global Virtual Network's (GVN's) operating system. Operating here are custom commands, system modules, managers and other constituent parts, as well as other components of the GVN. Each type of device of the GVN may have some or all of these portions of the system software layer or different portions depending on their role.

Database modules Db 120, 220, 320 and Hosting Modules 122, 222 and 322 are configured in this example embodiment for the listening, sending, processing, storage, retrieval and other related foundation level operations of the GVN's neutral API mechanism (NAPIM), graphic user interfaces (GUI) and other server side script hosted sites. Database 120, 220. 320 (Db) modules could be MySQL or equivalent such as MariaDb and hosting modules 122, 222 and 322 could be Apache and PHP scripting or other type of hosting languages. Command Line scripts are also used and can be written in Bash, C, PHP, Pearl, Python or other language.

Billing modules can collaborate and share information such as the amount of data consumed by tunnel traffic to be billed by a consumption model. The accounting module ACC 132 232 332 operates on the EPD 100 and the SRV_AP 300 has a corresponding Billing module. Both can provide financial information to report screens, payment forms, emailed statements and other financial data produced by the GVN.

SRV_CNTRL 200 has a Repository Manager 238 which handles billing info, tunnel manager information and other data which can be utilized by various devices within the GVN. The Repository Manager 238 also handles the coordination of the sharing of peer pair info, credentials and other information to individual devices connecting to other API peers via the neutral API mechanism (NAPIM) of the GVN.

The EPD 100 has an API Module 130, SRV_CNTRL has API Module 230 and the SRV_AP 300 has an API Module 330. For the simplicity of explaining this example embodiment only one API module has been expressed per device. In fact, devices may have a combined client and server role depending on its function within the GVN.

A Cache Manager on SRV_CNTRL 200 manages the master index of various chained caches distributed across many devices of the GVN. The Compression Engine 136 on the EPD 100 and 336 on SRV_AP 300 manages the compression and decompression of data both stored on files, in DB tables or for streaming transport data.

Advanced Smart Routing (ASR) 150 module on EPD 100 handles the routing of traffic from an EPD 100 to the best egress point for destination via routes of the GVN.

Remote Fetcher BOT 311 on the SRV_AP 300 is a core component of the Geo-Destination Mechanism (Geo-D).

DNS Manager 254 on SRV_CNTRL 200 manages the master DNS index which can seed DNS Servers on various GVN devices, such as DNS 154 on EPD 100.

A Logger Manager on SRV_CNTRL 200 manages both local logs and logs shared by devices to the Repository via API calls. The Logging Manager in this example embodiment imbues the functionality of recording operational events, API actions and transactions and the Logger also has other roles and processes for various aspects of the GVN operations.

Local Cache 152 on EPD 100 and local Cache 352 on SRV_AP 300 cache data locally.

GVN Managers 272 operate on SRV_CNTRL 200 to control the operations of various components of the system both on the SRV_CNTRL 200 and other devices of the GVN.

Local DNS server and cache 154 on EPD 100 and 354 on SRV_AP 300 allow for caching of DNS lookups for fast, local retrieval. The DNS 154 and 354 can be completely flushed, individual items purged, or timeouts set for retrieved lookups to be deleted after a certain period of time has transpired.

On the EPD 100 is a Content Delivery Agent (CDA) 158 which is a component of Geo-D. On the SRV_AP 300 is a Content Pulling Agent (CPA) 358, also a component of Geo-D. The CPA 358 works with the BOT 311 on SRV_300 to pull content from a distant region using local DNS 354 seeding from that Region. The CPA 358 sends fetched content to the CDA 158 utilizing tunnels, caches and other improvements of the GVN.

Connectivity Manager (not shown) on EPD 100 and on SRV_AP 300 manages the tunnels between devices and other device to device communications paths. Compression Manager on 215 of SRV_CNTRL 200 manages compression both locally and also coordinates with Compression Engines 136 on EPD 100, 336 on SRV_AP 300 and on other devices of the GVN. Routing on EPD coordinates with ASR 150, Geo-D, and other elements to manage traffic routing.

The structure of the database tables in SDB100, SDB200, and SDB300 are equivalent for device operations while the data for each is specific for device types, and each device has identity specific devices. On SRV_CNTRL 200, the Repository Database SDB202 is where unique information is stored for all devices and this information can be used by the Repository Manager 238 to communicate API credentials, tunnel info, or other information to a device.

Stored within each device database are identity and API peer info about the device itself and its peer pair partners, transaction lists and queue data, and other information. There are other uses for the described methods and databases beyond what is described but for simplicity of illustration, this example only covers a few example core functionality elements.

The cloud firewall CFW 444 includes base firewall software S414, as well as the general rules, DPI, SPI, heuristic scanning, and other functionality S444. The cloud firewall load balancer device CFW_LB 440 includes and firewall balancer software S448 which manages traffic flow and resources assignment to cloud firewalls on demand and as needed.

In addition to End point device (EPD) 100, Access point server (SRV_AP) 300 and central control server (SRV_CNTRL) 200 third party devices may also be utilized as long as they have the ability to communicate plus configured credentials and other information to facilitate this communication with other devices. Under each device are some possible components which could be running within that device's stack, however some others may be running concurrently which are not described herein. These components may include FW Connectivity S148 under EPD 100, FW Connectivity S348 under SRV_AP 300, and FW Manager S244 under SRV_CNTRL 200. The connectivity and manager modules are for interaction with CFW 444 and CFW_LB 440. The manager module conducts ongoing FW analysis and communicates with system-wide and geographically diversely located CFW and CFW_LB devices about known threats.

Firewall load balancer CFW_LB 440 to firewall CFW 444 communications can be by FW Connectivity modules S434 on each device. These connectivity modules can handle both the data flow channels as well as the channel of information flow about the data flow, the threats detected, and other information.

Device to device communications can be by the Neutral API Mechanism (see International Patent Application No. PCT/IB16/00110) on EPD 100 via API S130, on SRV_AP 300 via API S330, on SRV_CNTRL 200 via API S230 and on CFW_LB 440 via API S430.

Figure 23:
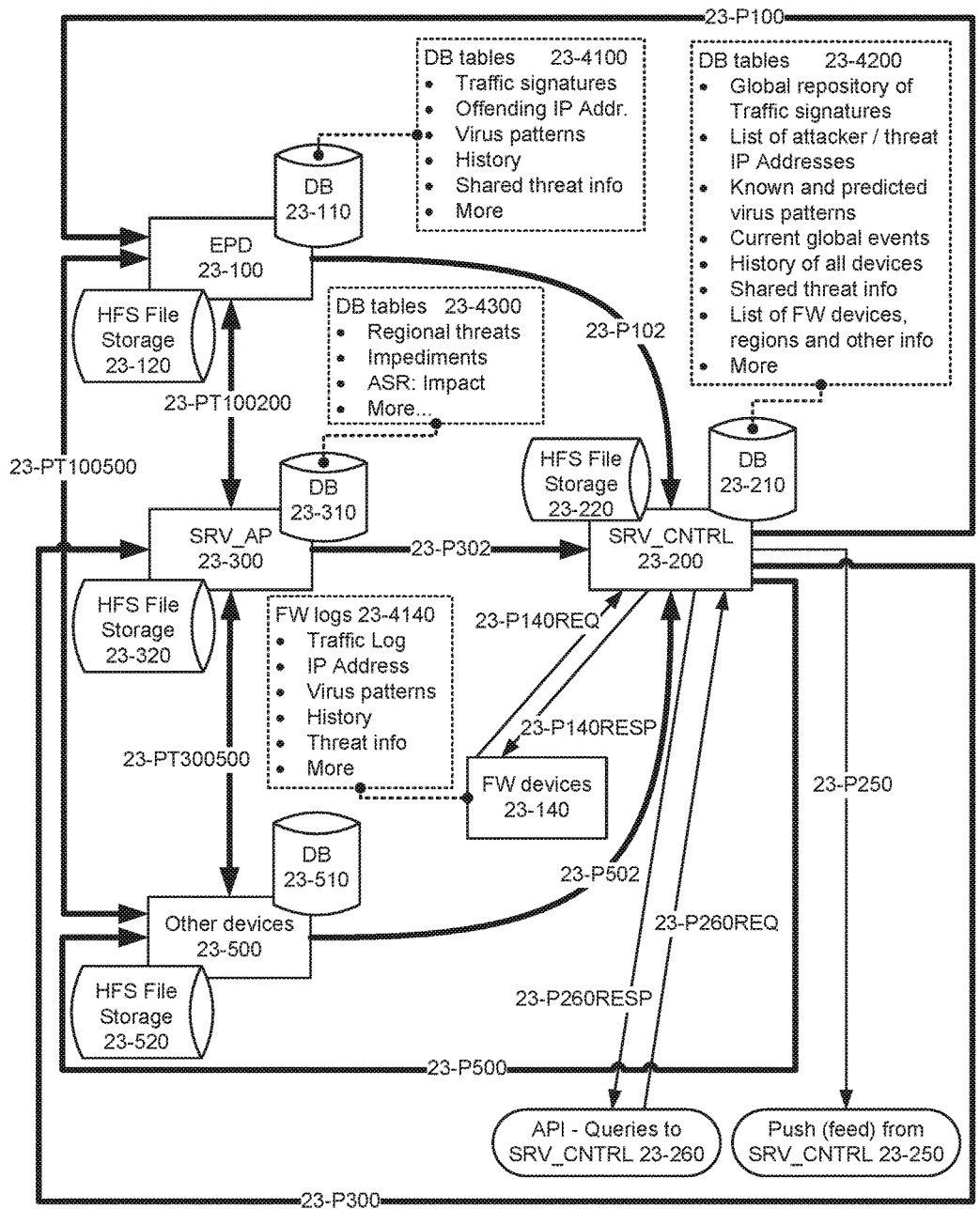
FIG. 23 illustrates the flow of information from firewalls (FW) to various devices in a global virtual network (GVN) via a central control server (SRV_CNTRL).

FIG. 23 illustrates the flow of information from firewalls (FW) to various devices in a global virtual network (GVN) via a central control server (SRV_CNTRL) 23-200. It also includes the nature of the information stored in local devices with respect to the firewall information in database (DB) tables such as 23-4100 on DB 23-110, 23-4300 on DB 23-300, 23-4200 on 23-210 and also in logs such as 23-4140 on FW devices 23-140.

Information is reported from FW devices 23-140 to SRV_CNTRL 23-200 via API request 23-P140 REQ/23-P140 RESP or equivalent device-to-device information sharing. It can also be report to SRV_CNTRL from individual devices via paths 23-P102, 23-P302, 23-P502 or other paths from other devices.

The SRV_CNTRL 23-200 can broadcast and/or publish FW related information to devices via paths 23-P100, 23-P300, 23-P500 or other direct paths. FW Information can also be made available via API call from devices 23-260 via request/response paths 23-P260REQ and 23-P260RESP.

Flags can indicate the source of the information such as "detected on this device", "detected on another device", and more, and also the attack origination point such as "LAN based attack to outside", "WAN based attack", "attacks from the Wild", and more.

The stored information can also include signatures, structures known and predicted via heuristic analysis, IP addresses, code patterns of viruses and/or malware and/or other offending payloads, behavioral characteristics of problematic traffic, pattern of propagation, and more.

The SRV_CNTRL 23-200 can also utilize algorithms to analyze the information and also rank the seriousness based on threat longevity, time of first and last detection, scale and scope of attack, and more to determine the history and any trends. This analysis takes into account active threats, past threats, relationships between threats (for example how a phishing attack can lead to a compromise that opens a network to other attacks), the current conditions of the internet/network to assign threat levels and other indicators to measure the intensity of attacks. During relatively quiet times, FW may be more permissive resulting in faster operations. During relatively active times, the FW may be more restrictive and analytical leading to potentially slower through-put and operations.

The SRV_CNTRL 23-200 retains FW information in a repository store cataloging threat types, report histories, and logging device interaction including threat information update publishing.

Figure 24:
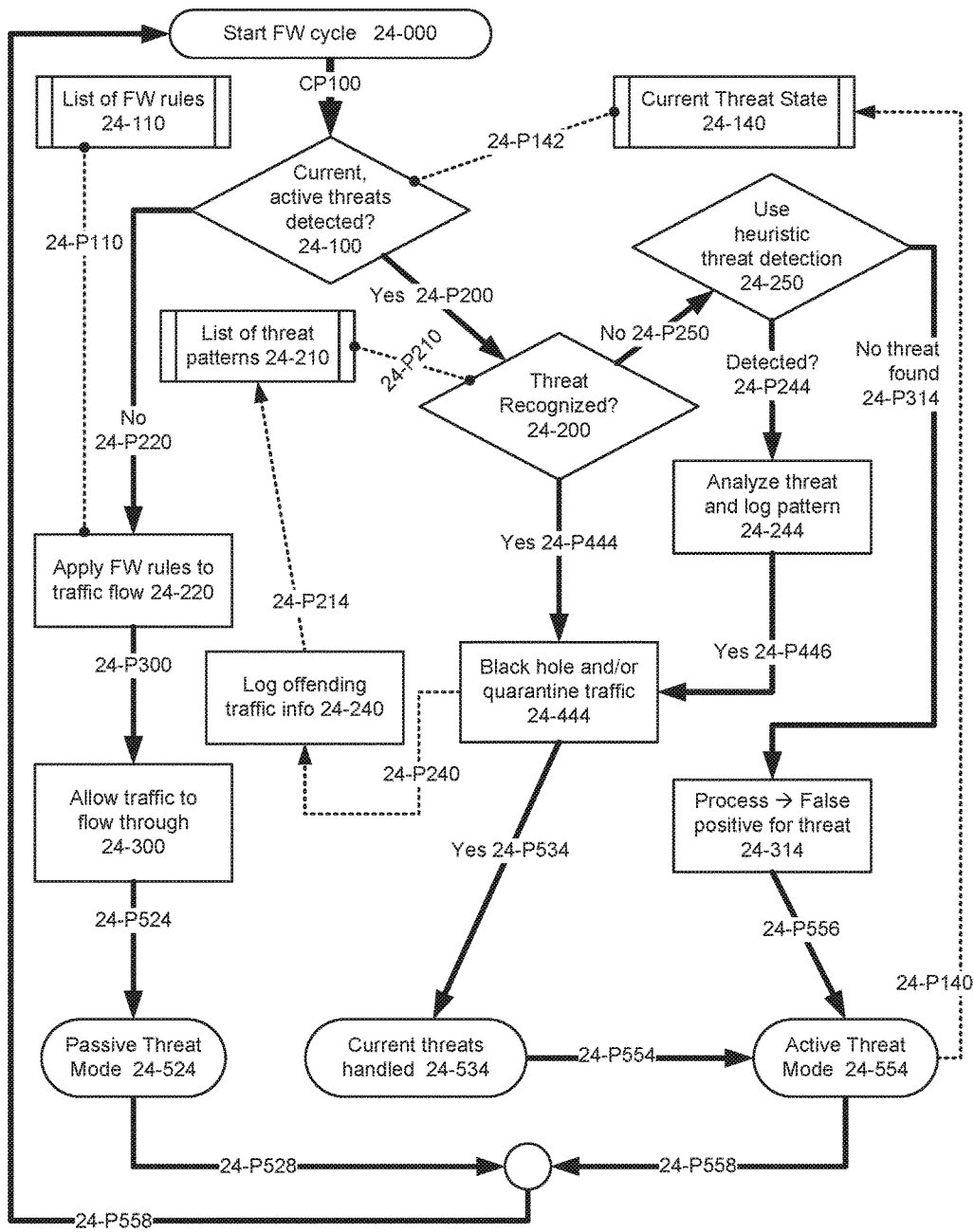
FIG. 24 is a flowchart describing the algorithm used to analyze traffic flowing through a firewall, a firewall load-balancer, and/or through a firewall array.

FIG. 24 is a flowchart describing the algorithm used to analyze traffic flowing through a firewall, a firewall load-balancer, and/or through a firewall array. For traffic flowing through, the first step is to evaluate if there are any current, active threats being detected 24-100. This is influenced by the Current Threat State 24-140 which is a rolling indicator of how active the firewall is.

If no threats are detected and the current threat state is normal, then FW rules are applied to traffic 24-220 and it is allowed through at 24-300. It remains in passive threat mode 24-524 and then restarts at the next Start FW cycle 24-000.

If a threat is detected, traffic flows via path 24-P200 and the threat is checked against list of threat patterns 24-210 via path 24-P210. If it is recognized, it is either blackholed or quarantined. Offending traffic is logged at 24-240. Once current threats are handled at 24-534, the firewall is set to active threat mode 24-554 and then goes back to Start FW cycle 24-000.

If a threat is not recognized, it is checked using heuristic threat detection at 24-250. If no threat is detected, if follows via 24-P314 to be processed as a false positive at 24-314. Mode is upgraded to active threat mode 24-554 and the next cycle starts at 24-000.

Figure 25:
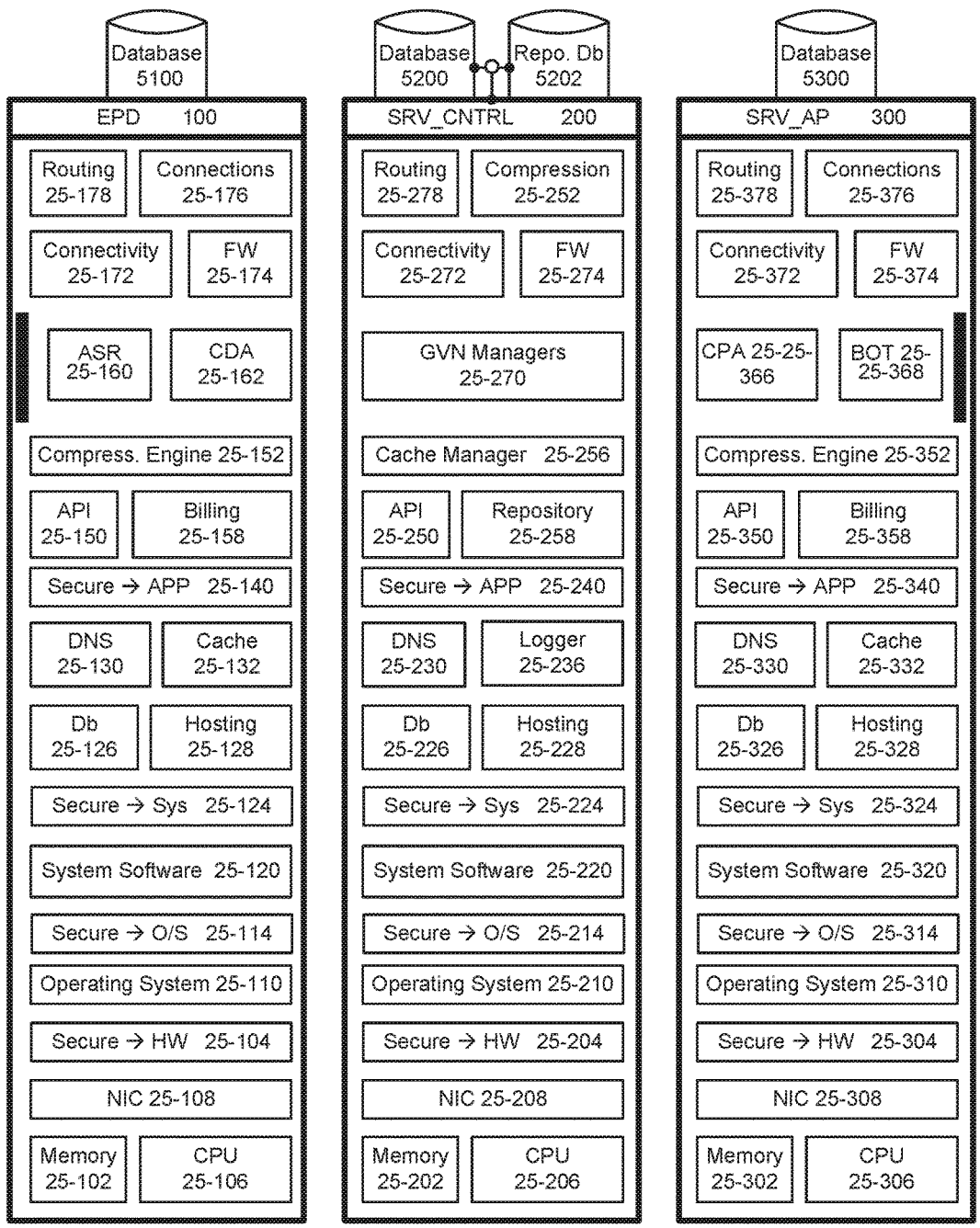
FIG. 25 illustrates the various layers in a system stack to deal with and handle threats.

FIG. 25 illustrates the various layers in a system stack to deal with and handle threats. The lowest level of the stack are Memory 25-102, 25-202, 25-302, and CPU 25-106, CPU 25-206, CPU 25-306. The system is built up from the lowest level.

The incremental lock down of a device is based on the nature of the threat and how deep it can go down the stack. For example, the Secure-APP 25-140, 25-240, and 25-340 security layer protect the application modules above that layer. These govern the operations of certain modules but do not necessary impact the deep logic. Secure-Sys 25-124, 25-224, and 25-324 protect the system software layer for database operations, DNS, logging, cache, hosting and other functionality. Secure-O/S 25-114, 25-214, and 25-314 protect the operating system from threats. Secure-HW 25-104, 25-204, and 25-304 protect the physical layer of the hardware system from threats, including driver files, flash-able instruction sets, and other systems.

The lower down the layer locked-down, the less functionality of the system.

Figure 26:
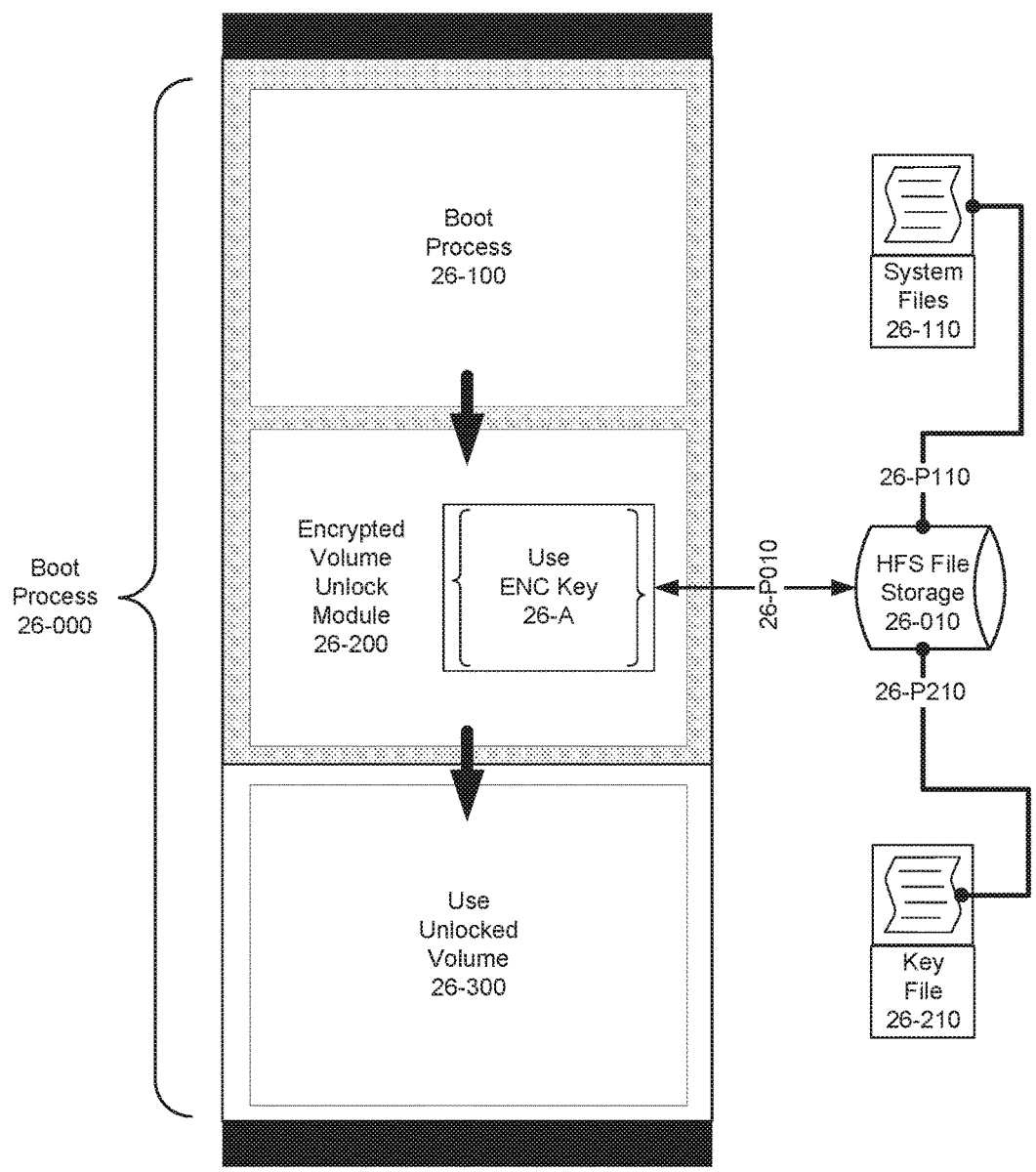
FIG. 26 illustrates a method for automatically decrypting an encrypted volume during a boot-up process.

FIG. 26 illustrates a method for automatically decrypting an encrypted volume during a boot-up process where system files 26-110 are retrieved from HFS File Storage 26-010. At one point in a boot-strap boot up process 26-100, the key file 26-210 is retrieved from HFS File Storage 26-010. This Key 26-A is used by the Encrypted Volume Unlock Module 26-200. Once the encrypted volume is unlocked, it can be used 26-300.

There is an obvious drawback to storing the key to an encrypted volume on the HFS File Storage Volume 26-010. Because this is susceptible to hackers who gain access to the system to unlock the secure volume using the key which is unencrypted. The other threat is to those who take the physical drive and attempt to either decrypt the volume to steal valuable client data and/or to reverse engineer the system gaining access to software stored in the encrypted volume.

Figure 27:
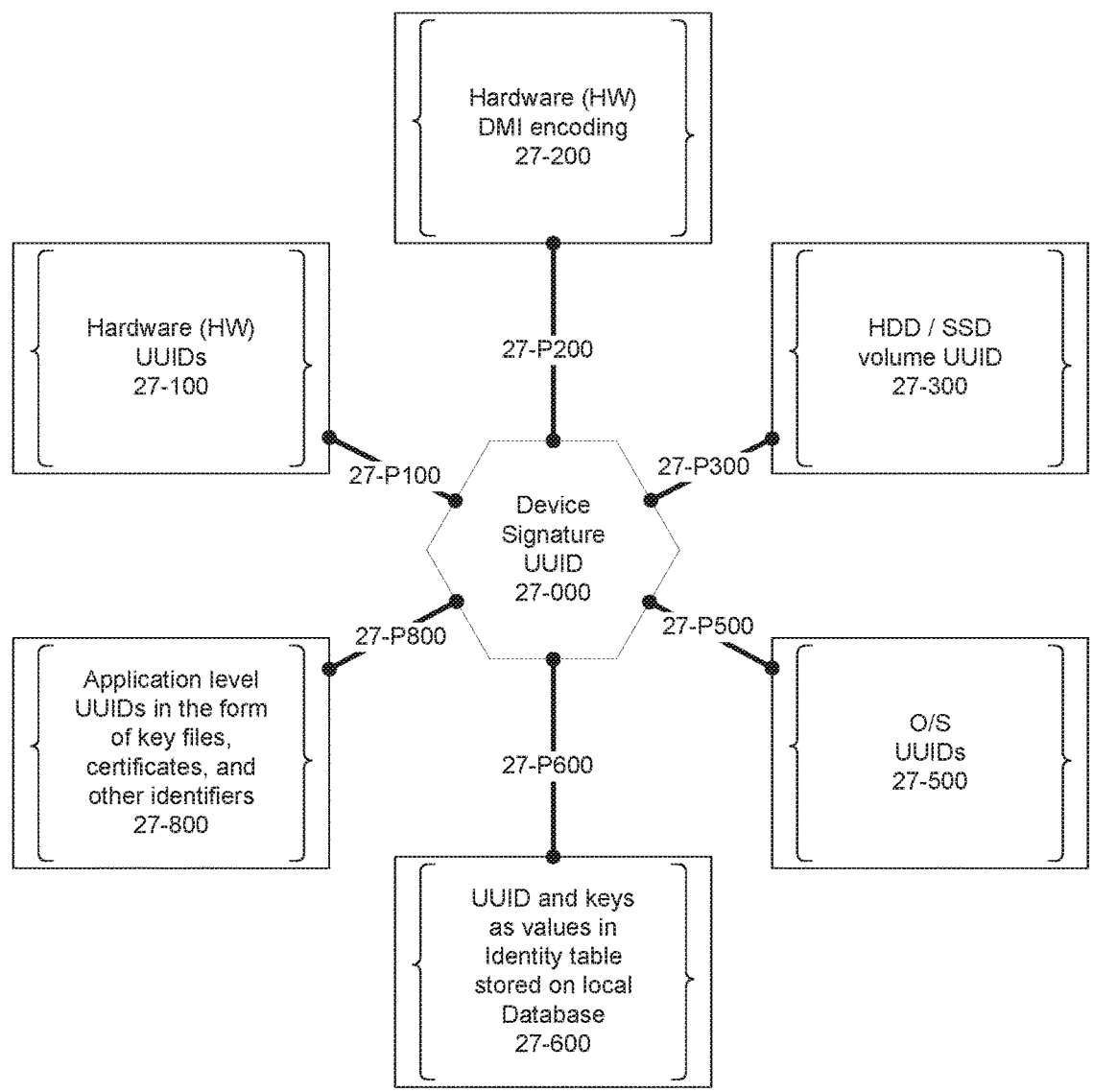
FIG. 27 illustrates how a unique user identification (UUID) can be consistently computed for a device based on a number of factors specific to that device.

FIG. 27 illustrates how a unique user identification (UUID) can be consistently computed for a device based on a number of factors specific to that device. Hardware (HW) UUIDs 27-100 such as CPU serial number, CPU model, network interface card (NIC)'s MAC Addresses, and other factors are typically unique to each device. Hardware (HW) DMI encoding 27-200 can be utilized using burned in DMI values such as serial numbers, version numbers, or other DMI data. The unique volume ID of a hard disk drive (HDD) or solid state drive (SSD) 27-300 can also be utilized. Certain O/S UUIDs 27-500 can also be utilized which are unique to the build of a system. UUID and keys as values in Identity table stored on local Database 27-600 can also be utilized as part of an identity for a device.

At the Application level, UUIDs in the form of key files, certificates, and other identifiers 27-800 may be utilized to generate a specific UUID for the device itself.

Various device UUIDs can be computed, used, and validated against to ensure the veracity of a device's integral operation. The combination of the various factors would be hard to near impossible to spoof without access to the device.

Figure 28:
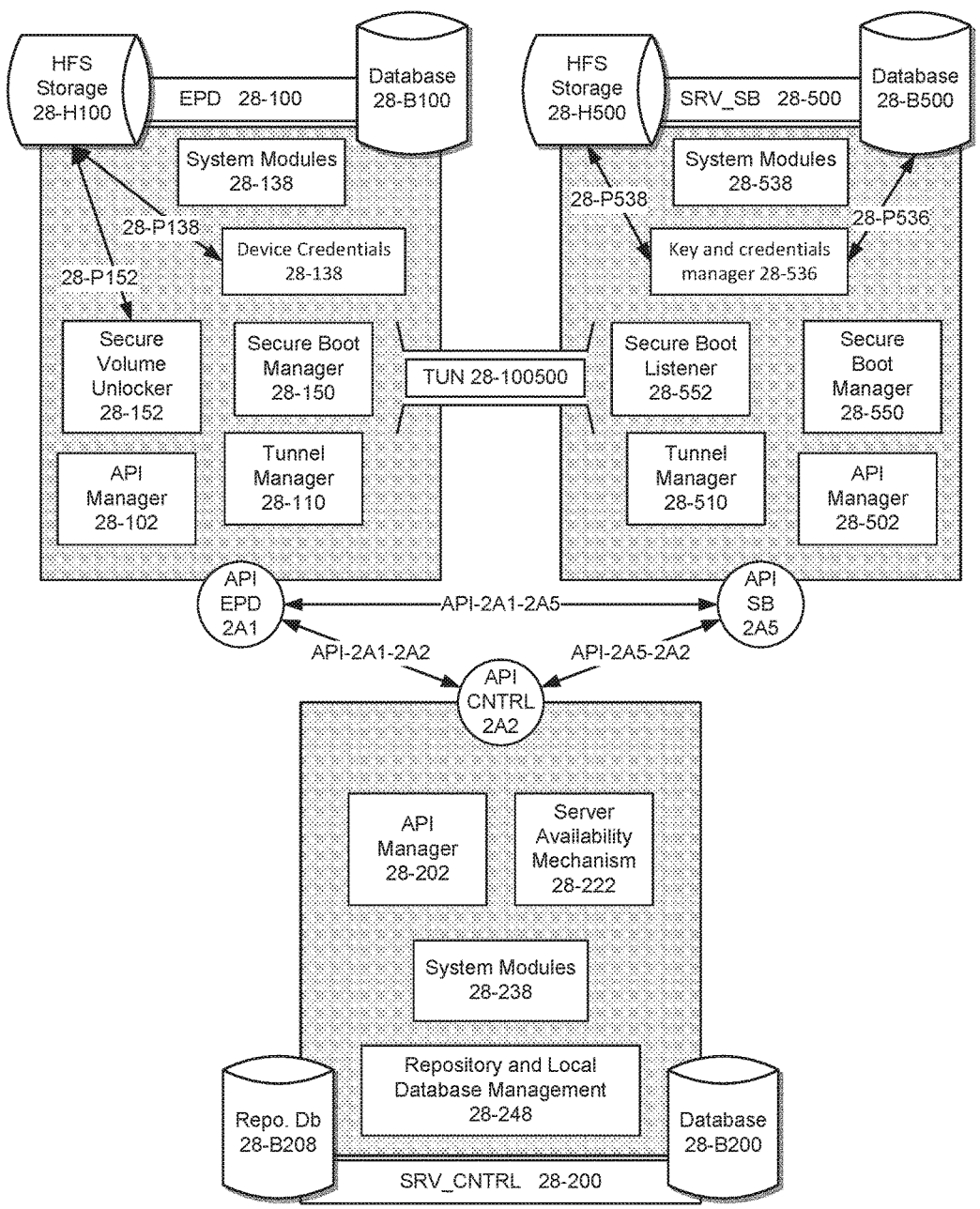
FIG. 28 illustrates the modules of the secure boot mechanism.

FIG. 28 illustrates the modules of the secure boot mechanism. An end point device (EPD) 28-100 contacts a secure boot server (SRV_SB) 28-500 and presents a false packet of data via API-2A1-2A5 to which the secure boot server rejects. The SRV_SB then queries the EPD with a set of challenges. On successfully passing a series of tests, the Secure Boot Manager 28-150 on the EPD is allowed to build a secure tunnel TUN 28-100500 via the Secure Boot Listener 28-552 on the SRV_SB. The Device Credentials 28-138 are presented to SRV-SB to be validated by the Secure Boot Manager 28-550 against values either stored in Database 28-B500 or on the HFS Storage 28-H500.

Only after passing all tests is the key for the encrypted volume on the EPD 28-100 released by the Key and credentials manager 28-536 and conveyed securely to EPD 28-100 via TUN 28-100500. The list of available SRV_SB servers is available to the EPD via an API query to the central, control server (SRV_CNTRL) 28-200 via Server Availability Mechanism 28-222.

Figure 29:
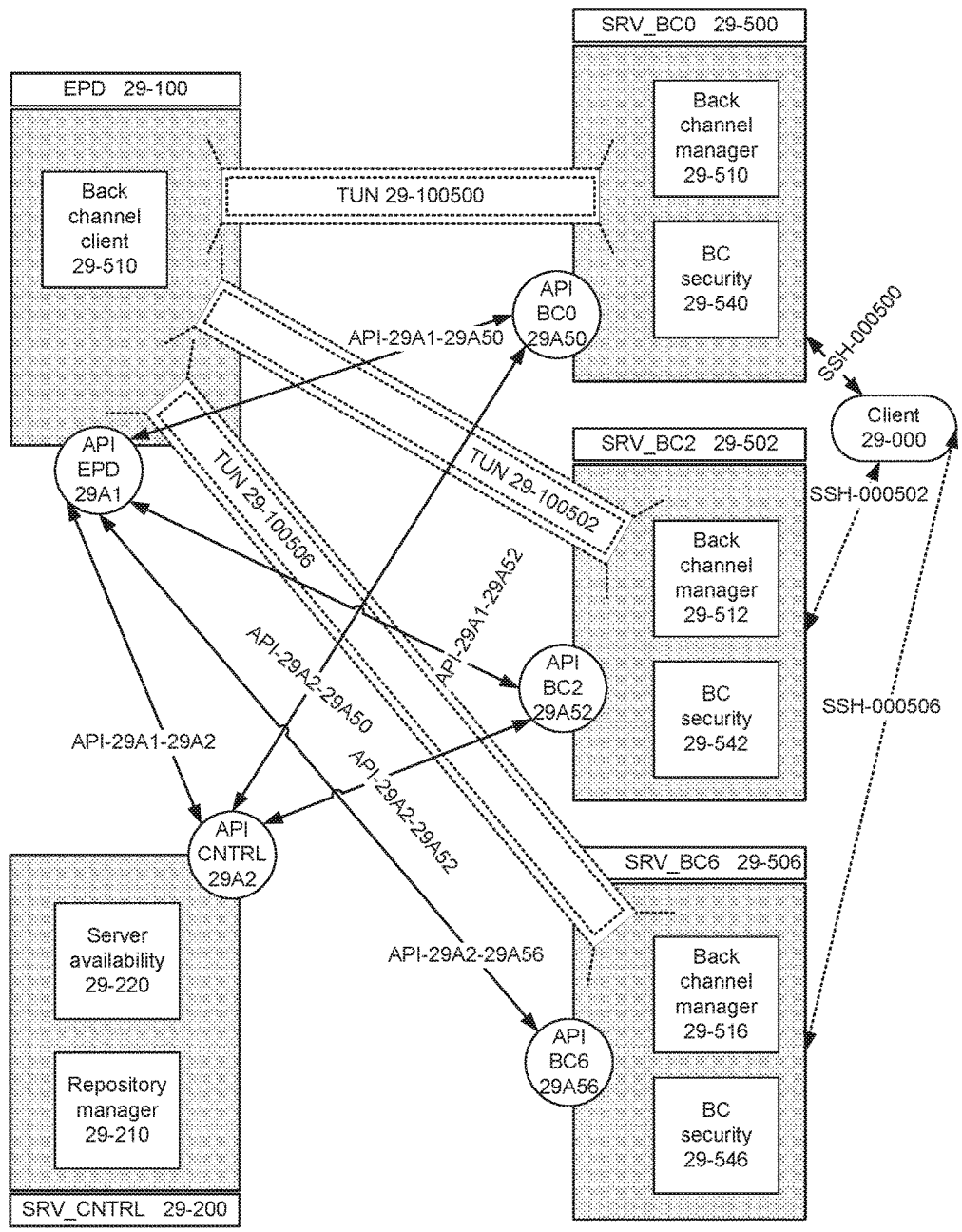
FIG. 29 illustrates the details of the back channel mechanism.

FIG. 29 illustrates the details of the back channel mechanism. An end point device (EPD) 29-100 receives a list of back channel servers (SRV_BC) which it can connect with via API call API-29A1-29A2 to central, control server (SRV_CNTRL) 29-200. The Server Availability 29-220 list provides the current available SRV_BCs which the EPD can connect with. This figure demonstrates three concurrent connections via TUN 29-100500 to SRV_BC0 29-500, via TUN 29-100502 to SRV_BC2 29-502, and via TUN 29-100506 to SRV_BC6 29-506.

The back channel client 29-510 on the EPD 29-100 makes simultaneous connections via the back channel managers 29-510, 29-512, and 29-516 once security is cleared by BC security 29-540, 29-542, and 29-546. The devices can also communicate directly with each other via API calls such as EPD to SRV_CNTRL via API-29A1-29A2 or SRV_BC0 to SRV_CNTRL via API-29A2-29A50.

Information about peer pairs, credentials, certifications, keys, and other information regarding the building of tunnels between EPDs and SRV_BCs can be conveyed via these API calls to SRV_CNTRL. Furthermore, status messages between known peers which have a healthy relationship can be sent directly via APIs such as from EPD 29-100 to SRV_BC2 29-502 via API-29A1-29A52.

This example is for one EPD to connect concurrently to many SRV_BC. The goal of an active tunnel is to enable an always up path to a command-line-interface (CLI) log in to the EPD regardless of whether or not the EPD is discoverable on the open internet and/or network.

Figure 30:
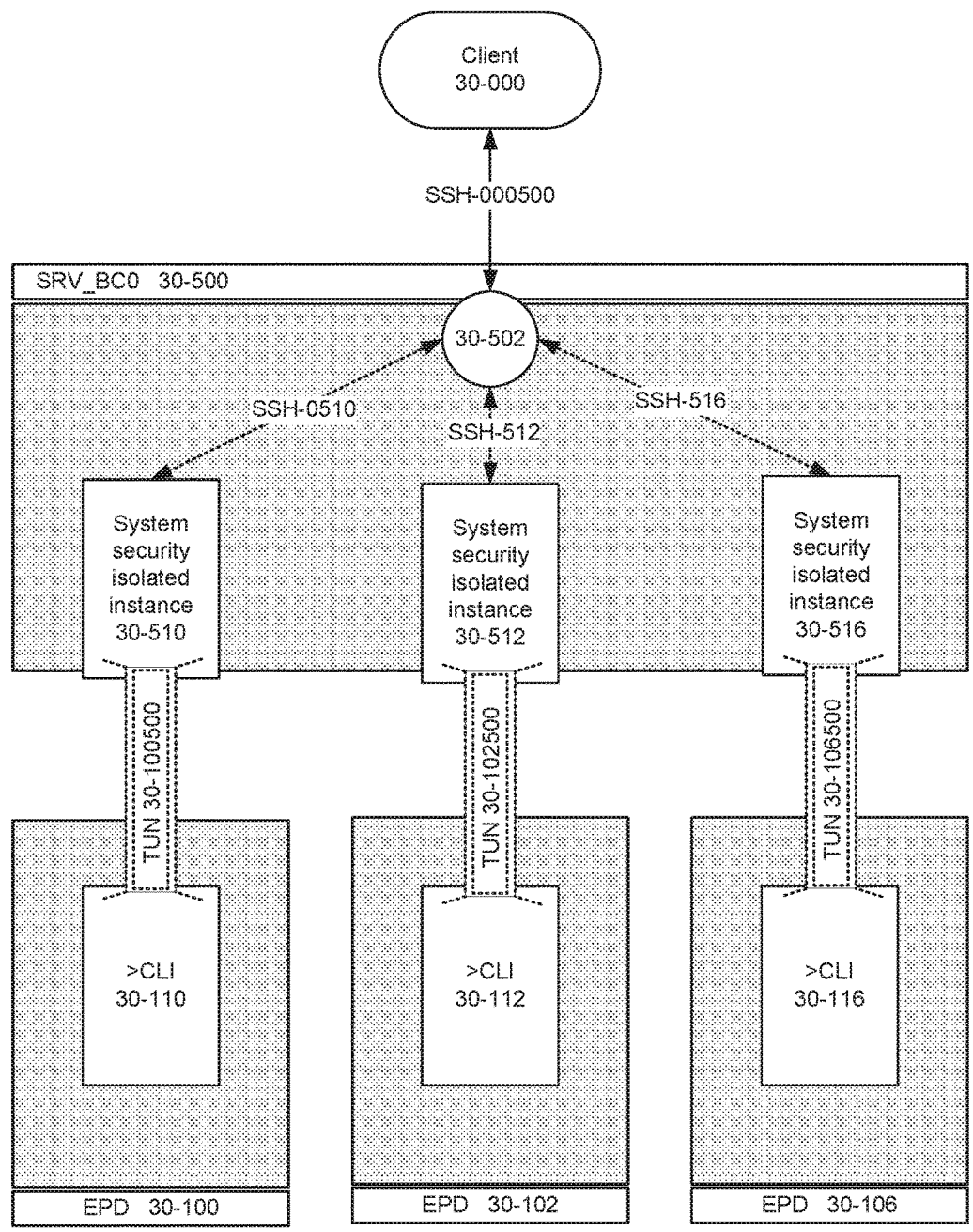
FIG. 30 illustrates the connections between many end point devices (EPD) and a back channel server (SRV_BC).

FIG. 30 illustrates the connections between many end point devices (EPD) 30-100, 30-102, and 30-106 and a back channel server (SRV_BC0) 30-500. While the EPD initiates the connection into a logged-in space on the SRV_BC0 30-500, the instance it is logged into is a System security isolated instance 30-510 for EPD 30-100, 30-512 for EPD 30-102, and 30-516 for EPD 30-106 respectively. Each isolated instance operates like a system jail where the logged in user is only credentialed for a very few limited commands restricting their actions, rights, privileges and otherwise their ability to act on the host system.

So from the EPD into the SRV_BC0 30-500, there is very little which can be done other than to maintain the connection between the two. However, going in the other direction, a Client 30-000 can log into the SRV_BC0 and with certain permissions can have the right to access one or more of the isolated instances. And from there, can reverse SSH down the tunnel to the login for a remote command line interface CLI 30-110 on EPD 30-100, or CLI 30-112 on EPD 30-102, or CLI 30-116 on EPD 30-106. This allows the client 30-000 to do administrative tasks, remote hands on, run tests, and conduct other operations within the scope of their logged in rights. The client can be a human or an automated device.

The advantage of the back channel is to afford access when an EPD is otherwise unreachable. Due to the nature of the tunnels TUN 30-100500, 30-102500, and 30-106500, their tolerance to packet loss, jitter, and other factors is much higher than other forms of tunnel and/or communications path. Therefore, at times of unstable network, the back channel provides access to diagnose and remedy issues which otherwise would be difficult to impossible to address.

Figure 31:
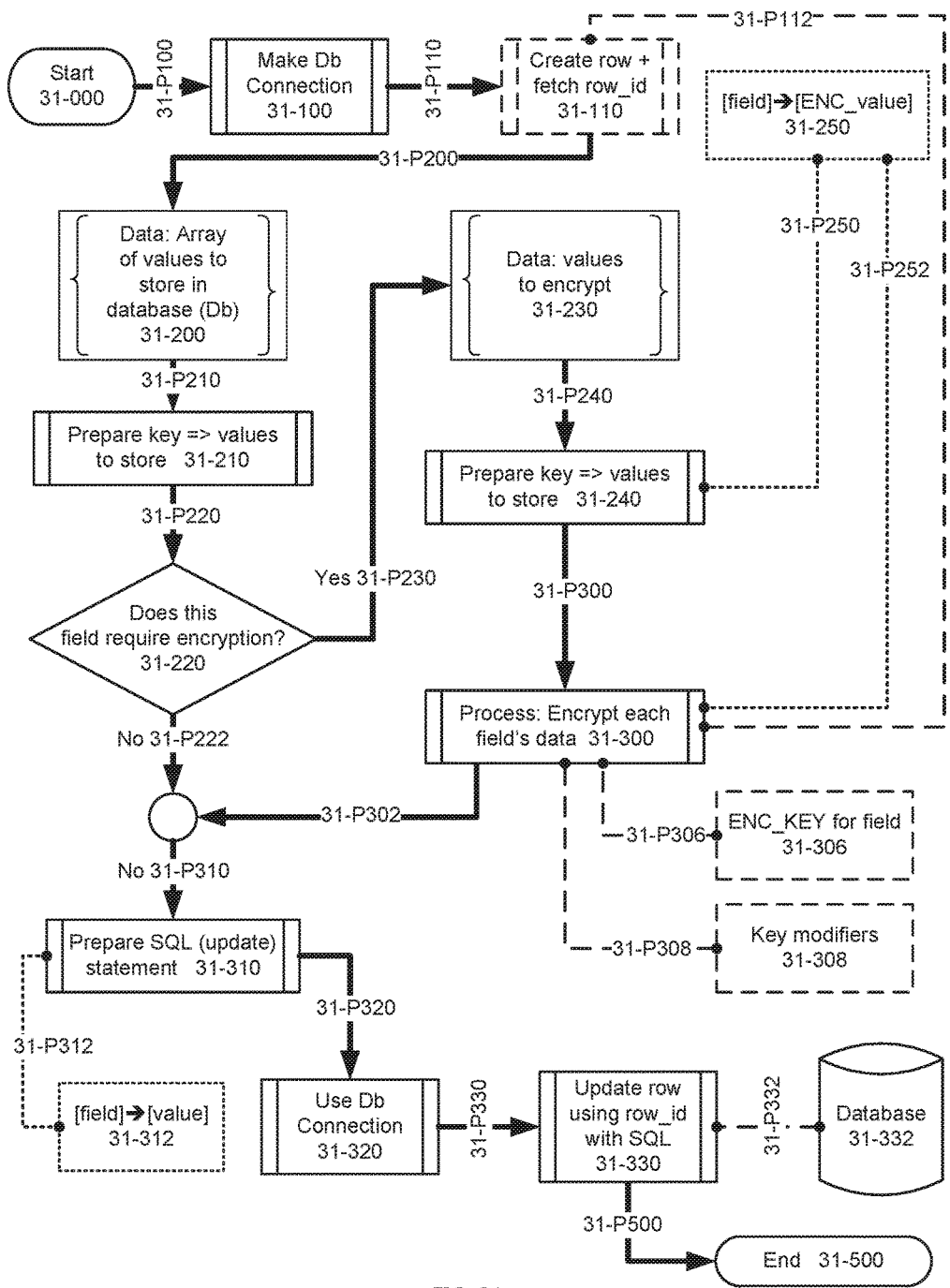
FIG. 31 illustrates the writing of encrypted data into selected fields in a row of a database using rotating and calculated keys which are unique for every single row.

FIG. 31 illustrates the writing of encrypted data into selected fields in a row of a database using rotating and calculated keys which are unique for every single row.

This process flowchart entails making a connection to database, creating a row and fetching the corresponding auto-increment integer ROW_ID value. Then utilizing an encryption process, the values to be encrypted are subsequently processed using a chain of keys, key adjustors, fields within the row and other factors. The same factors used to encrypt the row of data can be used to decrypt.

TABLE #1

| Database with rotating keys and variable data in Encrypted fields | | | | | | | | |
|---|---|---|---|---|---|---|---|---|
| # | User_ID | Key_Adj | ENC_A | ENC_B | Open_A | Time_Created | Flag | Mod_Time |
| 658 | 1 | AA | S#&*S | A(*SD* | Open Data | 1459164978 | 1 | Mar. 28, 2016 11:36:18 |
| 659 | 51 | BT | DS*W$% | (*%SK | More Open | 1459164978 | 0 | Mar. 28, 2016 11:36:18 |
| 660 | 2 | DA | 3#&SX& | #*&S& | Open Data | 1459164979 | 1 | Mar. 28, 2016 11:36:19 |
| 661 | 1 | HC | $#*(S(AZ | W#E*& | Open More | 1459164979 | 2 | Mar. 28, 2016 11:36:19 |
| 662 | 36 | QP | ᵣA($#*A3 | A7!D(# | Data | 1459164980 | 1 | Mar. 28, 2016 11:36:20 |
| 663 | 1 | AC | D#(sa001 | S@!a*9 | Readable | 1459164988 | 0 | Mar. 28, 2016 11:36:28 |

Each horizontal row in the table above has two encrypted fields, [ENC_A] and [ENC_B]. The key for each field is rotating based on a number of factors based both on some of the open fields [User_ID], [Key_Adj], and [Time_Created], plus other factors such as base system keys per the following calculation:

$$Key_{calculated} = User_{ID} + Base_{Key} + Key_{Adjustor} + Time_{Created} + Other_{Factors}$$

Even if the same User_ID inputs the same values for ENC_A and ENC_B at the exact same second, the values will be different because the auto-increment integer value for Row_ID # (for example for [User_ID]=1 at row numbers 658, 661, 663) is a part of the key calculation. The [Key_Adj] or key adjustor field in the example above is a two digit alpha value but could be other data stored in the row. They key point is that if the SQL of the database is stolen, it is expensive from a computational and time perspective to crack. The entire code base, SQL, and environment would have to be stolen and replicated to crack the values.

Figure 32:
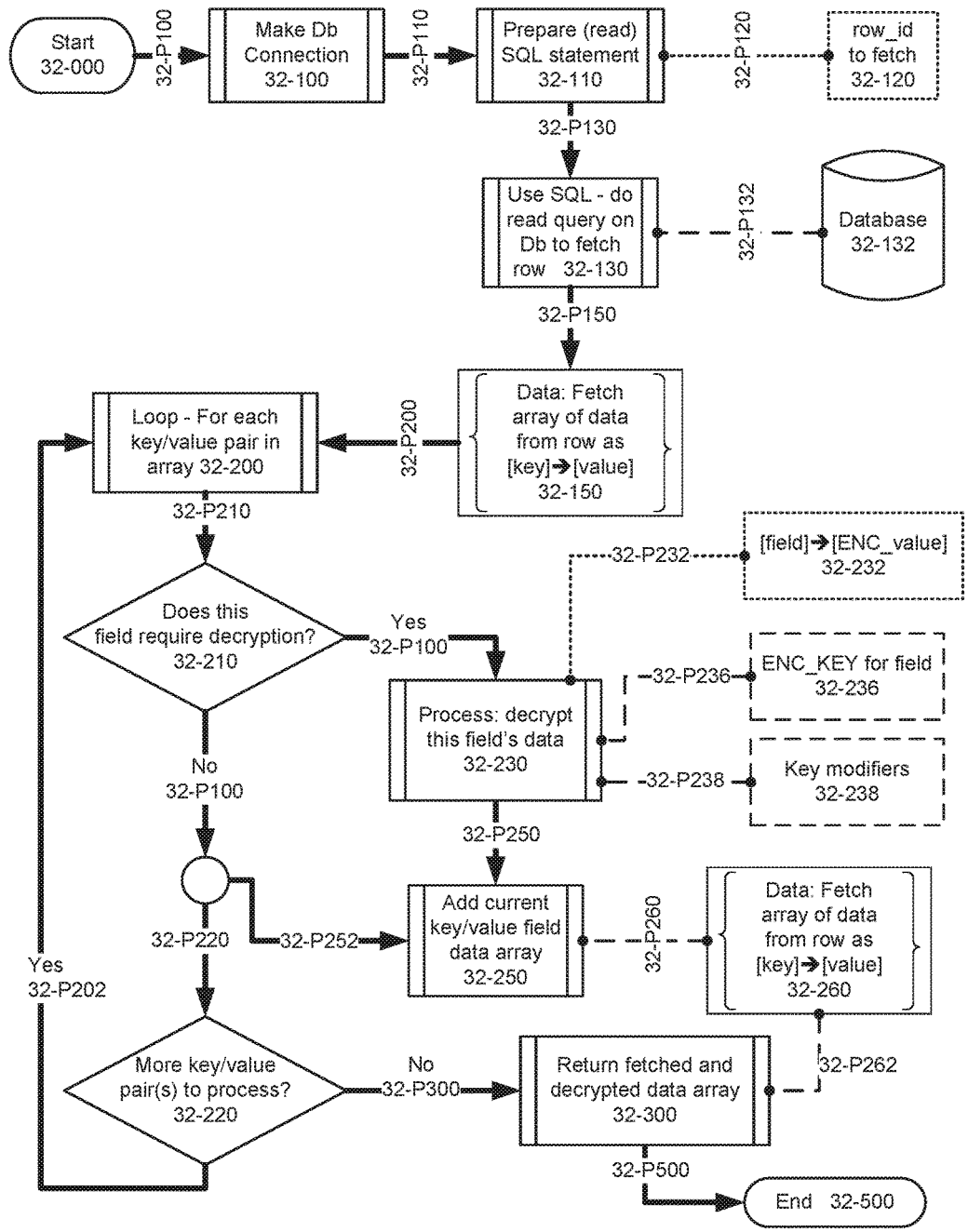
FIG. 32 illustrates the decryption of data from a single row using keys, key adjustors, and other factors using a framework to calculated keys.

FIG. 32 illustrates the decryption of data from a single row using keys, key adjustors, and other factors using a framework to calculated keys.

Figure 33:
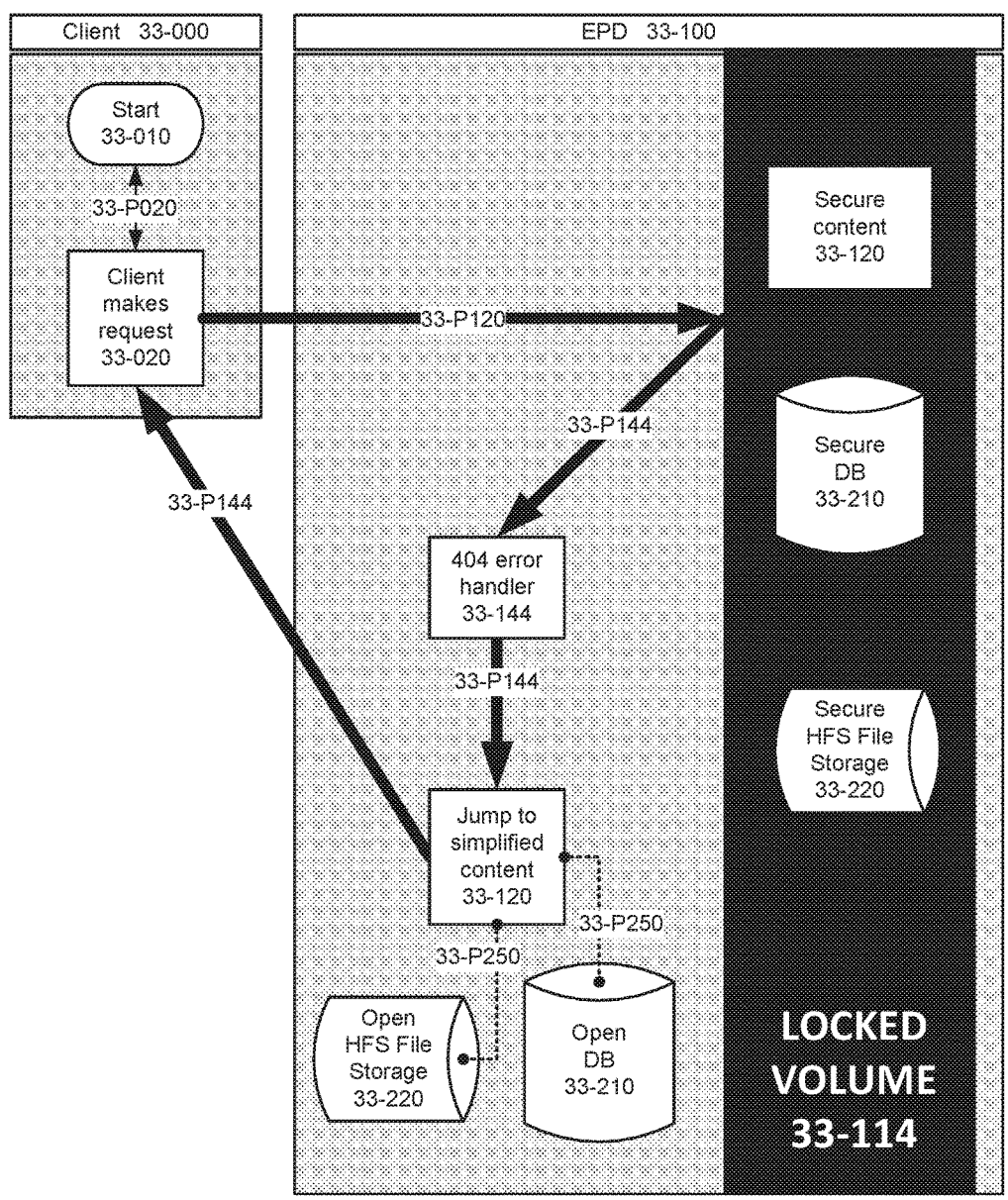
FIG. 33 illustrates what happens when graphic user interface (GUI) content which is requested by a client via an end point device (EPD) and the request content is stored within a locked volume.

FIG. 33 illustrates what happens when graphic user interface (GUI) content which is requested by a client 33-000 from an end point device (EPD) 33-100 and the request content is stored within a locked volume 33-114. A not found 404 error is thrown and caught by 404 error handler 33-144. A jump to simplified content is made at 33-120. This content is stored outside of the locked volume as either files stored on Open HFS file storage 33-220 or database content from Open DB 33-210 or combination of both.

If the secure volume is locked, only content outside of the secure volume is available. If however the secure volume is unlocked then secure content 33-120 from Secure DB 33-210 or files stored on Secure HFS File Storage 33-220 or combination of both can be served.

Javascript scripts within content served can also poll the EPD 33-100 to check the state of the secure volume. If it was locked and has been unlocked, a jump to secure content can be made. And conversely if a volume was unlocked and suddenly becomes locked, then the content can revert to content outside of the secure volume.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A multi-perimeter firewall system located in a cloud and forming part of a global virtual network, comprising:
   an egress ingress point device;
   a first access point server in communication with the egress ingress point device;
   a second access point server in communication with the first access point sever;
   an endpoint device in communication with the second access point server;
   a first perimeter firewall in communication with the first access point server, wherein the first perimeter firewall performs stateful packet inspection to prevent at least some traffic from passing from the first access point server to the second access point server; and
   a second perimeter firewall in communication with the second access point server, wherein the second perimeter firewall performs deep packet inspection to prevent at least some traffic from passing from the second access point server to the end point device,
   wherein at least one of the egress ingress point device, the first access point server, the second access point server, the endpoint device, the first perimeter firewall, or the second perimeter firewall comprises hardware,
   wherein the deep packet inspection is performed on a cloned copy of traffic that flows through the second perimeter firewall.

2. The multi-perimeter firewall system according to claim 1, wherein at least one of the access point servers is configured to perform firewall services.

3. The multi-perimeter firewall system according to claim 1, wherein the first perimeter firewall is in communication with the second perimeter firewall through a communication path.

4. The multi-perimeter firewall system according to claim 3, wherein the communication path between the first perimeter firewall and the second perimeter firewall is a network path.

5. The multi-perimeter firewall system according to claim 3, wherein the communication path between the first perimeter firewall and the second perimeter firewall is a network back channel.

6. The multi-perimeter firewall system according to claim 3, wherein the first perimeter firewall and the second perimeter firewall share threat information including at least one of heuristic patterns, signatures of known threats, known malicious source IP addresses, or attack vectors.

7. The multi-perimeter firewall system according to claim 6, wherein the first perimeter firewall and the second perimeter firewall share threat information with a central control server.

8. The multi-perimeter firewall system according to claim 1, wherein the deep packet inspection is performed on flow through traffic.

9. The multi-perimeter firewall system according to claim 1, wherein at least one of the firewalls includes a cloud firewall load balancer and wherein the cloud firewall load balancer can allocate cloud firewall resources on demand.

10. The multi-perimeter firewall system according to claim 1, wherein the egress ingress point device receives traffic directly from the Internet.

11. The multi-perimeter firewall system according to claim 1, wherein the first perimeter firewall is coupled to a multi-honed backbone.

12. The multi-perimeter firewall system according to claim 1, wherein the at least some traffic prevented from passing from the first access point server to the second access point server includes traffic with recognized malicious headers.

13. A multi-perimeter firewall system located in a cloud and forming part of a global virtual network, comprising:
an egress ingress point device;
a first access point server in communication with the egress ingress point device;
a second access point server in communication with the first access point sever;
an endpoint device in communication with the second access point server;
a first perimeter firewall in communication with the first access point server, wherein the first perimeter firewall performs stateful packet inspection to prevent at least some traffic from passing from the first access point server to the second access point server using a first firewall mechanism; and
a second perimeter firewall in communication with the second access point server, wherein the second perimeter firewall performs deep packet inspection to prevent at least some traffic from passing from the second access point server to the end point device using a second, different firewall mechanism,
wherein at least one of the egress ingress point device, the first access point server, the second access point server, the endpoint device, the first perimeter firewall, or the second perimeter firewall comprises hardware,
wherein the deep packet inspection is performed on a cloned copy of traffic that flows through the second perimeter firewall.

14. The multi-perimeter firewall system according to claim 13, wherein at least one of the access point servers is configured to perform firewall services.

15. The multi-perimeter firewall system according to claim 13, wherein the first perimeter firewall is in communication with the second perimeter firewall through a communication path.

16. The multi-perimeter firewall system according to claim 15, wherein the communication path between the first perimeter firewall and the second perimeter firewall is a network path.

17. The multi-perimeter firewall system according to claim 15, wherein the communication path between the first perimeter firewall and the second perimeter firewall is a network back channel.

18. The multi-perimeter firewall system according to claim 15, wherein the first perimeter firewall and the second perimeter_firerewall share threat information including at least one of heuristic patterns, signatures of known threats, known malicious source IP addresses, or attack vectors.

19. The multi-perimeter firewall system according to claim 18, wherein the first perimeter firewall and the second perimeter firewall share threat information with a central control server.

20. The multi-perimeter firewall system according to claim 13, wherein the deep packet inspection is performed on flow through traffic.

21. The multi-perimeter firewall system according to claim 13, wherein at least one of the firewalls includes a cloud firewall load balancer and wherein the cloud firewall load balancer can allocate cloud firewall resources on demand.

22. The multi-perimeter firewall system according to claim 13, wherein the second perimeter firewall is between the endpoint device and the second access point server.

23. The multi-perimeter firewall system according to claim 13, wherein the first perimeter firewall is between the first access point server and the second access point server.

24. The multi-perimeter firewall system according to claim 13, wherein the egress ingress point device receives traffic directly from the Internet.

25. The multi-perimeter firewall system according to claim 13, wherein the first perimeter firewall is coupled to a multi-honed backbone.

26. The multi-perimeter firewall system according to claim 13, wherein the at least some traffic prevented from passing from the first access point server to the second access point server includes traffic with recognized malicious headers.

* * * * *

US010574482C1

(12) EX PARTE REEXAMINATION CERTIFICATE (12728th)
United States Patent
Oré et al.

(10) Number: US 10,574,482 C1
(45) Certificate Issued: Oct. 3, 2024

(54) MULTI-PERIMETER FIREWALL IN THE CLOUD

(71) Applicant: UMBRA Technologies Ltd., Hong Kong (CN)

(72) Inventors: Carlos Eduardo Oré, Saint-Herblain (FR); Joseph E. Rubenstein, Beijing (CN)

(73) Assignee: UMBRA TECHNOLOGIES LTD., Hong Kong (CN)

Reexamination Request:
No. 90/019,363, Jan. 2, 2024

Reexamination Certificate for:
Patent No.: 10,574,482
Issued: Feb. 25, 2020
Appl. No.: 15/563,261
PCT Filed: Apr. 7, 2016
PCT No.: PCT/IB2016/000528
§ 371 (c)(1),
(2) Date: Sep. 29, 2017
PCT Pub. No.: WO2016/162748
PCT Pub. Date: Oct. 13, 2016

Related U.S. Application Data

(60) Provisional application No. 62/151,174, filed on Apr. 22, 2015, provisional application No. 62/144,293, filed on Apr. 7, 2015.

(51) Int. Cl.
| | |
|---|---|
| *H04L 12/46* | (2006.01) |
| *G06F 9/4401* | (2018.01) |
| *G06F 21/57* | (2013.01) |
| *G06F 21/60* | (2013.01) |
| *G06F 21/78* | (2013.01) |
| *H04L 9/08* | (2006.01) |
| *H04L 9/40* | (2022.01) |
| *H04L 12/703* | (2013.01) |

(Continued)

(52) U.S. Cl.
CPC .......... *H04L 47/726* (2013.01); *G06F 9/4401* (2013.01); *G06F 9/4416* (2013.01); *G06F 21/575* (2013.01); *G06F 21/606* (2013.01); *G06F 21/78* (2013.01); *H04L 9/08* (2013.01); *H04L 12/4633* (2013.01); *H04L 12/465* (2013.01); *H04L 45/22* (2013.01); *H04L 45/28* (2013.01); *H04L 45/302* (2013.01); *H04L 45/64* (2013.01); *H04L 47/801* (2013.01); *H04L 47/805* (2013.01); *H04L 47/825* (2013.01); *H04L 47/83* (2022.05); *H04L 63/02* (2013.01); *H04L 63/0218* (2013.01); *H04L 63/0236* (2013.01); *H04L 63/0254* (2013.01); *H04L 63/0263* (2013.01); *H04L 63/0272* (2013.01); *H04L 63/062* (2013.01); *H04L 12/4641* (2013.01)

(58) Field of Classification Search
None
See application file for complete search history.

(56) References Cited

To view the complete listing of prior art documents cited during the proceeding for Reexamination Control Number 90/019,363, please refer to the USPTO's Patent Electronic System.

*Primary Examiner* — Matthew E Heneghan

(57) ABSTRACT

Systems and methods for providing multi-perimeter firewalls via a virtual global network are disclosed. In one embodiment the network system may comprise an egress ingress point in communication with a first access point server, a second access point server in communication with the first access point server, an endpoint device in communication with the second access point server, a first firewall in communication with the first access point server, and a second firewall in communication with the second access point server. The first and second firewalls may prevent traffic from passing through their respective access point servers. The first and second may be in communication with each other and exchange threat information.

(51) Int. Cl.
*H04L 12/707* (2013.01)
*H04L 12/715* (2013.01)
*H04L 12/725* (2013.01)
*H04L 29/06* (2006.01)
*H04L 45/00* (2022.01)
*H04L 45/28* (2022.01)
*H04L 45/302* (2022.01)
*H04L 45/64* (2022.01)
*H04L 47/70* (2022.01)
*H04L 47/726* (2022.01)
*H04L 47/80* (2022.01)
*H04L 47/83* (2022.01)

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-26 is confirmed.

\* \* \* \* \*